United States Patent [19]
Takeuchi et al.

[11] Patent Number: 6,065,339
[45] Date of Patent: May 23, 2000

[54] VIBRATION GYRO SENSOR, COMBINED SENSOR AND METHOD FOR PRODUCING VIBRATION GYRO SENSOR

[75] Inventors: Yukihisa Takeuchi, Nishikamo-gun; Masahiko Namerikawa, Inazawa; Kazuyoshi Shibata, Mizunami; Takao Ohnishi, Nishikasugai-gun, all of Japan

[73] Assignee: NGK Insulators, Ltd., Nagoya, Japan

[21] Appl. No.: 08/952,596

[22] PCT Filed: Mar. 28, 1997

[86] PCT No.: PCT/JP97/01094

§ 371 Date: Nov. 21, 1997

§ 102(e) Date: Nov. 21, 1997

[87] PCT Pub. No.: WO97/37195

PCT Pub. Date: Sep. 10, 1997

[30] Foreign Application Priority Data

| Mar. 29, 1996 | [JP] | Japan | 8-76434 |
| Aug. 1, 1996 | [JP] | Japan | 8-203595 |

[51] Int. Cl.$^7$ .................................................. G01C 19/00
[52] U.S. Cl. .......................................................... 73/504.12
[58] Field of Search ............................. 73/504.02, 504.12, 73/504.15, 504.16

[56] References Cited

U.S. PATENT DOCUMENTS

| 2,247,960 | 7/1941 | Michaels | 84/409 |
| 2,513,340 | 7/1950 | Lyman | 264/1 |
| 4,628,734 | 12/1986 | Watson | 73/505 |
| 5,533,397 | 7/1996 | Sugitani et al. | 73/504.16 |

FOREIGN PATENT DOCUMENTS

| 60-47913 | 3/1985 | Japan . |
| 3-90079 | 9/1991 | Japan . |
| 4-296657 | 10/1992 | Japan . |
| 06347471 | 12/1994 | Japan . |
| 7-23689 | 5/1995 | Japan . |
| 8-128830 | 5/1996 | Japan . |
| 8-160064 | 6/1996 | Japan . |
| 8-178667 | 7/1996 | Japan . |
| 8-201064 | 8/1996 | Japan . |
| 8-304081 | 11/1996 | Japan . |
| 9-89574 | 4/1997 | Japan . |

*Primary Examiner*—Hezron Williams
*Assistant Examiner*—Richard A. Moller
*Attorney, Agent, or Firm*—Wall Marjama Bilinski & Burr

[57] ABSTRACT

A vibration gyro sensor is constructed as follows. Namely, a detecting piezoelectric/electrostrictive element 12, which detects displacement generated in a direction perpendicular to a direction of vibration of a vibrator 2 when the vibrator is rotated, is provided on a detecting section. The detecting section is constructed by an integrated fired product made of ceramics together with the vibrator 2 and a support base 4. The detecting section is constructed by a first plate-shaped section 6 which is more thin-walled than the vibrator 2 and which has its principal surface extending in the direction of vibration. The piezoelectric/electrostrictive element 12 is formed in an integrated manner on the first plate-shaped section 6 in accordance with a film formation method. Further, a thin-walled second plate-shaped section 8, which is provided for decreasing rigidity in the direction of vibration and facilitating the vibration for the vibrator 2, is formed in an integrated manner so that its principal surface extends in the direction perpendicular to the direction of vibration. Accordingly, it is possible to obtain the vibration gyro sensor made of ceramics having excellent sensitivity, in which the characteristics of the vibrator are scarcely affected by an ambient magnetic field, processing or machining can be easily performed, and the electric characteristics can be advantageously adjusted.

56 Claims, 74 Drawing Sheets

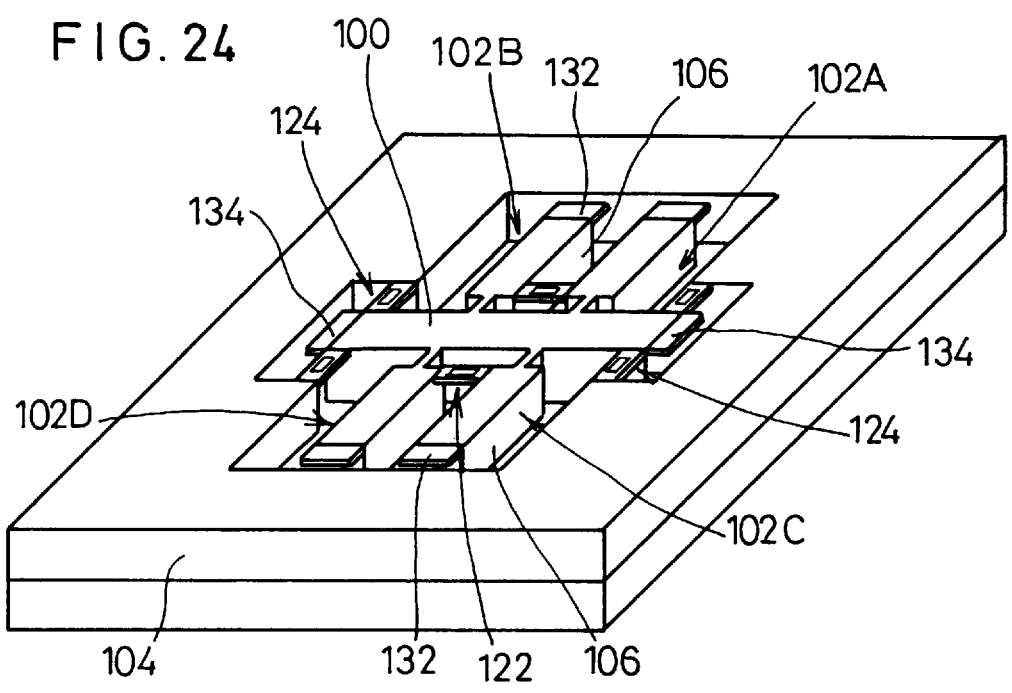
FIG. 24
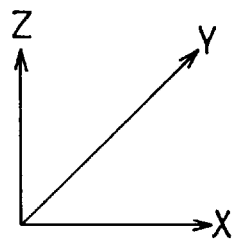

F I G. 40
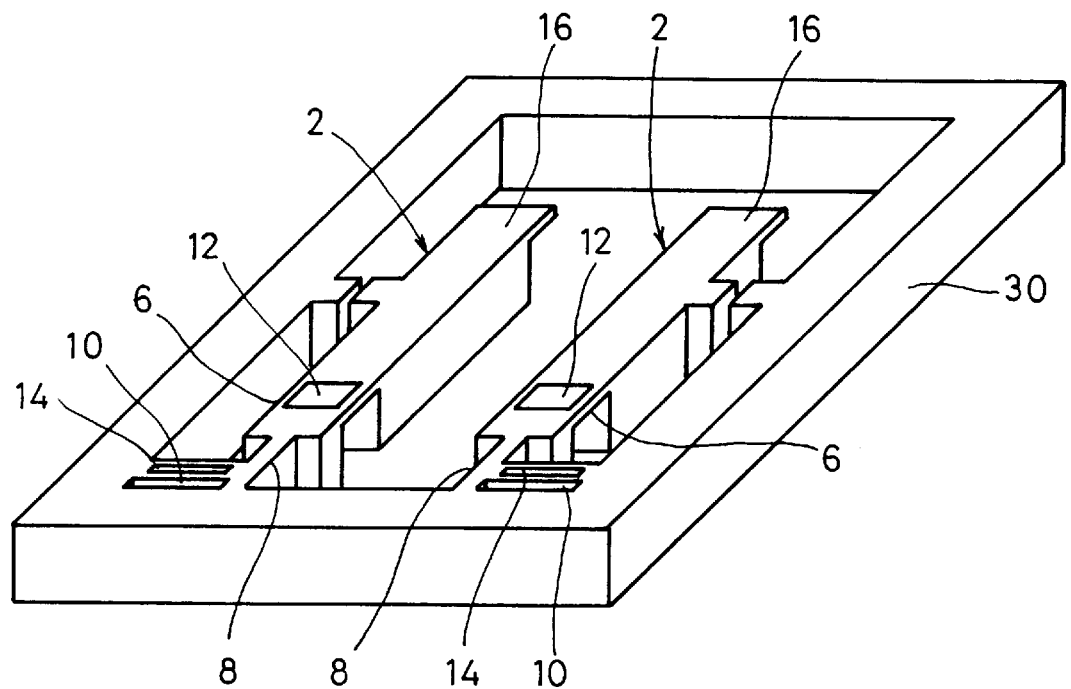

F I G. 48
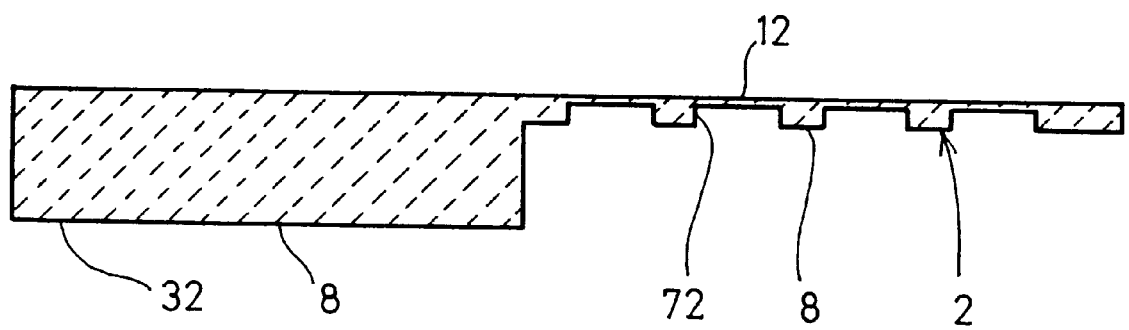

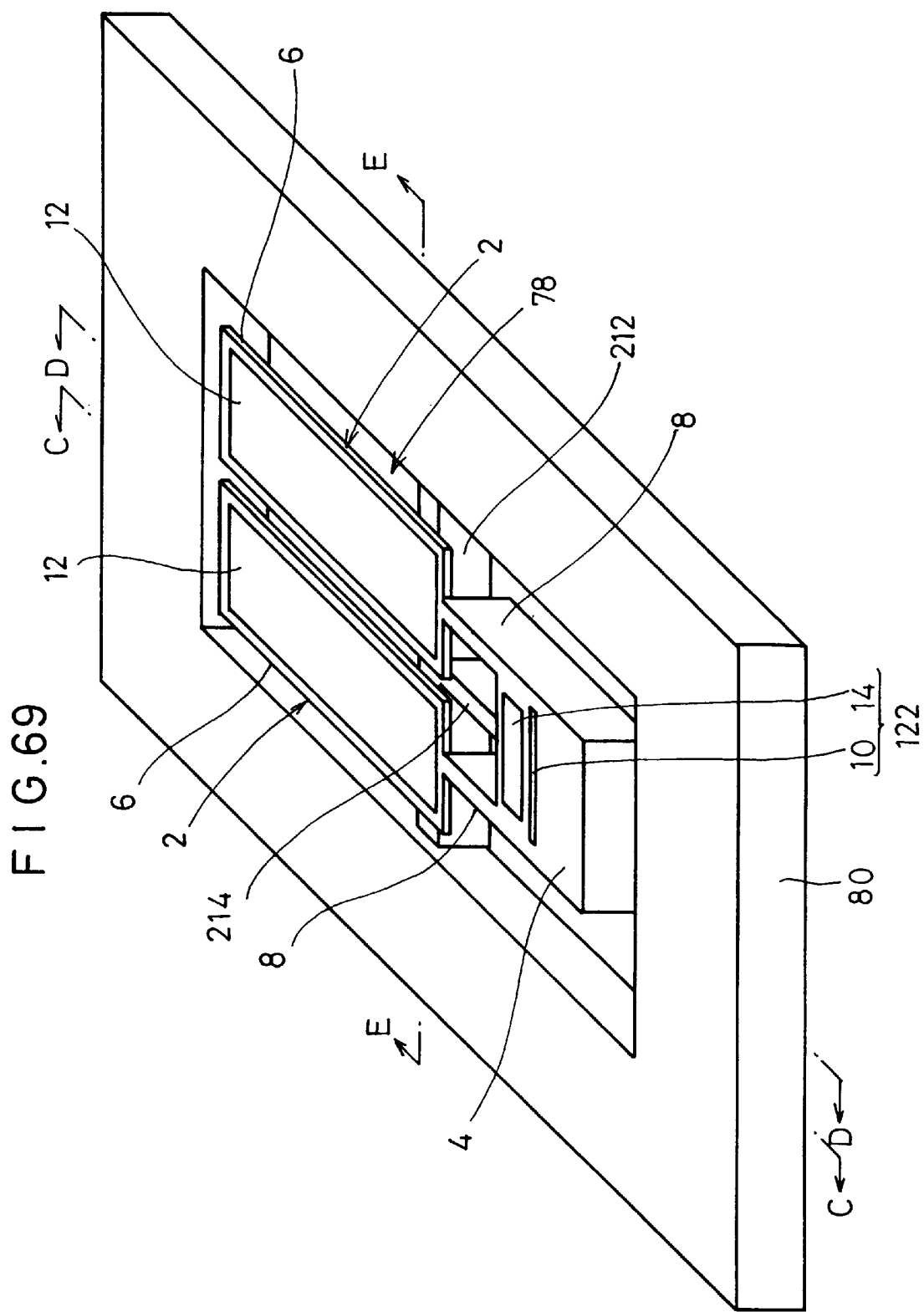

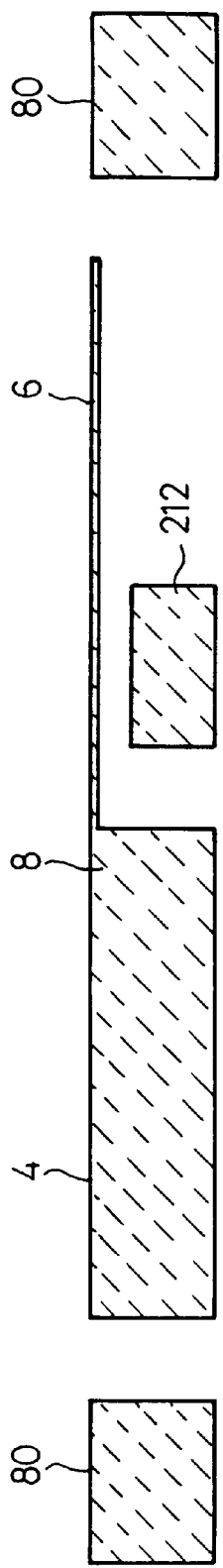
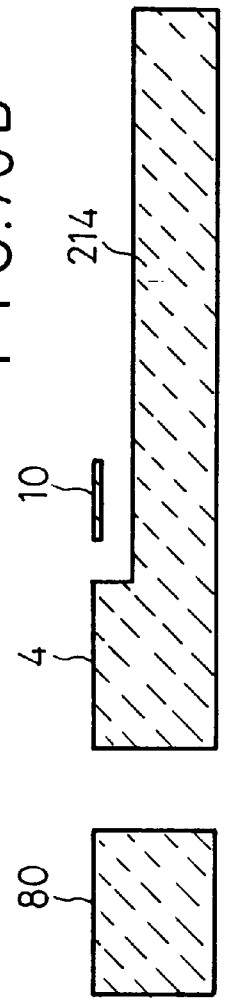
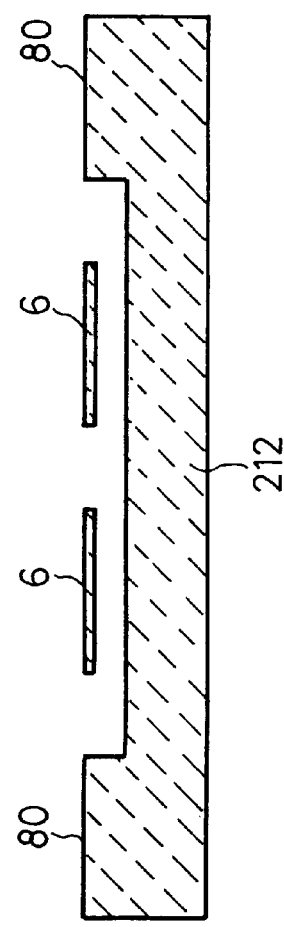
FIG.70A
FIG.70B
FIG.70C

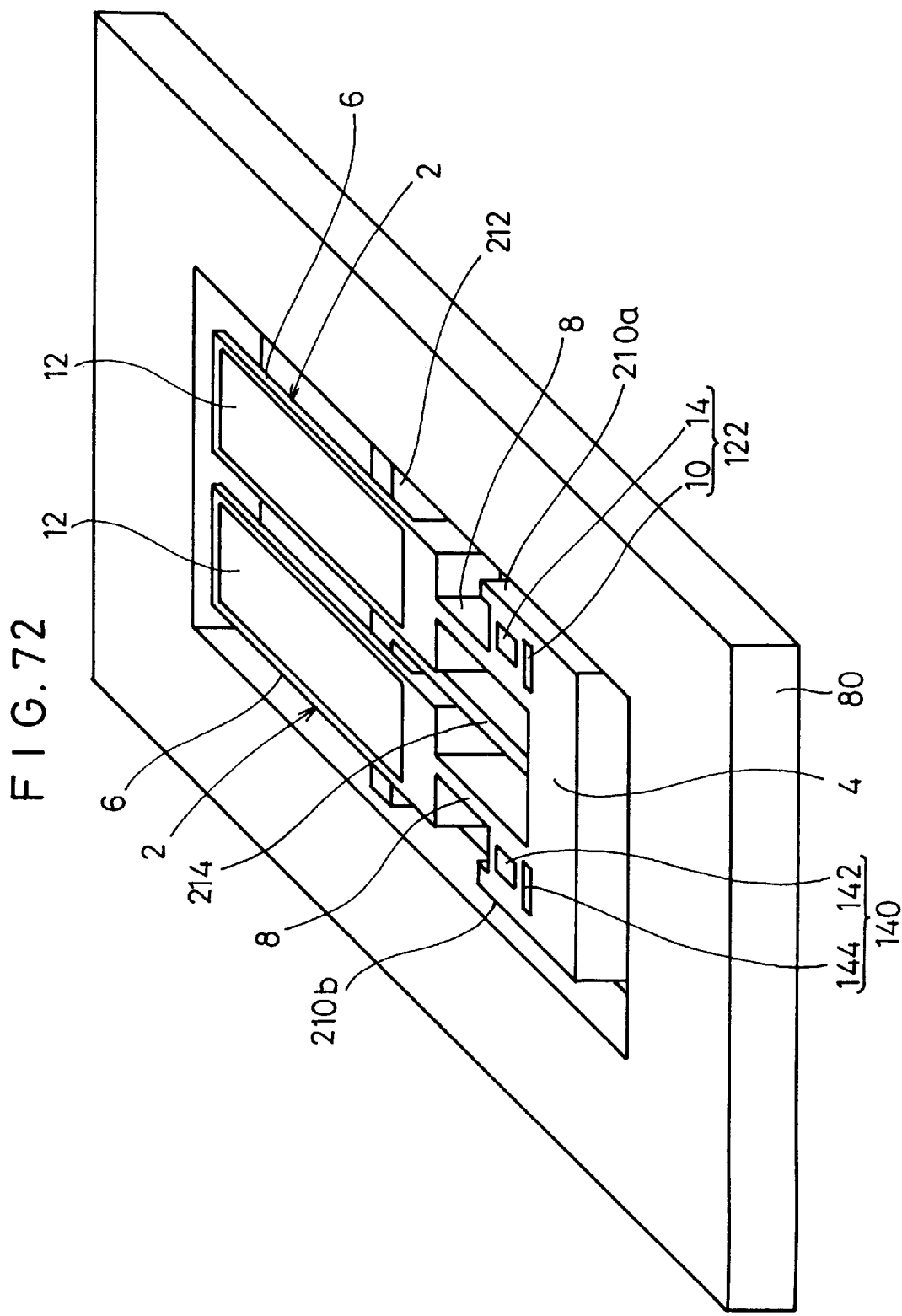
F I G. 72

VIBRATION GYRO SENSOR, COMBINED SENSOR AND METHOD FOR PRODUCING VIBRATION GYRO SENSOR

BACKGROUND OF THE INVENTION

1. Field of the Invention

The present invention relates to a vibration gyro sensor. In particular, the present invention relates to a vibration gyro sensor (scope) for detecting the angular velocity of rotation by utilizing the Coriolis force generated when a vibrator is rotated while making vibration, and a method for producing the vibration gyro sensor. The present invention also relates to a combined sensor including the vibration gyro sensor.

2. Background Art

The gyro sensor (scope), which is a sensor for detecting the angular velocity of rotation, has been hitherto used, for example, for inertial navigation systems of aircraft and shipping. Recently, the gyro sensor has been used for vehicle-carried navigation systems and for attitude control systems of automatically guided robot vehicles. Further, the gyro sensor has been used, for example, for picture blurring-preventive systems of VTR cameras. In such circumstances, a compact type gyro sensor is required, which is appropriately used in various fields as described above. Accordingly, the vibration gyro sensor attracts attention.

As well-known, the vibration gyro sensor (scope) of this type has a basic structure comprising a driving piezoelectric element and a detecting piezoelectric element which adhere to a vibrator formed of a constant resilience metal represented by the elinvar alloy. In a rectangular coordinate system of x, y, z axes, when the vibrator is rotated about the z axis while giving bending vibration in the x axis direction to the vibrator by using the driving piezoelectric element, the Coriolis force acts in the y axis direction to the vibrator. Accordingly, the bending vibration in the y axis direction caused in the vibrator by the Coriolis force is detected as a voltage by the aid of the detecting piezoelectric element. The angular velocity is determined on the basis of the detected voltage.

However, in the case of the conventional vibration gyro sensor as described above, the amount of displacement of the vibrator, which is based on the vibration induced by the driving piezoelectric element, is small. Therefore, the voltage (electromotive force), which is detected by the detecting piezoelectric element, is small. As a result, the conventional vibration gyro sensor suffers from low sensitivity.

In addition, the driving piezoelectric element and the detecting piezoelectric element are glued and fixed to the vibrator by using an adhesive. Therefore, the adhesive intervenes between the vibrator and the piezoelectric elements. As a result, the stress is absorbed by the adhesive. This is problematic since the detection sensitivity is lowered.

When the vibrator comprises a member which is composed of a sound chip or a tuning fork formed of an elinvar alloy, a problem arises in that the characteristics of the vibrator tend to be affected by an ambient magnetic field, because the elinvar alloy is a ferromagnetic material. Further, due to the shape or the material of the vibrator as described above, there is an implicit problem that it is difficult to perform processing or machining when the resonant frequency of the vibrator is adjusted.

SUMMARY OF THE INVENTION

The present invention has been made is to solve all of the problems as described above and provide a vibration gyro sensor having excellent sensitivity. Another object of the present invention is to provide a vibration gyro sensor made of ceramics, in which the characteristics of the vibrator are barely affected by an ambient magnetic field, processing or machining can be easily performed, and the electric characteristics can be advantageously adjusted.

The present invention provides a vibration gyro sensor which is constructed as a whole by an integrated fired product made of ceramics without using any magnetic material. Therefore, the vibration gyro sensor according to the present invention scarcely affected by any ambient magnetic field. Further, the vibration gyro sensor includes first plate-shaped sections and second plate-shaped sections which are thin-walled respectively and which are provided as easily bendable sections in driving and detecting directions for making displacement of vibrators respectively. Therefore, large displacement is obtained in any of the detecting and driving directions, thus giving a large electromotive force (voltage) generated depending on the displacement detected by piezoelectric/electrostrictive elements, and making it possible to effectively increase the detection sensitivity. Especially, the detecting section has a structure to which the stress is concentrated. Therefore, a large output is obtained.

Moreover, the vibration gyro sensor according to the present invention includes the detecting piezoelectric/electrostrictive elements which are formed in an integrated manner in accordance with a film formation method on the first plate-shaped sections for giving the detecting sections constructed by the integrated fired product made of ceramics. The piezoelectric/electrostrictive elements directly contact with the first plate-shaped sections without any intervening adhesive layer. Therefore, any absorption of stress, which would be otherwise caused due to the presence of such an adhesive layer, is effectively avoided. Accordingly, the displacement (bending vibration) of the vibrators, which is caused by the Coriolis force induced when the vibrators are rotated, can be effectively detected by the piezoelectric/electrostrictive elements, making it possible to advantageously contribute to the improvement in sensitivity.

In the vibration gyro sensor according to the present invention, for example, the electrode area of the piezoelectric/electrostrictive element provided on the detecting section can be easily changed by using an appropriate removing means such as a laser. Therefore, the vibration gyro sensor also has such a feature that its electric characteristics are easily adjusted.

In a preferred embodiment of the present invention, the vibrator is provided with a thin-walled excisable section extending from a forward end of the vibrator, and a resonance frequency of the vibrator is adjusted in accordance with an amount of excision of the excisable section. The thin-walled excisable section, which is provided at the end of the vibrator, is an easily processible or machinable portion. The resonance frequency of the vibrator can be easily adjusted to have a desired value by providing such an excisable section for trimming beforehand, and excising the excisable section by means of an appropriate excising means such as laser machining and ultrasonic machining.

In another preferred embodiment of the present invention constructed as described above, two of the vibrators are supported in parallel to one another by the support base, and the two vibrators are vibrated by the driving means in an excited manner in mutually opposite directions. In this embodiment, the vibration gyro sensor may be constructed such that the driving means comprises a third plate-shaped section which is more thin-walled than the vibrator and which is composed of the integrated fired product of ceramics together with the vibrator, and a driving piezoelectric/electrostrictive element formed in an integrated manner on the third plate-shaped section in accordance with the film formation method.

In still another preferred embodiment of the present invention constructed as described above, a support bar is arranged at a position which is located between the two vibrators and which is separated from the vibrators. The support bar is supported in an integrated manner by the support base together with the two vibrators.

In still another preferred embodiment of the present invention constructed as described above, the support base is constructed by an attachment frame which is disposed outside the vibrator and separated therefrom by a predetermined distance so that the vibrator is surrounded thereby. Provision of the attachment frame makes it possible to tightly fix the vibration gyro sensor, exhibiting a feature that a place for installing the vibration gyro sensor can be selected with a large degree of freedom.

The following embodiments may be adopted for the position of arrangement of the driving means. Namely, the driving means may be provided in an integrated manner between the two vibrators. Alternatively, the driving means may be provided in an integrated manner between the second plate-shaped sections.

When the vibration gyro sensor includes the support bar, the driving means may be provided in an integrated manner between the support bar and the vibrators respectively, or the driving means may be provided in an integrated manner between the support bar and the second plate-shaped sections respectively.

When the vibration gyro sensor includes the attachment frame, the driving means may be provided in an integrated manner between the attachment frame and the vibrators respectively, or the driving means may be provided in an integrated manner between the attachment frame and the second plate-shaped sections respectively.

According to another aspect, there is provided a second type of the vibration gyro sensor according to the present invention, wherein a second plate-shaped section and a third plate-shaped section are provided in an integrated manner at opposing regions on a frame for supporting two vibrators, and a driving piezoelectric/electrostrictive element is formed in an integrated manner on the third plate-shaped section so that the two vibrators may be vibrated in an excited manner in accordance with deformation vibration of the frame effected by the driving piezoelectric/electrostrictive element.

The vibration gyro sensor, which makes the deformation vibration of the frame as described above, advantageously adopts a structure in which an attachment section for fixing the frame is formed in an integrated manner on an outer surface of a region of the frame for forming the second plate-shaped section, in order to facilitate fixation of the frame. Alternatively, a structure is advantageously adopted, in which the attachment section includes, in an integrated manner, an attachment frame which is positioned outside the frame and separated therefrom by a predetermined distance so that the frame is surrounded thereby. Such an attachment frame realizes tight fixation of the vibration gyro sensor.

According to still another aspect, there is provided a third type of the vibration gyro sensor according to the present invention, which is different from the vibration gyro sensors of the foregoing two types. Namely, support base portions for supporting two vibrators respectively are individually subjected to deformation vibration respectively by the aid of driving piezoelectric/electrostrictive elements provided on third plate-shaped sections for making connection to an attachment frame disposed outside. Accordingly, the two vibrators, which are supported by the respective support base portions, are individually vibrated in an identical plane, respectively.

The vibration gyro sensor of the third type is also advantageously constructed such that each of the vibrators has a thin-walled excisable section extending from a forward end thereof, in the same manner as the vibration gyro sensor of the second type. The resonance frequency of the vibrator is adjusted in accordance with the amount of excision of the excisable section. Accordingly, trimming can be easily performed by means of an excising means such as laser machining and ultrasonic machining. Thus it is possible to easily adjust the resonance frequency.

According to still another aspect, there is provided a fourth type of the vibration gyro sensor according to the present invention. At first, when an angular velocity is applied around an axis perpendicular to a plane which includes a certain direction and an extending direction of the support base in a state of vibration of the vibrators, the force (Coriolis force) directed in the certain direction is generated in an alternating manner in the vibrators in accordance with the vibration. As a result, a force acts on the detecting sections in the certain direction, and the detecting sections are vibrated by the force. Namely, rotational vibration is generated around the axis of rotation at portions comprising the vibrators and the support base. The generated vibration is detected as an electromotive force (voltage) by the piezoelectric/electrostrictive elements of the detecting sections.

According to the present invention, all of the vibrators, the support base, and the detecting sections are constructed by an integrated fired product made of ceramics. Therefore, there is no magnetic material such as the conventional elinvar alloy in the materials for constructing the vibration gyro sensor. As a result, the characteristics of the sensor are not affected by any ambient magnetic field.

The detecting section is constructed by the first plate-shaped section which is more thin-walled than the vibrator in its direction of height, and thus it has the structure having low rigidity. Therefore, large strain or distortion is obtained in the detecting section when the vibration is generated around the axis of rotation by the angular velocity, and thus the detection sensitivity of the piezoelectric/electrostrictive element is greatly improved.

Especially, the vibration gyro sensor according to the present invention functions such that the vibration is generated in the detecting section only when the angular velocity is applied. Therefore, the output (null voltage), which is obtained from the piezoelectric/electrostrictive element in a state in which no angular velocity is applied, is extremely small. Thus the detection sensitivity is greatly improved. Moreover, the probability of fatigue fracture at the detecting section due to vibration is lowered, and it is possible to contemplate a long service life of the sensor.

The vibration gyro sensor according to the present invention has the structure not for measuring the angular velocity around the major axis of the vibrator, but for measuring the angular velocity around the axis perpendicular to the plane which includes the certain direction and the extending direction of the support base. Therefore, the vibrators, the support base, and the frame can be made thin in their direction of height. Thus it is possible to facilitate realization of a compact size and a light weight of the sensor.

The vibrator has the structure including no thin-walled detecting section and supported singly by the support base which has high strength. Therefore, the vibrator itself is allowed to have a large mass. Accordingly, the Coriolis force (Fc=2 mvΩ) generated in the vibrator is increased, and hence it is possible to realize a high sensitivity in relation to the detection of strain effected by the detecting section.

It is preferable in the vibration gyro sensor according to the present invention that each of the detecting sections is constructed by a ring member formed between the support base and the frame, and the first plate-shaped section provided in a bridged manner in the ring member in parallel to the extending direction of the support base.

In this embodiment, when the angular velocity is applied around the axis perpendicular to the plane which includes the certain direction and the extending direction of the support base is in a state in which the vibrator is rotated, the force acts in the certain direction on the detecting section. The action of the force allows the ring member to make vibration while giving an elliptic configuration having its major or minor axis directed in the certain direction. The vibration of the ring member along the certain direction is detected as an electromotive force (voltage) by the piezoelectric/electrostrictive element.

It is preferable for the vibration gyro sensor according to the present invention that at least two of the vibrators are supported by the support base in parallel to one another, and a driving means for vibrating the respective vibrators in an excited manner in mutually opposite directions is disposed between the two vibrators. In this embodiment, the at least two vibrators make vibrations in the mutually opposite directions, namely in directions to make mutual separation and approach in one plane (in the plane which includes the certain direction and the extending direction of the support base). It is preferable that the driving means includes, for example, a third plate-shaped section which is more thin-walled in its direction of height than the vibrator and which is constructed by the integrated fired product of ceramics together with the vibrator, and a driving piezoelectric/electrostrictive element formed on the third plate-shaped section.

It is preferable for the vibration gyro sensor constructed as described above that the driving means is provided in an integrated manner between the two vibrators. The driving means is preferably arranged on a line for connecting respective centers of gravity of the both vibrators. This arrangement is advantageous to improve the sensitivity of the detecting section, since the at least two vibrators can make mutual approach and separation efficiently. Alternatively, the driving means may be provided in an integrated manner between the respective vibrators and the support base.

It is preferable that the vibration gyro sensor constructed as described above further comprises a reference means for performing feedback control so that the vibration of the driving means is constant. The reference means may comprise a fourth plate-shaped section which is more thin-walled in its direction of height than the vibrator and which is constructed by the integrated fired product made of ceramics together with the vibrator, and a reference piezoelectric/electrostrictive element formed on the fourth plate-shaped section.

The reference means may be provided in an integrated manner between the respective vibrators. Alternatively, the reference means may be provided in an integrated manner between the respective vibrators and the support base.

It is preferable that the vibration gyro sensor constructed as described above further comprises vibration-applying sections provided in an integrated manner between the respective vibrators and the support base. The vibration-applying section may comprise a fifth plate-shaped section arranged between the vibrator and the support base and extending in parallel to a longitudinal direction of the support base, a sixth plate-shaped sections for connecting the support base to the fifth plate-shaped section, and a seventh plate-shaped section for connecting the vibrator to the fifth plate-shaped section. In this embodiment, the driving means may be provided in an integrated manner between the respective vibration-applying sections. Alternatively, the driving means may be provided in an integrated manner between each of the vibration-applying sections and the support base.

It is preferable that the vibration gyro sensor constructed as described above further comprises thin-walled first projections for adjusting a resonance frequency for driving, provided at free ends of the vibrators, and thin-walled second projections for adjusting a resonance frequency for detection, provided at both ends of the support base in its longitudinal direction, wherein the first and second projections are constructed by the integrated fired product made of ceramics together with the vibrators and the support base.

In this embodiment, the resonance frequency for driving can be adjusted by applying a trimming treatment (excising treatment) to the first projection, and the resonance frequency for detection can be adjusted by applying a trimming treatment (excising treatment) to the second projection. Namely, the resonance frequencies for driving and detection can be independently adjusted respectively. Therefore, for example, it is possible to avoid the inconvenience that the resonance frequency for detection is affected by adjustment for the resonance frequency for driving. When the resonance frequency is adjusted, it is preferable that the resonance frequency for driving is firstly adjusted, and then the resonance frequency for detection is adjusted.

For example, the first and second projections may be constructed to be plate-shaped and thin-walled in a direction of height with respect to the vibrators. Alternatively, the first and second projections may be constructed to be plate-shaped and thin-walled in the extending direction of the support base with respect to the vibrators. The former construction is advantageous in that the trimming treatment can be easily performed by means of, for example, laser beam scanning over the upper surface. In the case of the latter construction, regions to be subjected to the trimming treatment are disposed over entire surfaces perpendicular to the direction of vibration of the vibrators, and hence an extremely excellent mass balance is obtained. In this case, the trimming treatment is performed, for example, by applying percussion such as ultrasonic waves after laser radiation so that unnecessary portions are excised.

It is preferable for the vibration gyro sensor constructed as described above that the third plate-shaped section of the driving means is also used as an adjustment objective for a resonance frequency for driving, and the first plate-shaped section of the detecting section is also used as an adjustment objective for a resonance frequency for detection. Specifically, the resonance frequency for driving is adjusted by trimming-treating, in the widthwise direction, the third plate-shaped section of the driving means, and the resonance frequency for detection is adjusted by trimming-treating, in the widthwise direction, the first plate-shaped section of the detecting section. Namely, this embodiment lies in the method in which the resonance frequencies for driving and detection are adjusted by changing spring constants of the first and third plate-shaped sections, rather than that the resonance frequencies for driving and detection are adjusted by changing masses of the vibrator and the support base.

In this embodiment, it is unnecessary to form the first and second projections at the free ends of the vibrators and at the both ends of the support base in the longitudinal direction respectively. Accordingly, the production steps can be simplified. Further, since the regions to be subjected to the trimming treatment are thin-walled, the resonance frequency can be easily adjusted. Unlike the method in which the resonance frequency is adjusted by changing the mass, the resonance frequency for driving and the resonance frequency for detection can be adjusted completely independently.

According to still another aspect, there is provided a fifth type of the vibration gyro sensor according to the present invention, wherein vibrators are constructed by wide and lengthy first plate-shaped sections respectively. Accordingly, the mass and the moment of the vibrator are increased. As a result, the velocity ( amplitude) brought about by the driving vibration is increased. Therefore, it is possible to further improve the sensitivity.

It is preferable that the detecting piezoelectric/ electrostrictive element is formed in an integrated manner on an approximately entire surface of the first plate-shaped section. This embodiment is advantageous in the case of the current-detecting system, because it is possible to accumulate a large amount of electric charge.

It is preferable for the vibration gyro sensor constructed as described above that the first plate-shaped section has, on its back surface, a plurality of recesses, and the detecting piezoelectric/electrostrictive elements as defined above are formed in an array of islands at positions on a front surface of the first plate-shaped section corresponding to the plurality of recesses. In this embodiment, the strength is decreased at the portions of the first plate-shaped section at which the recesses are formed. Therefore, when the first plate-shaped section is deformed by the Coriolis force, large strain is generated at the portions at which the recesses are formed as compared with other portions at which no recess is formed. Accordingly, when the detecting piezoelectric/ electrostrictive elements are formed on the portions corresponding to the recesses, a large detection output can be obtained, and the sensitivity can be further improved.

It is preferable for the vibration gyro sensor constructed as described above that a thick-walled block section is provided in an integrated manner between the first plate-shaped section and the second plate-shaped section. In this embodiment, owing to the presence of the block section, it is possible to increase the strength of the boundary portion, which is advantageous from a viewpoint of improvement in reliability.

The support base may be constructed by a frame which is positioned outside the vibrators and separated by predetermined distances so that the vibrators are surrounded thereby. When the support base has the form of frame, it is possible to obtain a large degree of freedom for attachment, and the rigidity is excellent. Therefore, this embodiment is preferred from a practical viewpoint.

The driving means may be provided in an integrated manner between the respective second plate-shaped sections. Alternatively, the driving means may be provided in an integrated manner between the respective block sections. Further alternatively, the driving means may be provided in an integrated manner between the block section and the frame.

It is preferable that the vibration gyro sensor constructed as described above further comprises a reference means for performing feedback control so that the vibration of the driving means is constant. The reference means may be provided in an integrated manner between the respective second plate-shaped sections.

In still another embodiment, the driving means may be provided in an integrated manner on one plate-shaped section of the respective second plate-shaped sections, and the reference means may be provided on the other plate-shaped section.

In this embodiment, it is possible to adopt a structure in which a mediating section having a free end is provided in an integrated manner at an approximately central portion of a side surface of the support base facing to the vibrating section, the driving means is provided in an integrated manner between one of the second plate-shaped sections and the mediating section, and the reference means is provided in an integrated manner between the other second plate-shaped section and the mediating section.

It is also possible to adopt a structure in which a plurality of mediating sections each having a free end are provided in an integrated manner at positions of both ends in a widthwise direction of the support base facing to the vibrating sections, the driving means is provided in an integrated manner between one of the second plate-shaped sections and one of the mediating sections, and the reference means is provided in an integrated manner between the other second plate-shaped section and the other mediating section.

It is preferable for the vibration gyro sensor constructed as described above that an attachment section for fixing the support base is provided in an integrated manner on a surface opposite to a surface of the support base on which the second plate-shaped sections are formed, a fifth plate-shaped section, which is thin-walled in a widthwise direction of the support base, is provided in an integrated manner between the support base and the attachment section, and a tuning fork is constructed by at en least the support base and the vibrators. In this embodiment, the fifth plate-shaped section functions as a support rod for supporting the tuning fork. Therefore, it is easy to discriminate necessary modes for the vibration gyro sensor from unnecessary modes, and it is possible to improve the detection accuracy.

It is preferable for the vibration gyro sensor constructed as described above that the attachment section is constructed by an attachment frame which is positioned outside the tuning fork and separated by predetermined distances therefrom so that the tuning fork is surrounded thereby. In this embodiment, it is possible to improve the detection accuracy. Further, this embodiment is preferred, for example, from viewpoints of the degree of freedom for attachment and rigidity, because the attachment section is provided as the attachment frame.

In the embodiment provided with the attachment frame as described above, it is possible to adopt a structure in which, a support section is provided in an integrated and bridged manner so that a pair of inner wall surfaces of the attachment frame, which extend along the extending direction of the vibrators, are bridged by the support section facing to the vibrators disposed thereover, and the fifth plate-shaped section is provided in an integrated manner between the support section and the support base.

In this embodiment, even when the length of the fifth plate-shaped section is elongated, the entire length of the sensor is not changed until within a certain range. Therefore, it is possible to elongate the fifth plate-shaped section, and it is possible to realize further improvement in detection accuracy.

In still another aspect, the present invention makes it possible to advantageously construct and realize a combined sensor by using those provided with the attachment frame, of the vibration gyro sensors described above, wherein a second attachment frame integrated with the attachment frame is provided adjacent to the attachment frame, and another sensor having a function different from that of the vibration gyro sensor is supported in an integrated manner in the second attachment frame.

Especially, the conventional vibration gyro sensor merely realizes an element having only one function. However, when an additional sensor having another function is provided by utilizing the attachment frame as described above, it is possible to easily provide a combined sensor or an integrated sensor which not only functions as the vibration gyro sensor, but also simultaneously realizes another function.

In still another aspect, the present invention lies in a method for producing a vibration gyro sensor, comprising the steps of stacking and integrating at least a substrate layer and a thin plate layer composed of green sheets, followed by firing to produce a fired product including, in an integrated manner, at least one or more vibrators each having a major axis extending in a certain direction, a support base extending in a direction perpendicular to the certain direction, for supporting the vibrator at one end, a frame having its frame surface parallel to a plane which includes the certain direction and the extending direction of the support base, for surrounding the vibrator and the support base, and at least one or more detecting sections attached between the support base and the frame; forming at least one or more piezoelectric/electrostrictive elements on at least the detecting sections in accordance with a film formation method; adjusting a resonance frequency for driving by applying a trimming treatment to a part of the vibrator; and adjusting a resonance frequency for detection by applying a trimming treatment to a part of the support base.

According to this method, it is possible to easily and highly reliably produce the vibration gyro sensor having the structure in which the support base and the vibrators are surrounded by the frame, and the support base is connected to the frame via the detecting sections. The resonance frequencies for driving and detection can be easily adjusted by trimming-treating a part of the vibrators and a part of the support base respectively. Therefore, this method is advantageous reducing the number of production steps.

It is preferable to use, as the vibration gyro sensor, a vibration gyro sensor comprising at least two of the vibrators supported in parallel to one another by the support base, and a driving means provided between the two vibrators for vibrating the respective vibrators in an excited manner in mutually opposite directions, wherein the driving means includes a third plate-shaped section which is more thin-walled in its direction of height than the vibrators and which is composed of the integrated fired product made of ceramics together with the vibrators, and a driving piezoelectric/electrostrictive element formed on the third plate-shaped section.

It is preferable that the adjustment for the resonance frequency for driving is performed by applying a trimming treatment to a thin-walled first projection protruding in an integrated manner from a free end of the vibrator, and the adjustment for the resonance frequency for detection is performed by applying a trimming treatment to thin-walled second projections protruding in an integrated manner from both ends of the support base in its longitudinal direction. In this embodiment, the resonance frequency for driving can be adjusted by applying the trimming treatment (excising treatment) to the first projection, and the resonance frequency for detection can be adjusted by applying the trimming treatment (excising treatment) to the second projection. Namely, the resonance frequencies for driving and detection can be independently adjusted respectively. Therefore, it is possible to avoid the inconvenience that the resonance frequency for detection is affected by adjustment for the resonance frequency for driving.

It is preferable that the adjustment of the resonance frequency for driving is performed by applying a trimming treatment to the third plate-shaped section in its widthwise direction, and the adjustment for the resonance frequency for detection is performed by applying a trimming treatment to the first plate-shaped section of the detecting section in its widthwise direction.

This embodiment lies in the method in which the resonance frequencies for driving and detection are adjusted by changing spring constants of the first and third plate-shaped sections, rather than that the resonance frequencies for driving and detection are adjusted by changing masses of the vibrators and the support base. Therefore, it is unnecessary to form the first and second projections at the free ends of the vibrators and at the both ends of the support base in the longitudinal direction respectively. Accordingly, the production steps can be simplified. Further, since the regions to be subjected to the trimming treatment are thin-walled, the resonance frequency can be easily adjusted. Unlike the method in which the resonance frequency is adjusted by changing the mass, the resonance frequency for driving and the resonance frequency for detection can be adjusted completely independently.

It is preferable that the resonance frequency for detection is adjusted after the resonance frequency for driving is adjusted.

BRIEF DESCRIPTION OF THE DRAWINGS

FIG. 24 schematically shows a perspective view illustrating an exemplary structure of projections used to adjust the resonance frequency in the vibration gyro sensor according to the fifteenth embodiment.

FIG. 40 schematically shows a perspective view illustrating a twenty-ninth preferred embodiment of the vibration gyro sensor according to the present invention.

FIG. 48 shows a cross-sectional view taken along a line B—B shown in FIG. 47.

FIG. 69 schematically shows a perspective view illustrating a fifty-third preferred embodiment of the vibration gyro sensor according to the present invention.

FIG. 70A shows a cross-sectional view taken along a line C—C shown in FIG. 69.

FIG. 70B shows a cross-sectional view taken along a line D—D shown in FIG. 69.

FIG. 70C shows a cross-sectional view taken along a line E—E shown in FIG. 69.

FIG. 72 schematically shows a perspective view illustrating a fifty-fifth preferred embodiment of the vibration gyro sensor according to the present invention.

DETAILED DESCRIPTION

Figure 1:
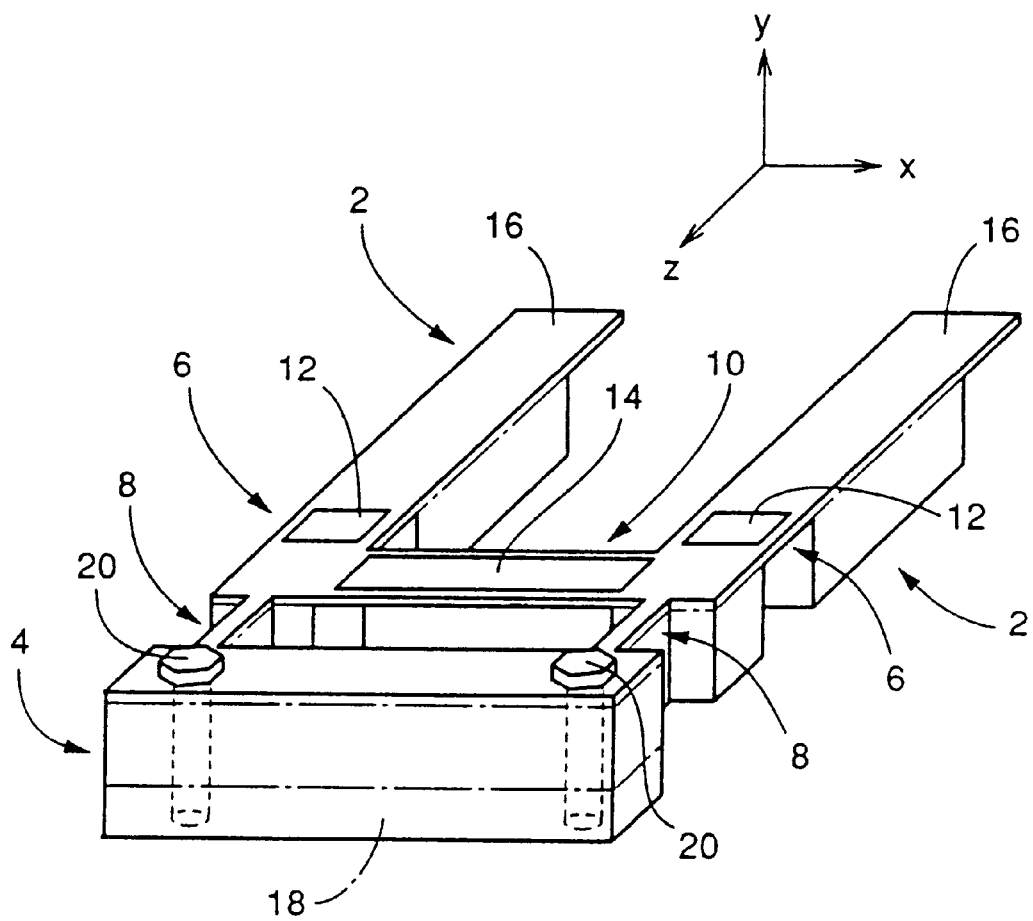
FIG. 1 schematically shows a perspective view illustrating a first preferred embodiment of the vibration gyro sensor according to the present invention.

The features of the present invention will be described in detail below with reference to various embodiments of the vibration gyro sensor illustrated in the drawings in order to more specifically and clearly describe the present invention.

At first, an embodiment (first embodiment) of the vibration gyro sensor according to the present invention is shown in FIG. 1. In this embodiment, two angular rod-shaped vibrators 2, 2 composed of a fired product of ceramics, each of which has a rectangular cross section and extends longitudinally, are arranged in parallel to one another and separated from each other by a predetermined spacing distance. The two vibrators 2, 2 are connected in an integrated manner at their proximal ends to a rectangular angular rod-shaped support base 4 composed of a fired product of ceramics respectively so that the vibrators 2, 2 are supported by the support base 4. Each of the vibrators 2, 2 includes a first plate-shaped section 6 to serve as a detecting section which is formed in an integrated manner with its thin-walled region disposed fairly close to the support base 4 and with its principal surface extending in a direction of arrangement of the vibrators 2, 2. Each of the vibrators 2, 2 has its proximal end region to serve as a thin-walled second plate-shaped section 8 which has its width thinner than a width of the vibrator 2 and has its principal surfaces extending in a direction perpendicular to the first plate-shaped section 6. The vibrators 2, 2 are connected in an integrated manner to the support base 4 via the second plate-shaped sections 8, 8. The two vibrators 2, 2 are connected to one another in an integrated manner at their regions located between the first plate-shaped sections 6, 6 and the second plate-shaped sections 8, 8 respectively via a third plate-shaped section 10 which is more thin-walled than the vibrators 2, 2 and has its principal surface parallel to the principal surfaces of the first plate-shaped sections 6, 6. Namely, the two vibrators 2, 2, the support base 4, the first plate-shaped sections 6, 6, the second plate-shaped sections 8, 8, and the third plate-shaped section 10 are constructed by an integrated fired product made of ceramics, thus giving an integrated structure.

Figure 2:
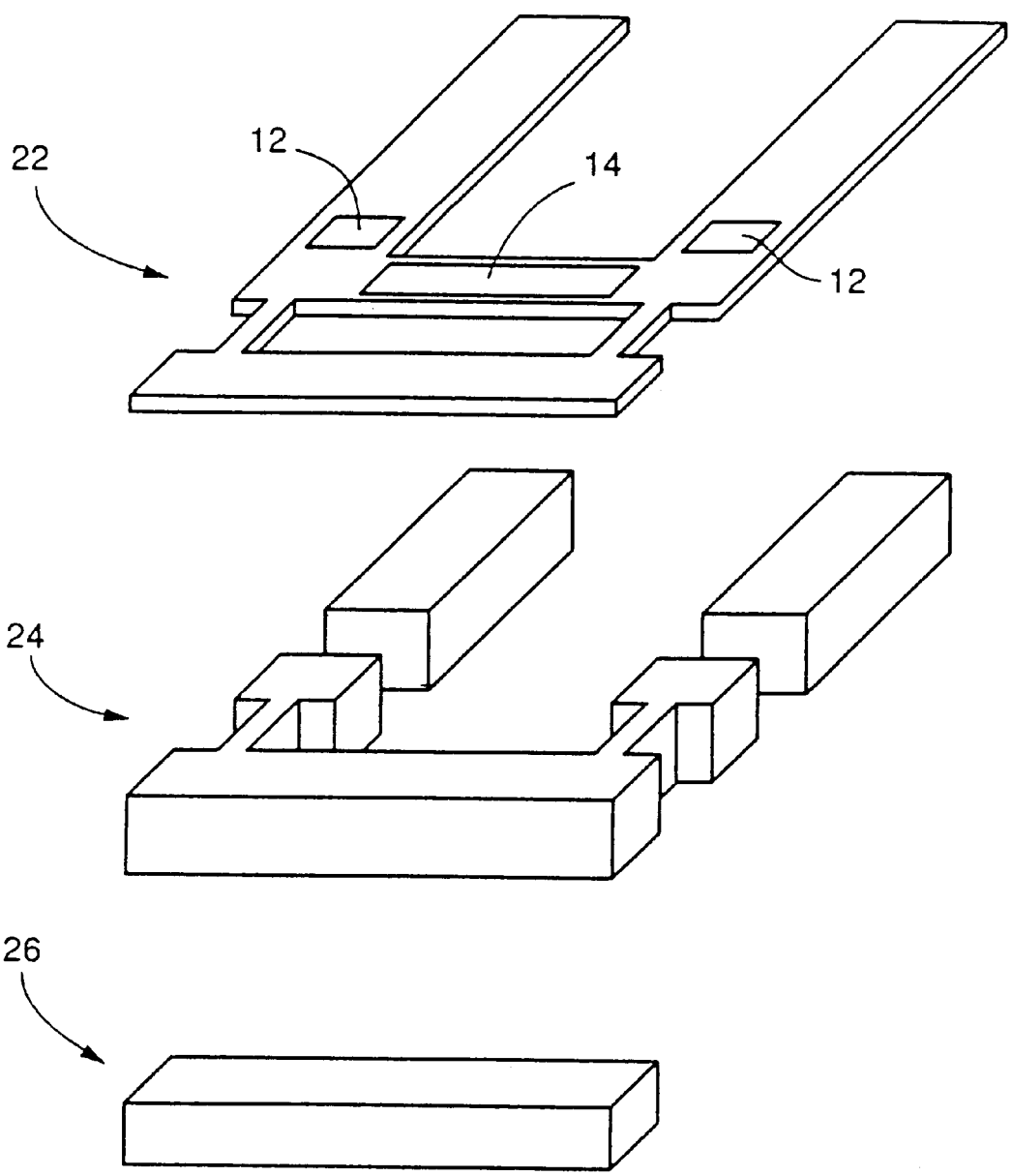
FIG. 2 schematically shows an exploded perspective view illustrating the vibration gyro sensor shown in FIG. 1.

Namely, as shown in FIG. 2, the vibration gyro sensor, which is constructed by the integrated fired product of ceramics as described above, can be grasped as an integrated stacked structure comprising a thin plate layer 22, a substrate layer 24, and a spacer layer 26. Accordingly, the first plate-shaped sections 6, 6 and the third plate-shaped section 10 are given by the thin plate layer 22, while the vibrators 2, 2 and the second plate-shaped sections 8, 8 are given by stacking and integrating the thin plate layer 22 and the substrate layer 24. Further, the support base 4 is given by stacking and integrating the thin plate layer 22, the substrate layer 24, and the spacer layer 26.

Figure 3:
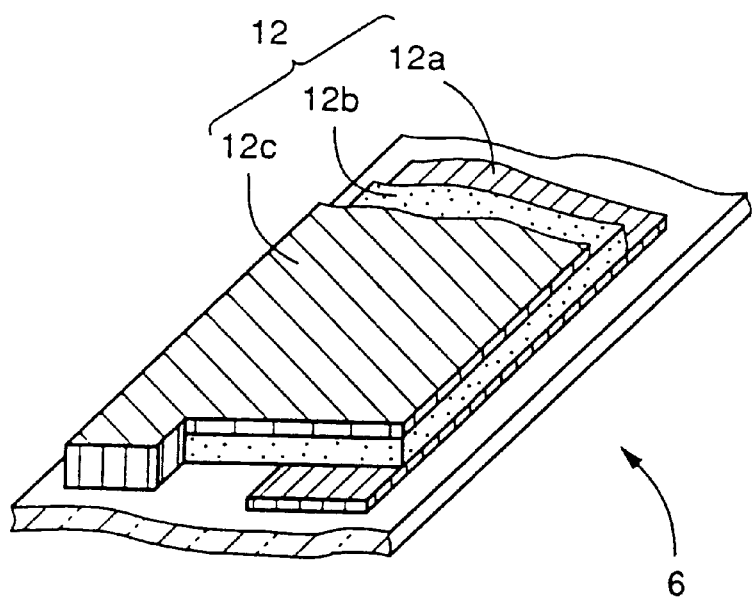
FIG. 3 schematically shows a partial perspective view illustrating, in a magnified manner, a portion of a first plate-shaped section of the vibration gyro sensor shown in FIG. 1.

Detecting piezoelectric/electrostrictive elements 12, 12 are formed in an integrated manner on the thin-walled first plate-shaped sections 6, 6 formed on the respective vibrators 2, 2, in accordance with a known film formation method respectively. As shown in FIG. 3 with magnification, the detecting piezoelectric/electrostrictive element 12 is directly formed on the first plate-shaped section 6 in a form in which a thin film-shaped lower electrode 12a, a piezoelectric/electrostrictive layer 12b, and an upper electrode 12c are stacked and integrated with each other. The detecting piezoelectric/electrostrictive elements 12, 12 detect vibration or displacement induced in the vibrators 2, 2 in a direction perpendicular to the arrangement plane of the two vibrators 2, 2. A driving piezoelectric/electrostrictive element 14 which serves as a driving means is formed in an integrated manner on the third plate-shaped section 10, and is constructed in the same manner as the detecting piezoelectric/electrostrictive elements 12, 4 12, in accordance with the known film formation method. When the driving piezoelectric/electrostrictive element 14 is operated, the two vibrators 2, 2 are subjected to bending vibration in their arrangement plane in mutually opposite directions, i.e., in directions to make mutual approach and separation in the x axis direction.

Thin-walled excisable sections 16, 16 are provided at forward ends of the respective vibrators 2, 2 on a side opposite to the connecting section with respect to the support base 4, and the excisable sections 16, 16 extend in an integrated manner therefrom. The excisable sections 16, 16 may be easily trimmed by means of, for example, laser machining and ultrasonic machining. The upper surface of the support base 4 is flush with the upper surfaces of the vibrators 2, 2, and the support base 4 has a shape with its thickness which is thicker than that of the vibrators 2, 2. Accordingly, the lower surface of the support base 4 is located at a position lower than the vibrators 2, 2. Namely, the support base 4 includes, in an integrated manner, a spacer section 18 corresponding to the spacer layer 26 shown in FIG. 2. The support base 4 is thicker than the vibrators 2, 2 by a thickness of the spacer section 18. When the vibration gyro sensor is attached at the portion of the support base 4 to a flat attachment plane in the vertical direction by the aid of bolts 20, the vibrators 2, 2 do not suffer interference from the attachment plane, owing to the presence of the spacer section 18 as described above.

Therefore, the vibration gyro sensor having the structure as described above is operated as follows. Namely, the third plate-shaped section 10 undergoes deformation by operating the driving piezoelectric/electrostrictive element 14. Accordingly, the two vibrators 2, 2 are subjected to excited vibration (bending vibration) in mutually opposite directions in the x axis direction, in other words. In directions to make mutual approach and separation in the rectangular coordinate system composed of the x, y, z axes shown in FIG. 1. In such a state, when the rotational force about the z axis acts on the vibrators 2, 2, the Coriolis force acts in the y axis direction on the vibrators 2, 2 on the basis of the angular velocity about the z axis. Accordingly, the Coriolis force allows the vibrators 2, 2 to make vibration in mutually opposite directions in the y axis direction. The bending vibration of the vibrators 2, 2 in the y axis direction as described above is detected as an electromotive force (voltage) by the aid of the detecting piezoelectric/electrostrictive elements 12, 12.

As described above, the vibration gyro sensor is constructed as a whole by the integrated fired product made of ceramics. Therefore, there is no magnetic material such as the conventional elinvar alloy in the materials for constructing the vibration gyro sensor. For this reason, no problem occurs, i.e., the characteristics of the sensor are not affected by any ambient magnetic field. The detecting piezoelectric/electrostrictive elements 12, 12 and the driving piezoelectric/electrostrictive element 14 are directly formed in the integrated manner on the first plate-shaped sections 6, 6 and the third plate-shaped section 10 in accordance with the film formation method. No adhesive layer exists at all between the elements and the plate-shaped sections. Therefore, the problem of decreased in sensitivity, which would be otherwise caused by the absorption of stress brought about by such an adhesive layer, is effectively eliminated.

It is a matter of course that the deformation is advantageously caused by the operation of the driving piezoelectric/electrostrictive element 14, owing to the fact that the driving piezoelectric/electrostrictive element 14 to serve as an actuator is formed in the integrated manner on the thin-walled third plate-shaped section 10. Further, the respective vibrators 2, 2 are connected in the integrated manner to the support base 4 via the thin-walled second plate-shaped sections 8, 8, and the second plate-shaped sections 8, 8 are provided as the thin plate sections having their principal surfaces which extend in the direction (y axis direction) perpendicular to the direction (x axis direction) of vibration of the vibrators 2, 2. Accordingly, the rigidity in the direction of vibration is effectively decreased, making it possible to easily cause vibration. Thus large displacement is obtained by the driving operation effected on the vibrators 2, 2 by the driving piezoelectric/electrostrictive element 14. Especially, when the ratio of the width (thickness) to the height of the second plate-shaped section 8 is made small, it is possible to suppress vibration in the vertical direction (y axis direction) which serves as a factor to decrease the sensitivity. Further, as for the region of arrangement of the detecting piezoelectric/electrostrictive element 12, the first plate-shaped section 6, on which the detecting piezoelectric/electrostrictive element 12 is formed in the integrated manner, is formed to be more thin-walled than the vibrator 2 so that its principal surface extends in the direction of vibration (x axis direction) of the vibrator 2. In other words, the principal surface is located within the vibration plane of the vibrator 2. Accordingly, large displacement is obtained when bending vibration is generated in the y axis direction which is the direction perpendicular to the x axis direction.

As described above, the easily bendable regions exist in any of the direction of detecting vibration (direction of the y axis) and the direction of driving vibration (direction of the x axis), and hence large displacement is obtained in any of the driving and detecting operations. Accordingly, the sensitivity of the vibration gyro sensor is improved. Especially, the first plate-shaped section 6, on which the detecting piezoelectric/electrostrictive element 12 is formed for giving the detecting section, is thin-walled to provide the structure so that the stress is concentrated. Thus a large output is obtained.

In the embodiment described above, there is provided the thin-walled excisable section 16 which extends in the integrated manner from the forward end of the vibrator 2. Therefore, the excisable section 16 is easily subjected to the trimming processing or machining such as the laser machining and the ultrasonic machining, making it easy to adjust the resonance frequency of the vibrator 2. The electrode area of the detecting piezoelectric/electrostrictive element 12 and the driving piezoelectric/electrostrictive element 14 can be easily changed by using a laser or the like, making it possible to easily adjust the electric characteristics thereof.

Further, the vibration gyro sensor according to this embodiment has the structure in which the third plate-shaped section 10, on which the driving piezoelectric/electrostrictive element 14 is provided, is formed in the integrated manner so that the two vibrators 2, 2 are bridged at their proximal ends. Accordingly, the vibration gyro sensor is also advantageous in that it is possible to effectively suppress the restriction of vibration of the vibrators 2, 2 by the third plate-shaped section 10.

Figure 4:
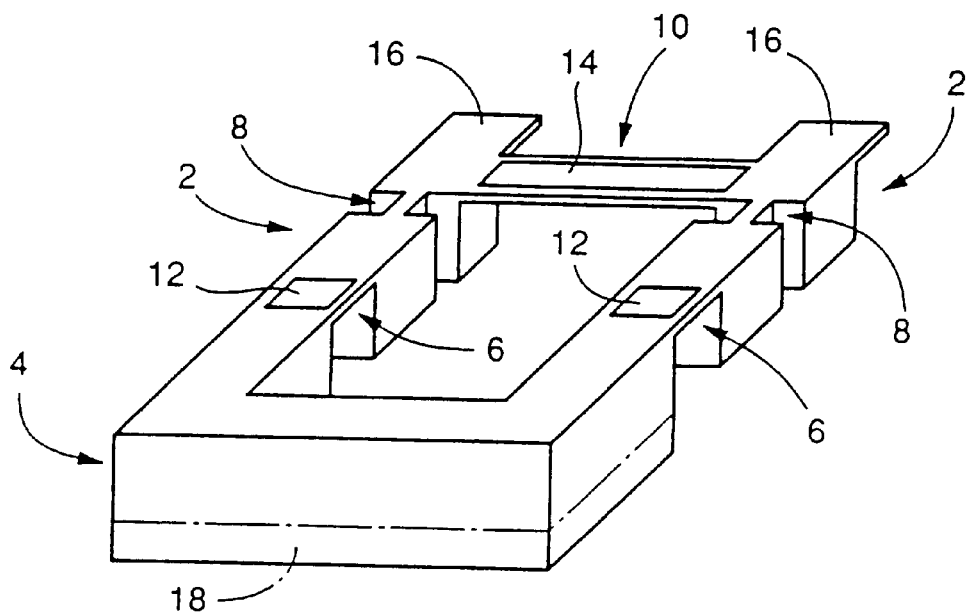
FIG. 4 schematically shows a perspective view illustrating a second preferred embodiment of the vibration gyro sensor according to the present invention.

The vibration gyro sensor according to the present invention may be embodied by various structures other than the structure described above, within a range without deviating from the gist or essential characteristics of the present invention. Representative embodiments are shown in FIG. 4 and following embodiments. The following embodiments will be explained only for their characteristic portions. The same or equivalent components or parts as those described in the first embodiment are designated by the same reference numerals, detailed explanation of which will be omitted.

A second embodiment shown in FIG. 4 has the following feature. Namely, vibrators 2, 2 are connected in an integrated manner to forward ends of U-shaped portions of a U-shaped support base 4 via thin-walled first plate-shaped sections 6, 6. Second plate-shaped sections 8, 8 are positioned at forward ends of the vibrators 2, 2. A thin-walled third plate-shaped section 10 for connecting the two vibrators 2, 2 in an integrated manner is formed in an integrated manner at positions located nearer to the forward ends as compared with the second plate-shaped sections 8, 8.

In the second embodiment, the third plate-shaped section 10 is provided at the position nearer to the forward ends of the vibrators 2, 2 as compared with the first embodiment. Therefore, although a problem arises in that the vibration of the vibrators 2, 2 tends to be restricted by the third plate-shaped section 10, it is still possible to obtain displacement which is larger than that obtained by the conventional vibration gyro sensor.

Figure 5:
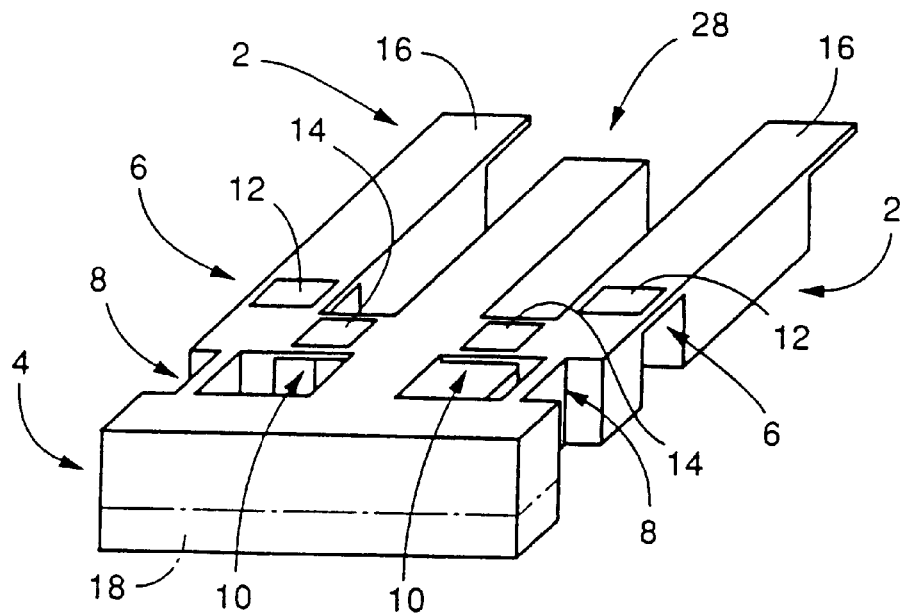
FIG. 5 schematically shows a perspective view illustrating a third preferred embodiment of the vibration gyro sensor according to the present invention.
Figure 6:
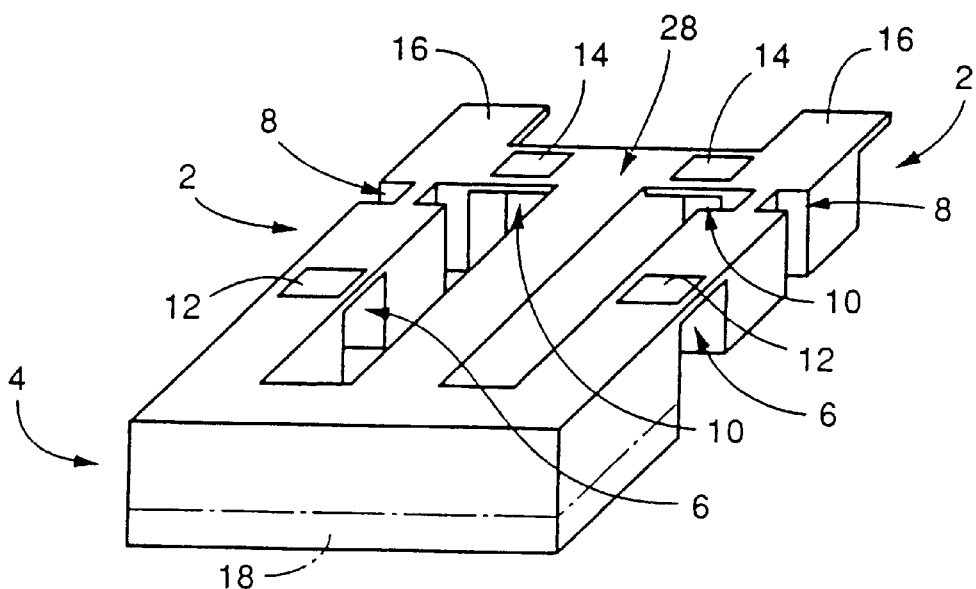
FIG. 6 schematically shows a perspective view illustrating a fourth preferred embodiment of the vibration gyro sensor according to the present invention.

Third and fourth embodiments shown in FIGS. 5 and 6 respectively have the following feature as compared with the first and second embodiments described above. Namely, the vibration gyro sensor is constructed by an integrated fired product made of ceramics having a structure in which an angular bar-shaped support bar 28, having a rectangular cross section, is arranged between two vibrators 2, 2 in parallel to the vibrators 2, 2.

Namely, the support bar 28 is disposed between the two vibrators 2, 2 at a position separated from the vibrators 2, 2 by a predetermined distance, and it is integrally connected to and supported by a support base 4. Thin-walled third plate-shaped sections 10, 10 are formed in an integrated manner between the support bar 28 and the vibrators 2, 2 disposed at the right and left thereof. Driving piezoelectric/electrostrictive elements 14, 14 are formed on the third plate-shaped sections 10, 10 respectively. The operation of the driving piezoelectric/electrostrictive elements 14, 14 causes the right and left vibrators 2, 2 to vibrate in mutually opposite directions respectively.

Figure 7:
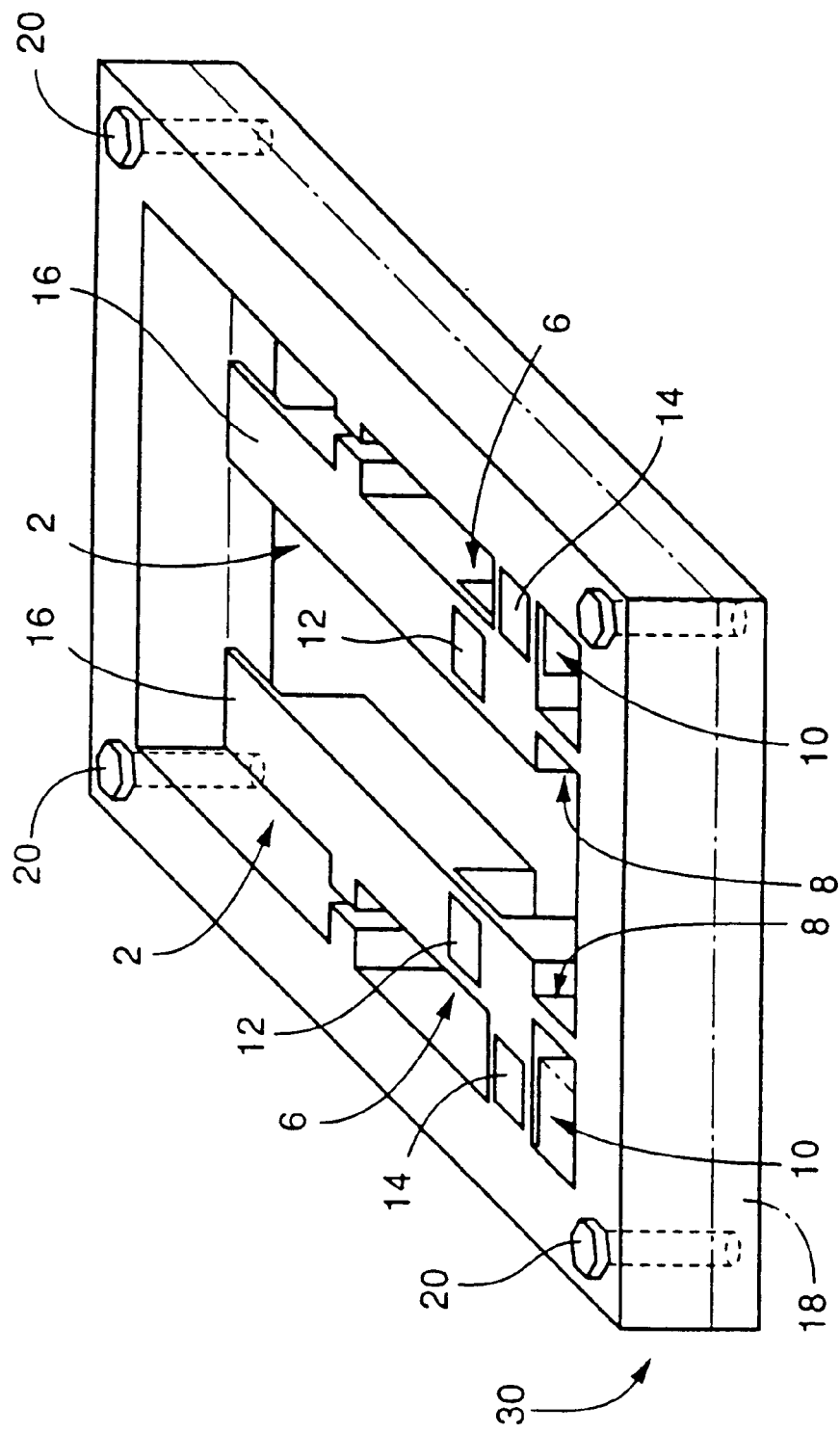
FIG. 7 schematically shows a perspective view illustrating a fifth preferred embodiment of the vibration gyro sensor according to the present invention.
Figure 8:
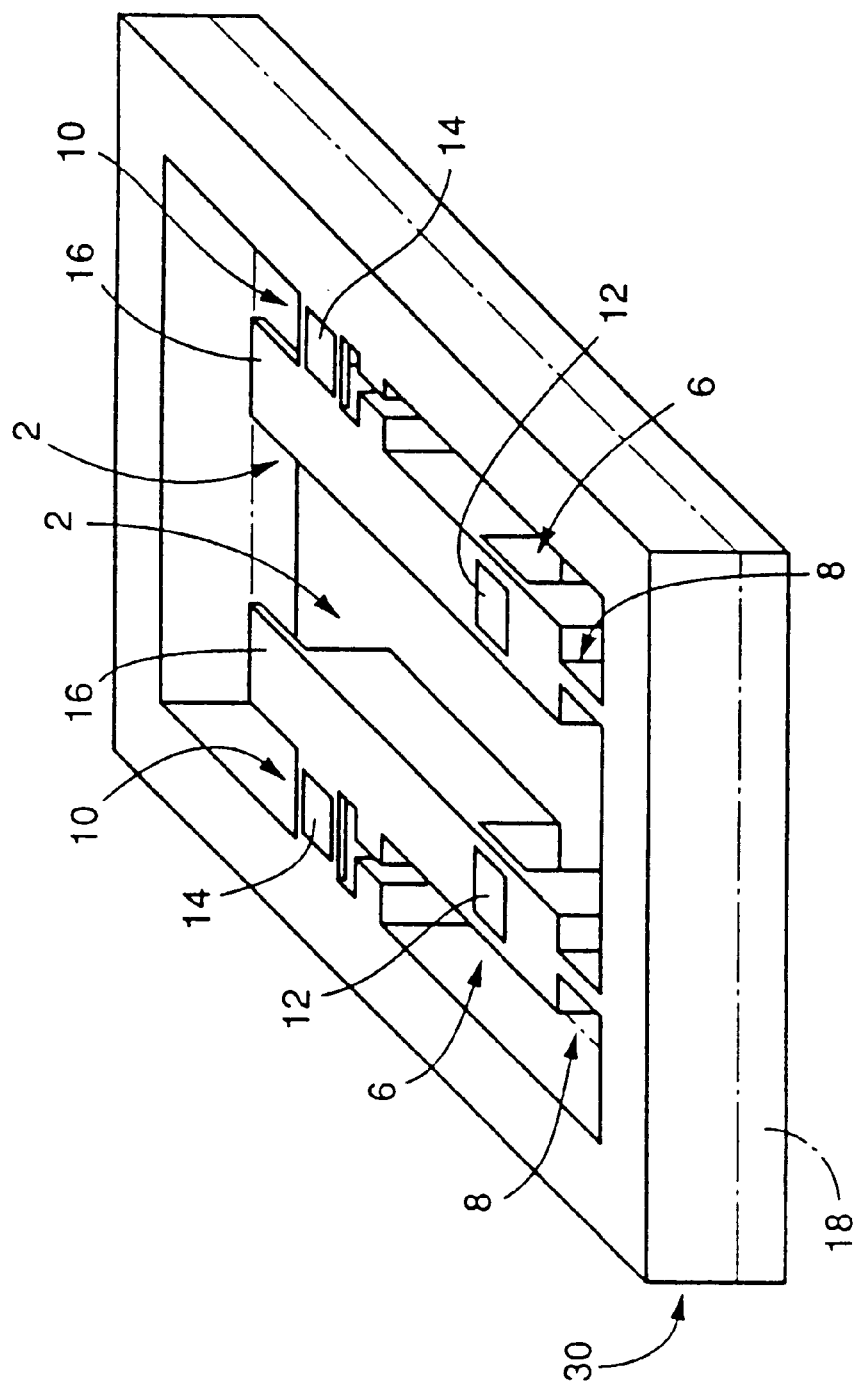
FIG. 8 schematically shows a perspective view illustrating a sixth preferred embodiment of the vibration gyro sensor according to the present invention.

FIGS. 7 and 8 show fifth and sixth embodiments having the following structure respectively. Namely, an integrated fired structure of ceramics is used in a state in which the support base 4 for supporting two vibrators 2, 2 at their proximal ends is constructed by an attachment frame 30 having a rectangular configuration. The two vibrators 2, 2 are accommodated in the attachment frame 30, and predetermined gaps are formed between the vibrators 2, 2 and the attachment frame 30.

Independent driving means (actuators) are provided in an integrated manner between the two vibrators 2, 2 and the attachment frame 30 which surrounds the two vibrators 2, 2 respectively. Namely, thin-walled third plate-shaped sections 10, 10 are formed in an integrated manner between the two vibrators 2, 2 and sides of the attachment frame 30 opposing thereto. Driving piezoelectric/electrostrictive elements 14, 14 are formed on the third plate-shaped sections 10, 10 respectively in accordance with the film formation method.

In the vibration gyro sensor having the structure as described above, the attachment frame 30 can be tightly fixed to a flat attachment plane via the spacer section 18 by the aid of bolts 20 or the like. Accordingly, the vibration gyro sensor is advantageous in that the degree of freedom is large concerning the place for installation.

Figure 9:
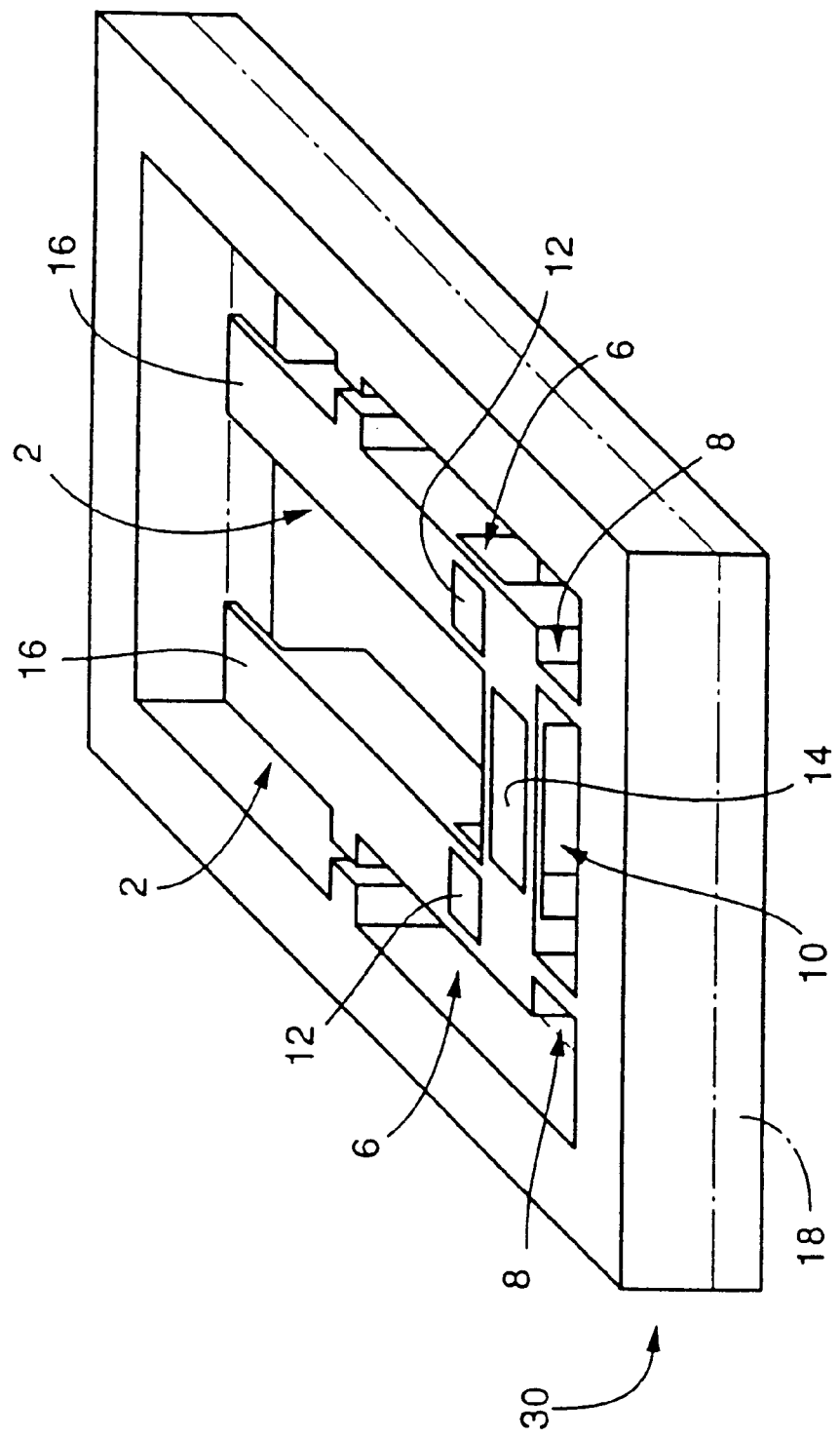
FIG. 9 schematically shows a perspective view illustrating a seventh preferred embodiment of the vibration gyro sensor according to the present invention.
Figure 10:
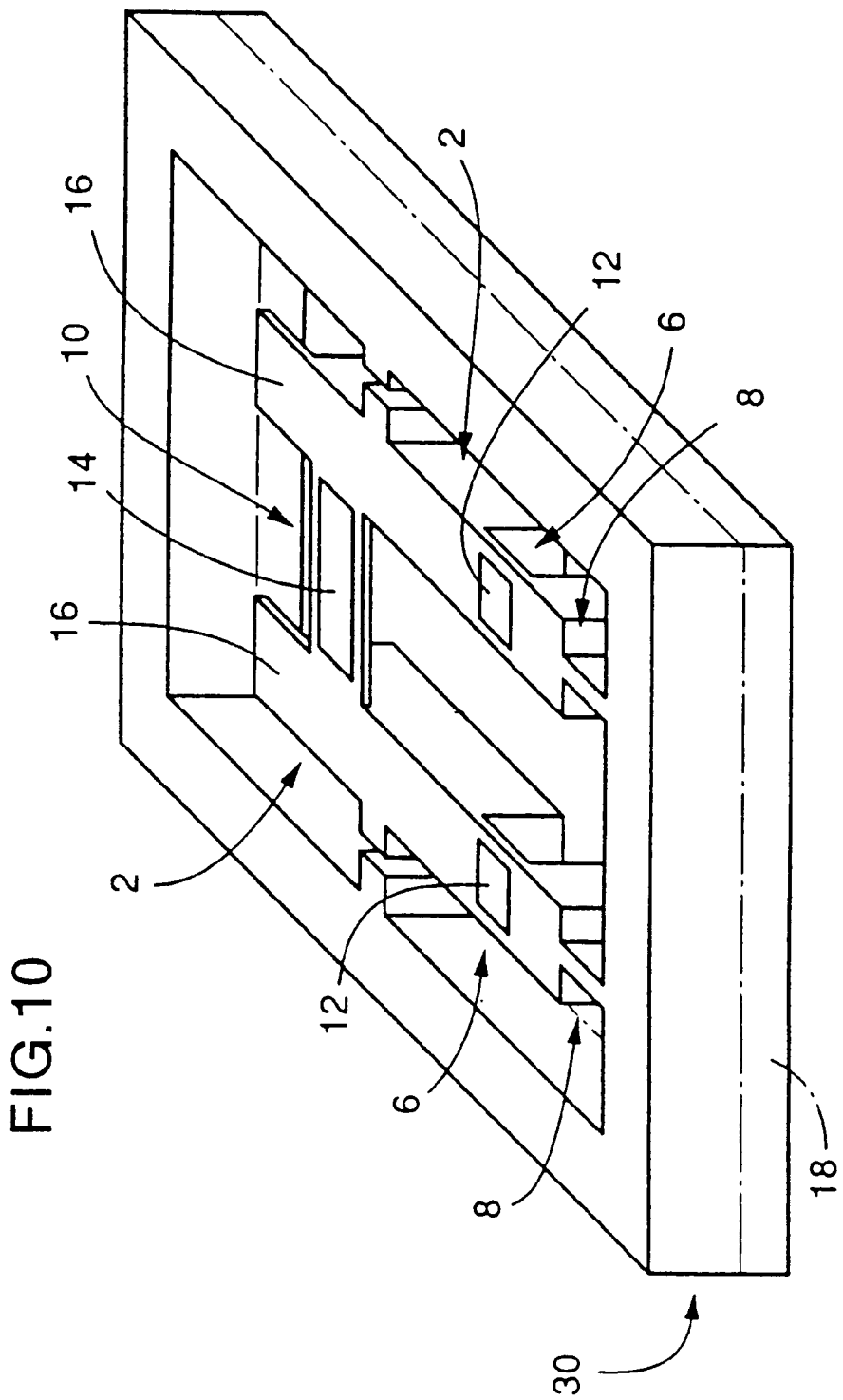
FIG. 10 schematically shows a perspective view illustrating an eighth preferred embodiment of the vibration gyro sensor according to the present invention.

Seventh and eighth embodiments shown in FIGS. 9 and 10 have similar structures as those described in the first and second embodiments concerning the support base 4. However, the support base 4 is provided as an integrated fired structure made of ceramics in a form of an attachment frame 30 having a rectangular configuration so that the two vibrators 2, 2 are surrounded thereby.

Namely, each of the vibration gyro sensors according to the seventh and eighth embodiments includes a driving means 10, 14 formed in an integrated manner between the two vibrators 2, 2 arranged in the attachment frame 30 having the rectangular frame structure. In these embodiments, the attachment frame 30 can be tightly fixed via the spacer section 18 in the same manner as described in the fifth and sixth embodiments. These embodiments are also advantageous in that the degree of freedom is large concerning the place for installation.

Figure 11:
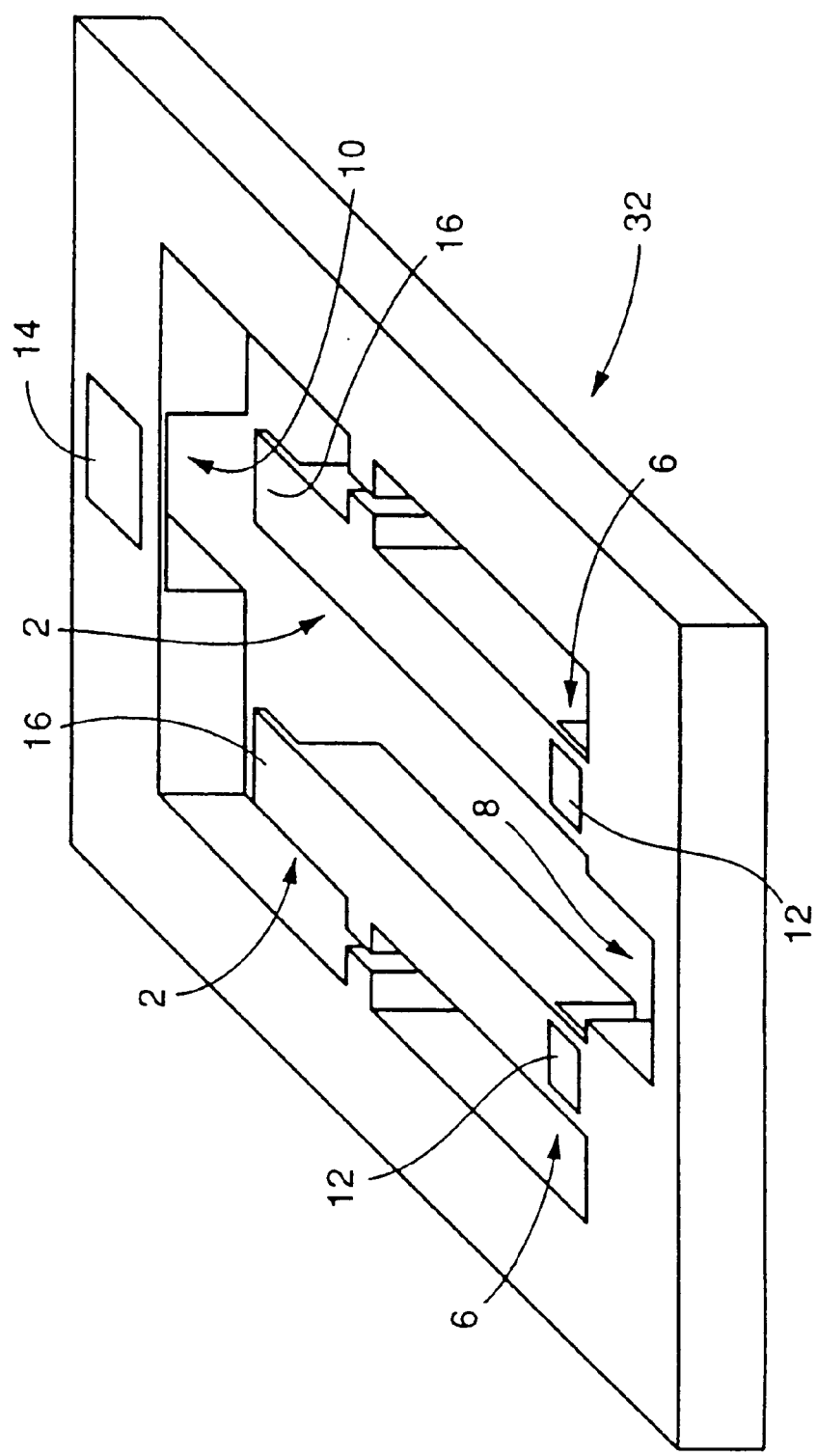
FIG. 11 schematically shows a perspective view illustrating a ninth preferred embodiment of the vibration gyro sensor according to the present invention.

FIG. 11 shows a ninth embodiment of the vibration gyro sensor according to the present invention. The vibration gyro sensor is constructed by an integrated fired product structure made of ceramics wherein a frame 32 having a rectangular configuration, which serves as a support base for supporting two vibrators 2, 2 at their proximal ends, is provided so that the two vibrators 2, 2 are surrounded thereby. A thin-walled second plate-shaped section 8, which is provided to lower the rigidity of the vibrators 2, 2 in the direction of vibration and facilitate vibration, is formed in an integrated manner at a portion of the frame 32 located between support regions for the two vibrators 2, 2 so that the second plate-shaped section 8 gives its principal surface extending in a direction perpendicular to the direction of vibration (arrangement plane for the vibrators 2, 2). A third plate-shaped section 10, which is more thin-walled than the frame 32, is formed at a portion of the frame 32 opposing to the region for forming the second plate-shaped section 8 so that the third plate-shaped section 10 has its principal surface parallel to the principal surfaces of the first plate-shaped sections 6, 6. A driving piezoelectric/electrostrictive element 14 is formed in an integrated manner on the third plate-shaped section 10 in accordance with the film formation method.

Therefore, in the vibration gyro sensor having the structure as described above, the operation of the driving piezoelectric/electrostrictive element 14 causes deformation of the third plate-shaped section 10 which induces bending vibration in the frame 32 by using the region of the second plate-shaped section 8 as a center. On the basis of the bending vibration, the two vibrators 2, 2 are vibrated in an excited manner.

Figure 12:
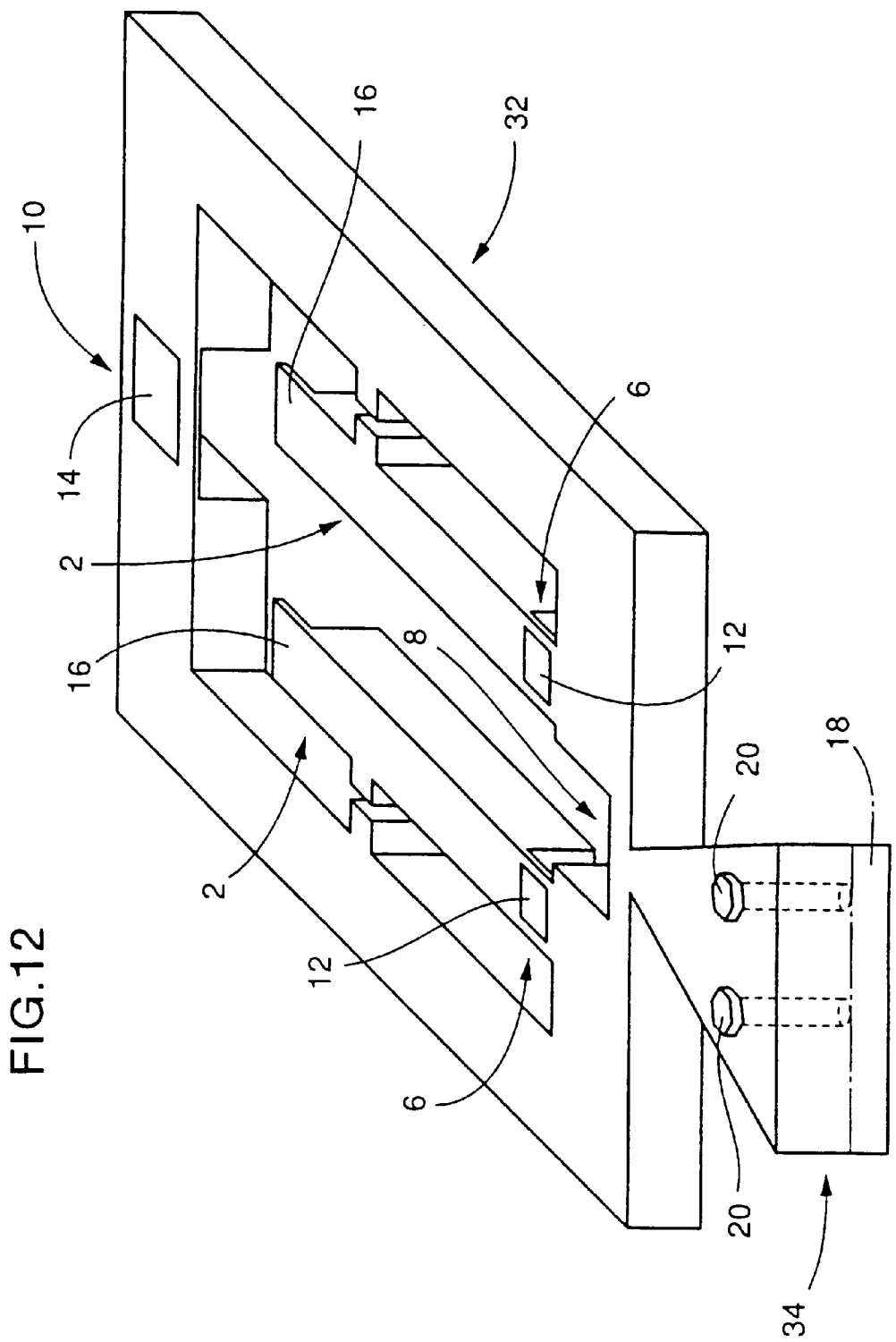
FIG. 12 schematically shows a perspective view illustrating a tenth preferred embodiment of the vibration gyro sensor according to the present invention.
Figure 13:
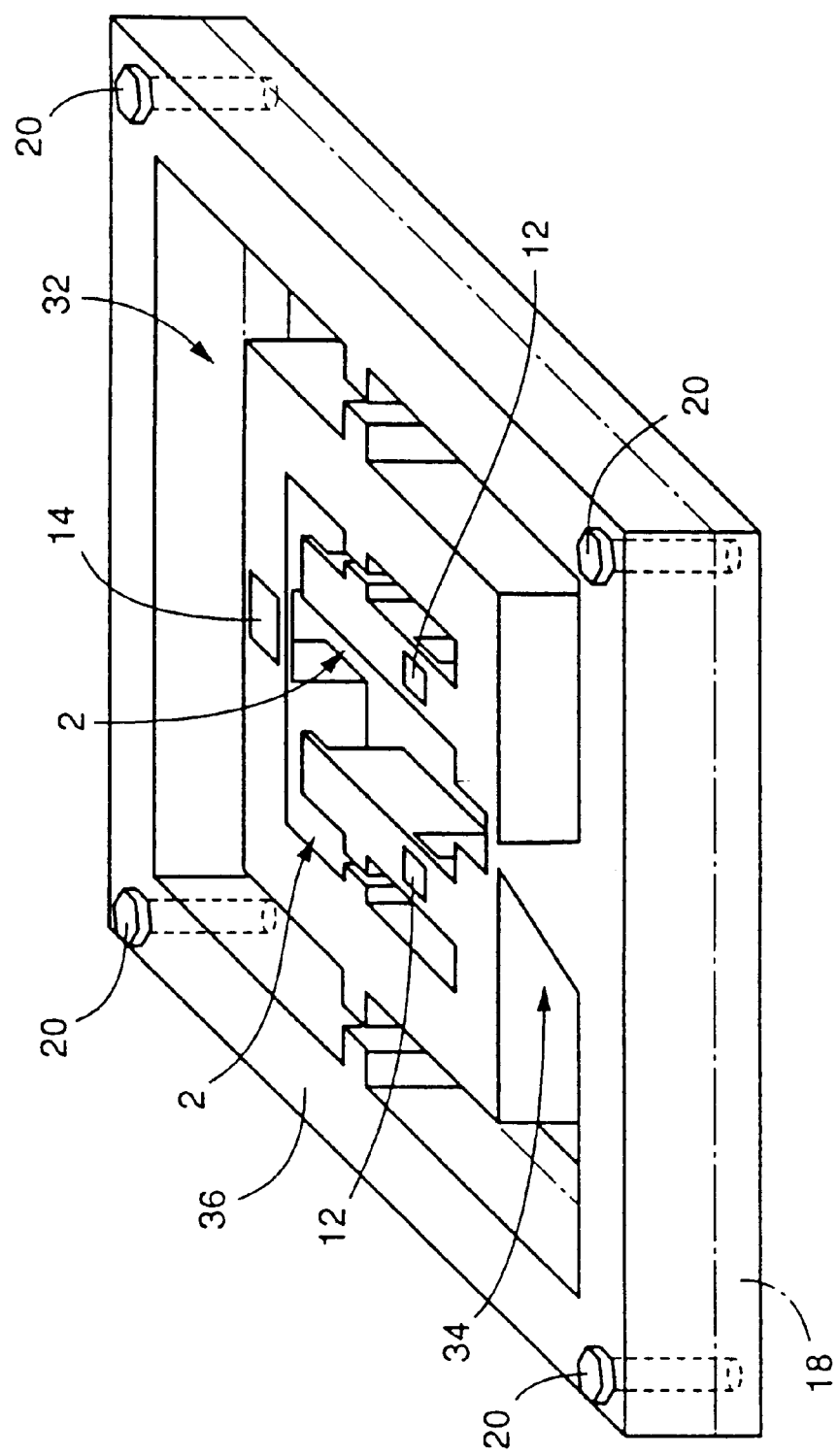
FIG. 13 schematically shows a perspective view illustrating an eleventh preferred embodiment of the vibration gyro sensor according to the present invention.

FIGS. 12 and 13 show tenth and eleventh embodiments respectively, each based on the use of an integrated fired product structure made of ceramics, as illustrative structures for facilitating fixation of the vibration gyro sensor shown in FIG. 11.

Of the tenth and eleventh embodiments, the embodiment shown in FIG. 12 includes an attachment section 34 for fixing a frame 32, which is provided in an integrated manner at an outer surface corresponding to a region for forming the second plate-shaped section 8 formed in the rectangular frame 32. Specifically, the attachment section 34 has a triangular configuration, and it is connected in an integrated manner to the outer surface of the second plate-shaped section 8 at an apex of the triangle. The connecting section, at which the attachment section 34 is connected to the second plate-shaped section 8, has a width (length in the lateral direction in FIG. 12) which is smaller than a width of the second plate-shaped section 8 (length in the lateral direction in FIG. 12). This is done since it is desirable to suppress, as small as possible, the restriction on the deformation of the second plate-shaped section 8, which would be caused by the connection of the attachment section 34. The vibration gyro sensor is fixed such that the attachment section 34 is fixed via the spacer section 18 by the aid of bolts 20 or the like.

The embodiment shown in FIG. 13 illustrates a modified embodiment of the attachment section 34 as described in the embodiment shown in FIG. 12. Namely, this embodiment has a structure including, in an integrated manner, an attachment frame 36 which is disposed outside the frame 32 and separated therefrom by predetermined distances so that the frame 32 for giving the vibration gyro sensor is surrounded. A tight fixing structure can be realized by fixing the attachment frame 36 having a rectangular frame configuration by using bolts 20.

Figure 14:
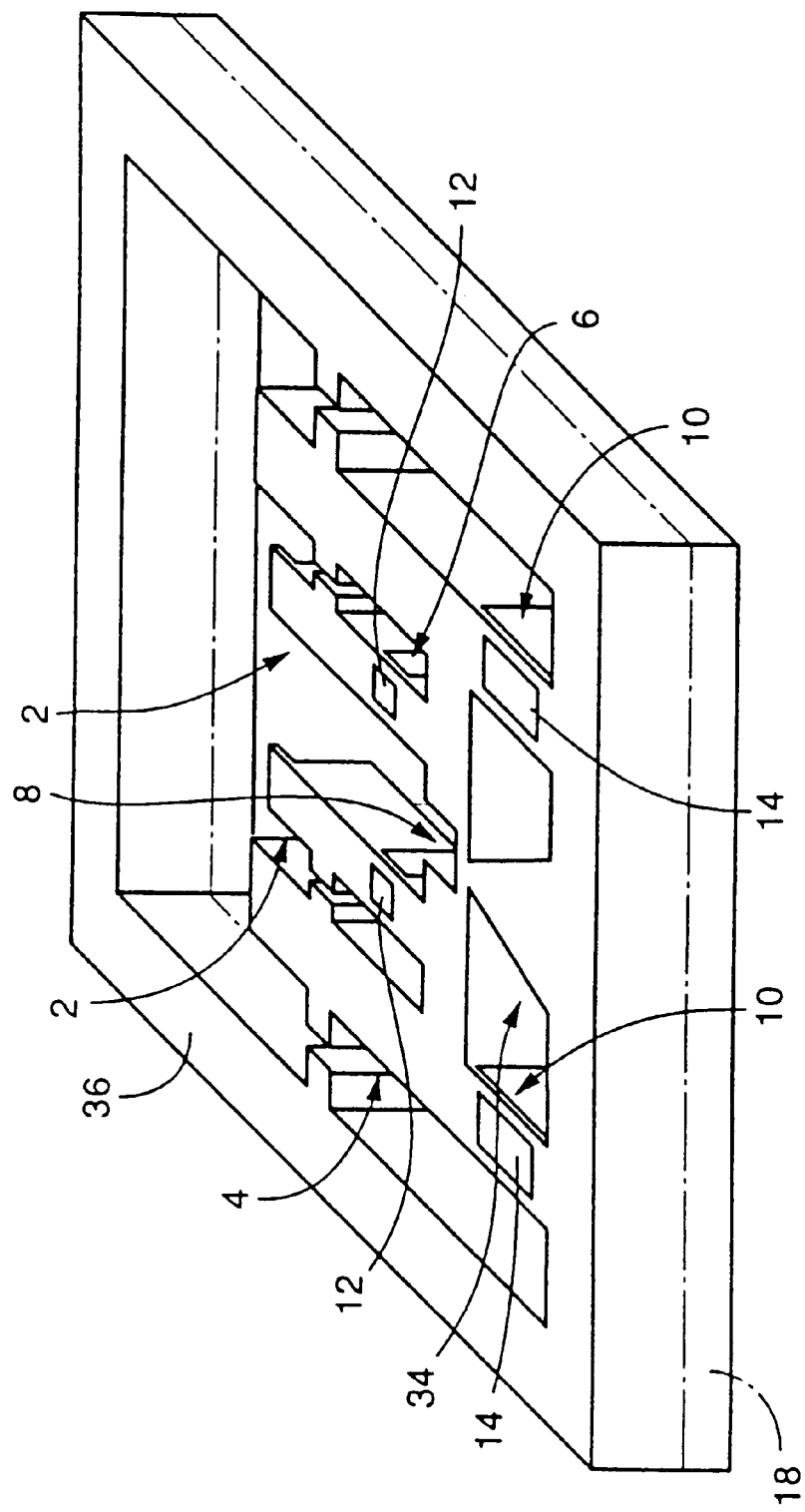
FIG. 14 schematically shows a perspective view illustrating a twelfth preferred embodiment of the vibration gyro sensor according to the present invention.

A twelfth embodiment of the vibration gyro sensor according to the present invention is shown in FIG. 14, based on the use of an integrated fired product structure made of ceramics. In this embodiment, a support base 4, which is provided for supporting two vibrators 2, 2 at their proximal ends, has an angular U-shaped configuration. A second plate-shaped section 8 is formed at a portion located between support regions of the support base 4 for the two vibrators 2, 2. An attachment section 34 for fixing the support base 4 is connected in an integrated manner to the outer surface of the second plate-shaped section 8, in the same manner as the embodiment shown in FIG. 13. An attachment frame 36 having a rectangular frame configuration, which is formed in an integrated manner together with the attachment section 34, is disposed outside the two vibrators 2, 2 and the support base 4, and separated by predetermined distances therefrom so that the two vibrators 2, 2 and the support base 4 are surrounded thereby.

Third plate-shaped sections 10, 10, which are more thin-walled than the attachment frame 36 and the support base 4, are formed in an integrated manner with their principal surfaces parallel to principal surfaces of first plate-shaped sections 6, 6 so that the third plate-shaped sections 10, 10 bridge the attachment frame 36 and portions of the support base 4 located on both sides of the second plate-shaped section 8, respectively. Driving piezoelectric/electrostrictive elements 14, 14 are formed in an integrated manner on the third plate-shaped sections 10, 10 in accordance with the film formation method.

In the vibration gyro sensor having the structure as described above, the portions of the support base 4 located on the both sides of the second plate-shaped section 8 are vibrated by the operation of the driving piezoelectric/electrostrictive elements 14, 14 as the driving means provided between the attachment section 36 and the portions of the support base 4. In turn, this causes, the vibrators 2, 2, to vibrate.

The use of the structure of the vibration gyro sensor according to the present invention as described above makes it possible to easily realize combination with other sensors. Specifically, the attachment frames 30, 36 shown in FIGS. 7 to 10 and FIGS. 13 and 14 may be utilized to provide a second attachment frame which is adjacent to the attachment frame and integrated with the attachment frame, as an integrated fired product structure made of ceramics. Another sensor, which has a function different from that of the vibration gyro sensor, is supported in an integrated manner in the second attachment frame. Thus it is possible to provide a combined sensor. An illustrative embodiment of such a combined sensor is shown in FIG. 15.

Figure 15:
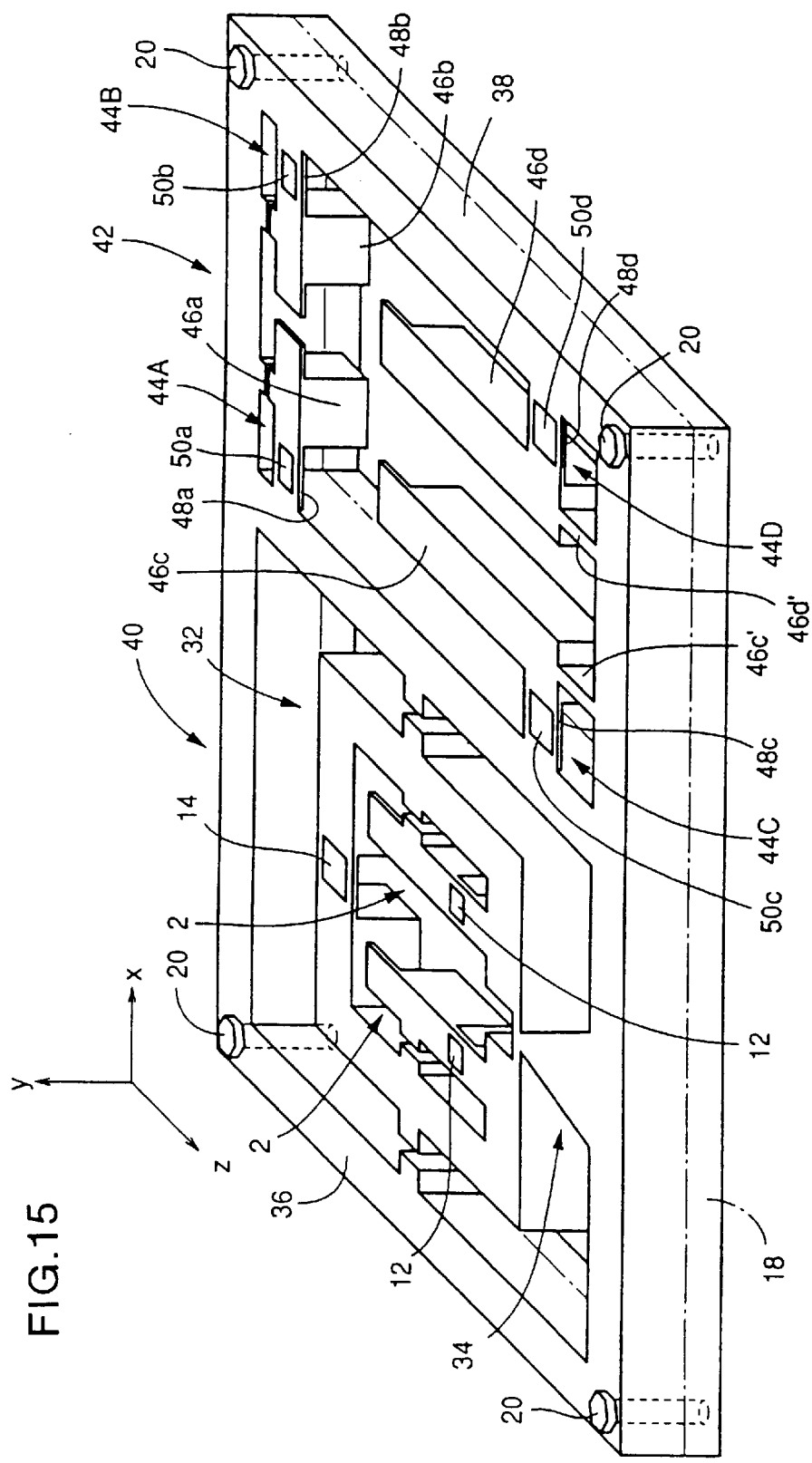
FIG. 15 schematically shows a perspective view illustrating a preferred embodiment of the combined sensor according to the present invention.

In a combined sensor illustrated in FIG. 15, a second attachment frame 38 integrated with an attachment frame 36 is provided as an integrated fired product structure made of ceramics, the second attachment frame 38 being adjacent to the attachment frame 36 of the vibration gyro sensor as shown in FIG. 13. An acceleration sensor, which has a function distinct from the vibration gyro sensor, is provided in an integrated manner in the second attachment frame 38. In FIG. 15, an acceleration sensor section 40 for detecting the angular velocity around the z axis, which constructs the vibration gyro sensor, is provided on the left side of the system. An acceleration sensor section 42 is formed in the second attachment frame 38 on the right side of the system. Namely, the acceleration sensor section 42 comprises a first sensor 44A and a second sensor 44B for detecting the acceleration in the y axis direction, and a third sensor 44C and a fourth sensor 44D for detecting the acceleration in the x axis direction.

Each of the first and second sensors 44A, 44B comprises a vibrator 46a, 46b as an inertial mass, a thin plate-shaped detecting section 48a, 48b for connecting the vibrator 46a, 46b to the attachment frame 38 in an integrated manner, and a detecting piezoelectric/electrostrictive element 50a, 50b formed on the detecting section 48a, 48b in an integrated manner in accordance with the film formation method and having the same or equivalent structure as that of the detecting piezoelectric/electrostrictive element 14 described above. Therefore, when an acceleration in the y axis direction is inputted, the detecting sections 48a, 48b are deformed respectively. A predetermined electromotive force (voltage) is outputted from the detecting piezoelectric/electrostrictive elements 50a, 50b on the basis of the deformation. The first and second sensors 44A, 44B also detect the acceleration in the x axis direction. When they are operated as described above, the two sensors make deformation in mutually opposite directions, the displacement being different from the displacement in an identical direction brought about when the acceleration in the y axis direction is applied. Accordingly, it is possible to achieve signal separation.

Each of the third and fourth sensors 44C, 44D also comprises a vibrator 46c, 46d as an inertial mass, a thin plate-shaped detecting section 48c, 48d for connecting the vibrator 46c, 46d to the attachment frame 38 in an integrated manner, a detecting piezoelectric/electrostrictive element 50c, 50d formed on the detecting section 48c, 48d in an integrated manner in accordance with the film formation method and having the same or equivalent structure as that of the detecting piezoelectric/electrostrictive element 12 described above, and a thin plate-shaped connecting section 46c', 46d' for connecting the vibrator 46c, 46d to the attachment frame 38 to support the vibrator 46c, 46d in a state in which the vibrator 46c, 46d is easily displaceable in the x axis direction. Therefore, when an acceleration in the x axis direction is inputted, a predetermined electromotive force (voltage) is outputted from the detecting piezoelectric/electrostrictive elements 50c, 50d on the basis of deformation of the two detecting sections 48c, 48d.

Figure 16:
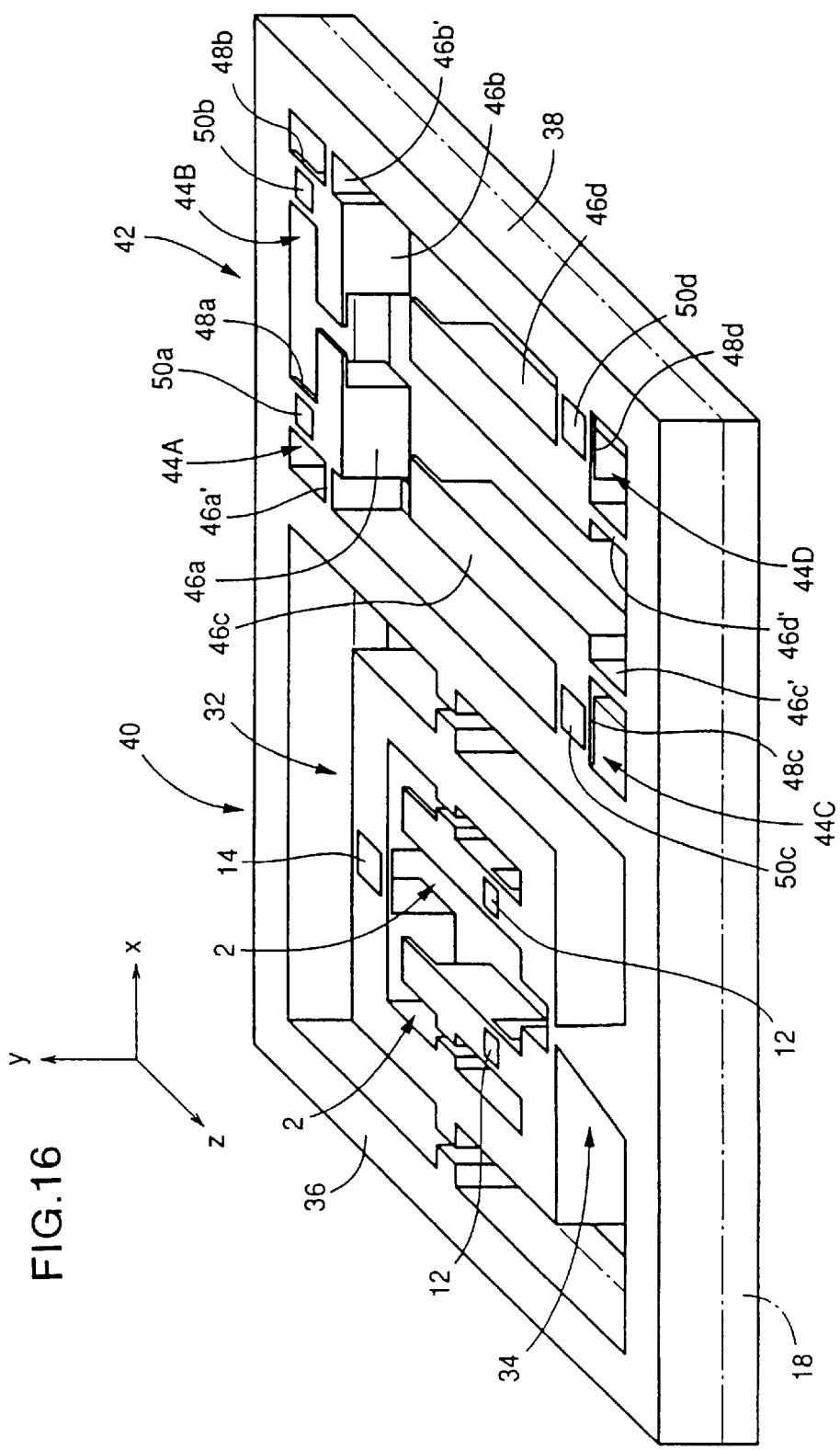
FIG. 16 schematically shows a perspective view illustrating another preferred embodiment of the combined sensor according to the present invention.

FIG. 16 shows another embodiment of the combined sensor having a different structure. A combined sensor disclosed in FIG. 16 has an integrated fired product structure made of ceramics in which an angular velocity sensor section 40 and an acceleration sensor section 42 are provided in an integrated manner, in the same manner as the combined sensor illustrated in FIG. 15. However, this embodiment is different from the foregoing embodiment in the structures of the first and second sensors 44A, 44B.

Namely, a connecting section 46a', 46b', which is provided for connecting, in an integrated manner, a vibrator 46a, 46b as an inertial mass of first and second sensors 44A, 44B to an attachment frame 38 respectively, is formed to have a thin plate configuration which is easily deformed in the z axis direction. Therefore, when an acceleration in the z axis direction is inputted, the vibrators 46a, 46b as the inertial masses give large displacement owing to the presence of the connecting sections 46a', 46b' to be easily deformed, on the basis of which a predetermined electromotive force (voltage) is outputted by the detecting piezoelectric/electrostrictive elements 50a, 50b.

Any of the vibration gyro sensors and the combined sensors according to the present invention is composed of the integrated fired product made of ceramics except for the piezoelectric/electrostrictive elements 12, 14 and 50a to 50d. Specifically, they are produced as follows.

At first, in the present invention, the main sensor body, which comprises, for example, the vibrators 2, the support base 4, the first to third plate-shaped sections 6, 8, 10, and the spacer section 18, is given by the integrated fired product made of ceramics. Those usable, without any problem, as materials for forming the integrated fired product of ceramics for providing the main sensor body include any of ceramic materials composed of oxide and any of ceramic materials composed of those other than oxide, provided that the material is an insulative material or a dielectric material having large mechanical strength, which can be subjected to a heat treatment at about 1400° C. as described later on, and which can be stacked and integrated with the piezoelectric/electrostrictive elements 12, 14 and other components without using any adhesive or the like. Especially, those preferably adopted include materials comprising a major component of at least any one of aluminum oxide, magnesium oxide, zirconium oxide, aluminum nitride, and silicon nitride, in order to obtain excellent operation characteristics, i.e., large displacement, large generated force, and quick response speed. In particular, it is recommended to use ceramic materials comprising, as a major component or major components, aluminum oxide and/or zirconium oxide. More specifically, those advantageously used include materials comprising a major component of zirconium oxide stabilized with at least one compound selected from the group consisting of yttrium oxide, ytterbium oxide, cerium oxide, calcium oxide, and magnesium oxide, because they exhibit features such as high toughness and high mechanical strength obtained even when the plate thickness is thin.

In order to stabilize zirconium oxide, the foregoing compound is preferably added in an amount of 1 mole % to 30 mole % in the case of yttrium oxide and ytterbium oxide, 6 mole % to 50 mole % in the case of cerium oxide, or 5 mole % to 40 mole % in the case of calcium oxide and magnesium oxide. Especially, it is desirable to use yttrium oxide as a stabilizer. In this case, yttrium oxide is desirably added in an amount of 1.5 mole % to 6 mole %, more preferably 2 mole % to 4 mole %. When yttrium oxide is added to zirconium oxide in the foregoing range of addition, the crystal phase is partially stabilized, thus giving excellent characteristics for the main sensor body.

When stabilized or partially stabilized zirconia is used for the thin plate layer, it is preferable to contain an auxiliary shown in the following table. An equivalent effect can be obtained even when the piezoelectric/electrostrictive element contains the following auxiliary.

TABLE

| Auxiliary | Preferable content range (% by weight) | More preferable range (% by weight) | Effect | Type of applicable electric field-induced strain |
| --- | --- | --- | --- | --- |
| alumina | 0.1 ~ 5.0 | 0.2 ~ 2.0 | *1 | lateral effect |
| titania | 0.1 ~ 5.0 | 0.2 ~ 2.0 | *2 | longitudinal effect |

*1: Stress itself or dispersion of stress of the piezoelectric layer is reduced by avoiding conglutination (fusion) of the thin plate layer and the piezoelectric layer.
*2: Sufficient joining is ensured between the thin plate layer and the piezoelectric layer to obtain high reliability.

As shown in FIG. 2, the integrated fired product of ceramics, which constructs the main sensor body as described above, advantageously comprises the thin plate layer 22, the substrate layer 24, and the spacer layer 26, if necessary. It is advantageous to contain silicon oxide (SiO, SiO$_2$) at least in the material to give the thin plate layer 22. The content of silicon oxide is preferably not less than 0.5% by weight and not more than 5% by weight, and especially desirably not less than 1% by weight and not more than 3% by weight. The content of silicon oxide in the ratio as described above is effective to avoid any excessive reaction with the piezoelectric/electrostrictive material during the heat treatment for the piezoelectric/electrostrictive element 12, 14 formed on the thin plate layer 22 so that good actuator characteristics or detection characteristics may be obtained.

Further, in order to obtain quick response and large displacement in the vibration gyro sensor and the combined sensor including the same according to the present invention, the thickness of the thin plate layer 22 on which the piezoelectric/electrostrictive elements are formed in the integrated manner, i.e., the thickness of the first plate-shaped section 6 and the third plate-shaped section 10 is generally not more than 50 μm, preferably not more than 30 μm, and more preferably not more than 15 μpm. On the other hand, the thickness of the substrate layer 24 is appropriately determined. However, the thickness of the substrate layer 24 is generally not less than 30 μm, preferably not less than 50 μm, and more preferably not less than 100 μm. In order to obtain large displacement and large generated force in the actuator or the detecting section, at least the thin plate layer 22 preferably has an average particle diameter of crystals of 0.1 to 2 μm. More preferably, the thin plate layer 22 is desirably composed of a ceramic material having an average particle diameter of not more than 1 μm.

Those usable to obtain the integrated fired product of ceramics to give the main sensor body comprising the thin plate layer 22 and the substrate layer 24 (and the spacer layer 26) as described above include, for example, a green sheet stacking method for stacking, in a state of green sheets, the thin plate layer 22, the substrate layer 24, and the spacer layer 26, as well as various molding methods based on the use of a mold, such as pressure molding, casting molding, and injection molding, and processing or machining methods for forming, for example, the vibrator 2, the support base 4, and the first to third plate-shaped sections 6, 8, 10 by means of machining processing such as ultrasonic, cutting, and grinding processing methods. Especially, it is preferable to use the green sheet stacking method since no processing stress remains, and the accuracy for the thickness of the thin plate layer 22 is high. The green sheet stacking method is preferably based on the use of first, second, and third green sheets for providing the thin plate layer 22, the substrate layer 24, and the spacer layer 26, respectively. A method is adopted, in which the first, second, and third green sheets are stacked by means of thermal adhesion under pressure, and then they are integrated with each other by firing. It is preferable to use, as the first to third green sheets, green sheets which at least have the same degree and percentage of contraction, upon firing integration.

The green sheet stacking method as described above specifically includes the following three methods. In the first method, the first to third green sheets are formed to have shapes corresponding to the thin plate layer 22, the substrate layer 24, and the spacer layer 26 shown in FIG. 2, respectively. They are stacked and integrated with each other, followed by firing, to produce an integrated fired product. After that, the piezoelectric/electrostrictive elements 12, 14 are formed in an integrated manner at predetermined regions on the thin plate layer 22 in accordance with the film formation method. In the second method, the first green sheet, to which the shape of the thin plate layer 22 is not given, is stacked and integrated with the second and third green sheets having shapes corresponding to the substrate layer 24 and the spacer layer 26, and they are fired to obtain an integrated fired product. After that, the shape of the thin plate layer 22 is realized by means of, for example, laser machining and ultrasonic machining, and then the piezoelectric/electrostrictive elements are formed in an integrated manner at predetermined regions on the thin plate layer 22. In the third method, the first green sheet, to which the shape of the thin plate layer 22 is not given, is used. The first green sheet is stacked and integrated with the second and third green sheets having shapes corresponding to the substrate layer 24 and the spacer layer 26, followed by firing to produce an integrated fired product. Piezoelectric/ electrostrictive elements are formed in an integrated manner at predetermined regions of fired product portions of the first green sheet. After that, the shape of the thin plate layer 22 is realized by means of, for example, laser machining and ultrasonic machining. Thus the objective vibration gyro sensor is obtained. Especially, the present invention advantageously adopts the last-mentioned third method in order to avoid deformation which would be caused by the heat treatment during formation of the piezoelectric/ electrostrictive elements. The shapes of the thin plate layer 22, the substrate layer 24, and the spacer layer 26 are preferably realized by using the method in which the green sheets are shaped to give such shapes, or by adopting, for example, laser machining, press working with a mold, and ultrasonic machining. Especially, the press working with a mold is advantageously used, because this method is excellent in mass production performance and integration performance.

Figure 17:
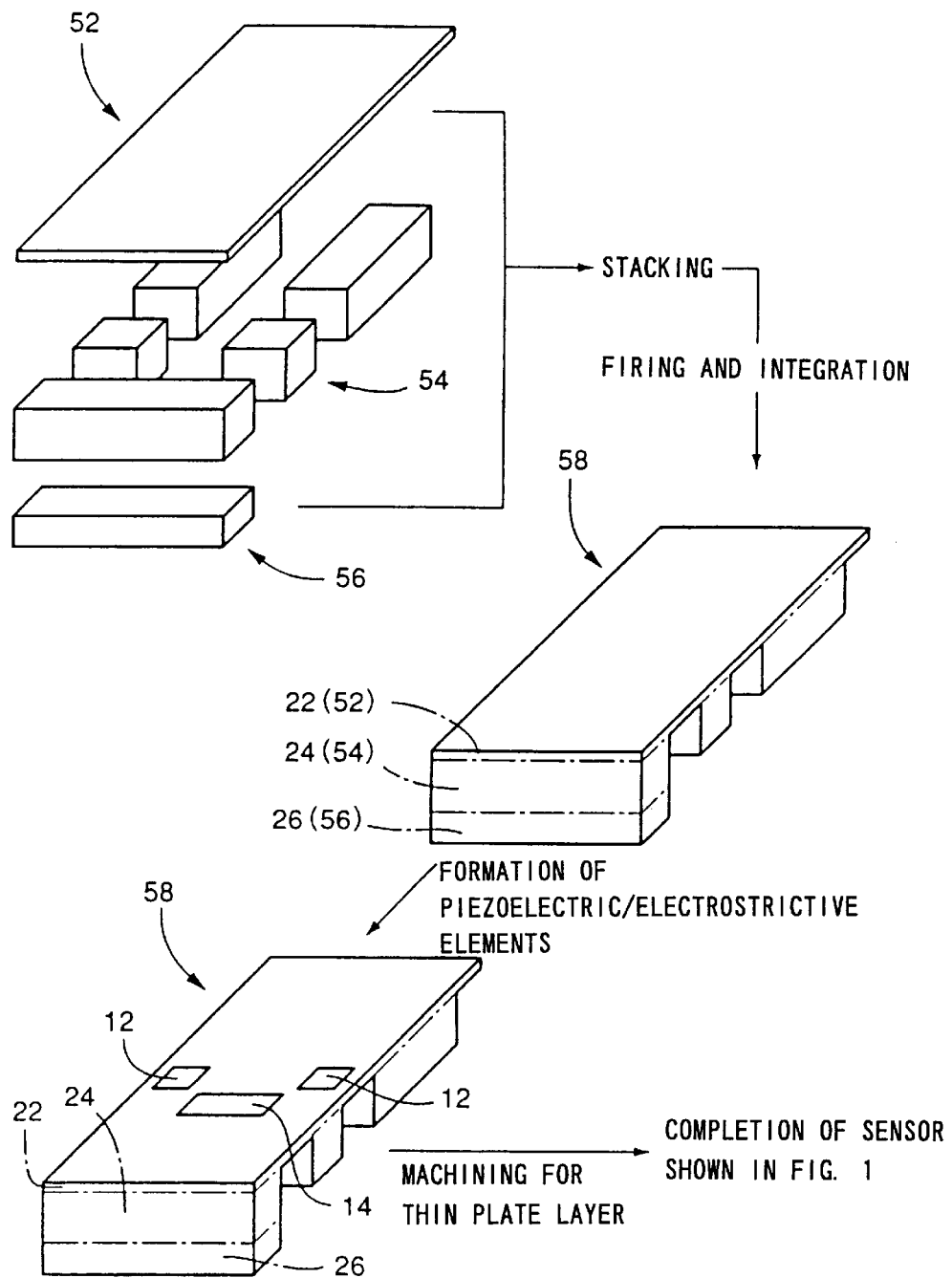
FIG. 17 schematically shows illustrative production steps for the vibration gyro sensor according to the first embodiment shown in FIG. 1.

FIG. 17 shows an example of the desirable production technique (third method) for the vibration gyro sensor in accordance with the green sheet stacking method as described above. In this procedure, a first green sheet 52 for giving the thin plate layer 22 is not processed into the shape of the thin plate layer 22 at all. The first green sheet 52 is merely used as one thin plate having a rectangular configuration. A second green sheet 54 for giving the substrate layer 24 is processed into the shape corresponding to the shape of the substrate layer 24. A third green sheet 56 for giving the spacer layer 26 is also processed into the shape corresponding to the shape of the spacer layer 26. The first, second, and third green sheets 52, 54, 56 are stacked, and then they are fired and integrated into one unit. After that, the piezoelectric/electrostrictive elements 12, 14 are formed in an integrated manner on the predetermined regions on the thin plate layer 22 of the obtained fired product 58 in accordance with the film formation method as described later on. Subsequently, cutting processing is applied to portions of the thin plate layer 22 of the integrated fired product 58 by means of, for example, laser machining or ultrasonic machining. Thus the vibration gyro sensor as shown in FIG. 1 is completed.

In the case of the second method based on the green sheet stacking method described above, the order of the step of forming the piezoelectric/electrostrictive elements 12, 14 and the step of processing the thin plate layer 22 is inverted, and the piezoelectric/electrostrictive elements 12, 14 are formed in an integrated manner. Thus the vibration gyro sensor as shown in FIG. 1 is completed.

In the green sheet stacking method in which the vibration gyro sensor is obtained by stacking the first, second, and third green sheets 52, 54, 56 as described above, it is extremely easy to form the thin plate-shaped excisable section 16 extending from the forward end of the vibrator 2 by considering the shape of the thin plate layer 22. After the vibration gyro sensor is produced, the resonance frequency is measured, and the excisable section 16 formed at the forward end of the vibrator 2 is cut (excised) by means of, for example, laser machining and ultrasonic machining, if necessary. Thus the resonant frequency can be finely adjusted with ease.

As clarified from FIGS. 2 and 17, the vibration gyro sensor shown in FIG. 1 is constructed such that the second green sheet 54 for giving the substrate layer 24 has a discontinuous structure of a form in which the portions for giving the vibrators 2, 2 are separated, because the first plate-shaped sections 6, 6 are formed by the thin plate layer 22 which is given by the first green sheet 52. For this reason, it is difficult to position such discontinuous sections. Further, there is an implicit problem that deformation tends to occur during the firing and the heat treatment performed when the piezoelectric/electrostrictive elements are formed. Therefore, a technique is preferably adopted, in which a continuous green sheet is prepared and used during stacking, and discontinuous sections as described above are formed after completion of the stacking and integration or the firing and integration. An example of such a technique is shown in FIG. 18.

Figure 18:
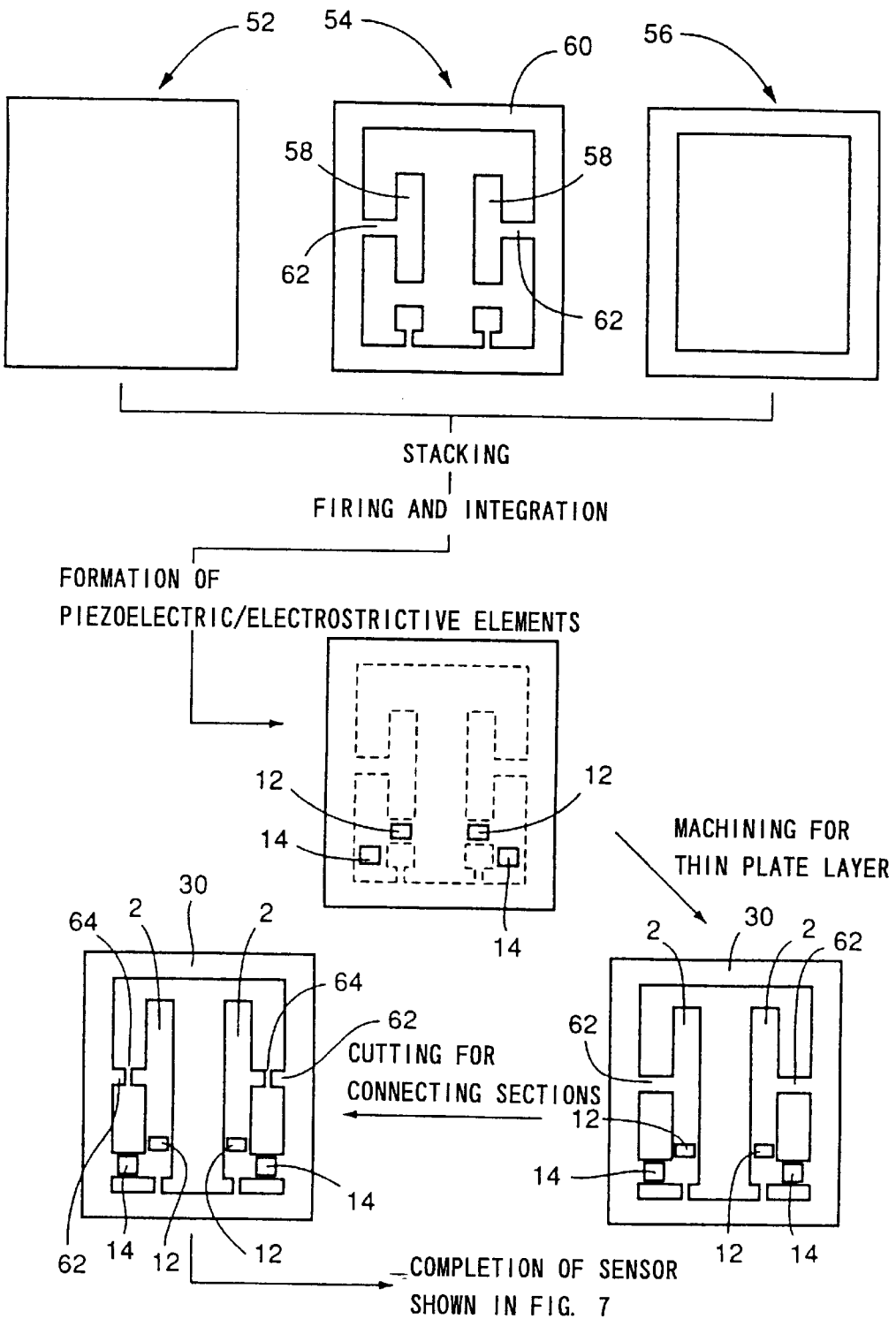
FIG. 18 schematically shows illustrative production steps for the vibration gyro sensor according to the fifth embodiment shown in FIG. 7.

Namely, FIG. 18 shows one of effective techniques to produce the vibration gyro sensor shown in FIG. 7. In this procedure, a second green sheet 54 for giving the substrate layer 24 is provided as a continuous sheet as shown in FIG. 18. Namely, sections 58, 58 for forming the vibrators 2, 2 are connected via connecting sections 62, 62 to a section 60 for forming the attachment frame 30, and thus the second green sheet 54 is used in a state including no discontinuous portion. The second green sheet 54 is stacked together with a first green sheet 52 and a third green sheet 56, and they are fired and integrated with each other. After that, the piezoelectric/electrostrictive elements 12, 14 are formed in an integrated manner thereon, followed by performing machining for the thin plate layer 22 given by the first green sheet 52. Simultaneously with the machining, or before or after the machining, the connecting sections 62, 62, which connect the vibrators 2, 2 and the attachment frame 30, are cut by means of, for example, laser machining or ultrasonic machining to cause separation from the attachment frame 30. When cut sections 64, 64 are formed from the connecting sections 62, 62, the vibrators 2, 2 are released from restriction by the attachment frame 30. Thus the vibration gyro sensor shown in FIG. 7 is completed.

The structure, in which any discontinuous section does not exist in the second green sheet 54 as described above, may be realized not only for the sensors having the structure which include the attachment frame 30, 36, 38 and the frame 32 so that the vibrators 2, 2 are surrounded as shown in FIGS. 7 to 16, but also for the sensors having the structure including the support bar 28 provided between the two vibrators 2, 2 as shown in FIGS. 5 and 6 such that connecting sections 62, 62 are formed between the vibrators 2, 2 and the support bar 28, and they are finally cut at the cut sections 64, 64.

In the production steps for the vibration gyro sensors and the combined sensors described above, the piezoelectric/electrostrictive elements 12, 14 are formed on the predetermined regions on the thin plate layer 22 as follows.

At first, in order to form the electrode films 12*a*, 12*c* and the piezoelectric/electrostrictive film 12*b* composed of respective materials on the predetermined regions on the thin plate layer 22, it is possible to appropriately adopt various known film formation methods including, for example, thick film methods such as screen printing, application methods such as dipping, and thin film methods such as ion beam, sputtering, vacuum vapor deposition, ion plating, CVD, and plating. However, there is no limitation thereto at all. In order to form the piezoelectric/electrostrictive film 12*b*, it is preferable to adopt techniques based on, for example, screen printing, dipping, and application. In these techniques, the film can be formed on the thin plate layer 22 by using a paste or a slurry comprising, as a major component, piezoelectric/electrostrictive ceramic particles, in which good operation characteristics can be obtained. When the piezoelectric/electrostrictive element 12, 14 is formed in accordance with the film formation method described above, the element can be integrated with the thin plate layer 22 without using any adhesive. Accordingly, the use of the film formation method is especially preferred because the reliability and the reproducibility are excellent, and it is easy to achieve integration. The shape of such a film is formed by means of pattern formation by using, for example, the screen printing method and the photolithography method. Alternatively, the pattern may be formed by removing unnecessary portions by using mechanical processing methods such as laser processing, slicing, and ultrasonic processing.

The shape of the film and the structure of the piezoelectric/electrostrictive element 12, 14 formed integrally on the predetermined region on the thin plate layer 22 in accordance with the film formation method are not limited at all, to which those hitherto known may be appropriately adopted. For example, other than the structure based on the use of the lateral effect of the electric field-induced strain as shown in FIG. 3, it is possible to appropriately adopt those having a structure based on the use of the longitudinal effect of the electric field-induced strain. No problem occurs concerning the shape of the film. The shape of the film may be any of polygonal configurations such as triangles and rectangles, circular configurations such as circles, ellipses, and rings, comb-shaped configurations, lattice-shaped configurations, and special configurations obtained by combining the foregoing configurations.

The respective films 12*a*, 12*b*, 12*c*, which are formed on the first and third plate-shaped sections 6, 10 given by the thin plate layer 22, may be heat-treated every time when each film is formed so that the integrated structure is established together with the respective plate-shaped sections. Alternatively, all of the films may be formed, and then they may be simultaneously heat-treated so that the respective films may be simultaneously joined with the plate-shaped section in an integrated manner. Incidentally, when the electrode film is formed by means of the thin film formation technique, the heat treatment is not necessarily indispensable to achieve integration in some cases.

As for the heat treatment temperature to integrate the films formed as described above and the plate-shaped section, a temperature of about 800° C. to 1400° C. is generally adopted, and preferably, a temperature within a range of 1000° C. to 1400° C. is advantageously selected. When the piezoelectric/electrostrictive film 12*b* is heat-treated, it is preferable to perform the heat treatment while controlling the atmosphere by using an evaporation source composed of a piezoelectric/electrostrictive material together so that the composition of the piezoelectric/electrostrictive film is not unstable at a high temperature.

The material for the electrode films 12*a*, 12*c* for constructing the piezoelectric/electrostrictive element, produced in accordance with the foregoing method, is not specifically limited, provided that the material is a conductor which can withstand the oxidizable atmosphere at a high temperature such as the heat treatment temperature and the firing temperature. For example, the material may be a simple substance such as a metal or an alloy, or the material may be a mixture of a metal or an alloy and an additive such as an insulative ceramic and glass. Further, no problem occurs when the material is a conductive ceramic. More appropriately, it is preferable to use electrode materials comprising major components of high melting point noble metals such as platinum, palladium, and rhodium, and alloys such as silver-palladium, silver-platinum, and platinum-palladium.

As for the mixture described above, it is desirable to use, as the ceramic to be added to the metal and the alloy, the same material as the material for constructing the first plate-shaped section and the third plate-shaped section or the piezoelectric/electrostrictive material described later on. The same material as the material for the plate-shaped section is preferably added in an amount of 5 to 30% by volume. The same material as the piezoelectric/electrostrictive material is preferably added in an amount of about 5 to 20% by volume. Especially, the mixture, which is obtained by mixing the metal or the alloy described above with the material for constructing the plate-shaped section and the piezoelectric/electrostrictive material, is advantageously used to form the objective electrode.

Figure 19:
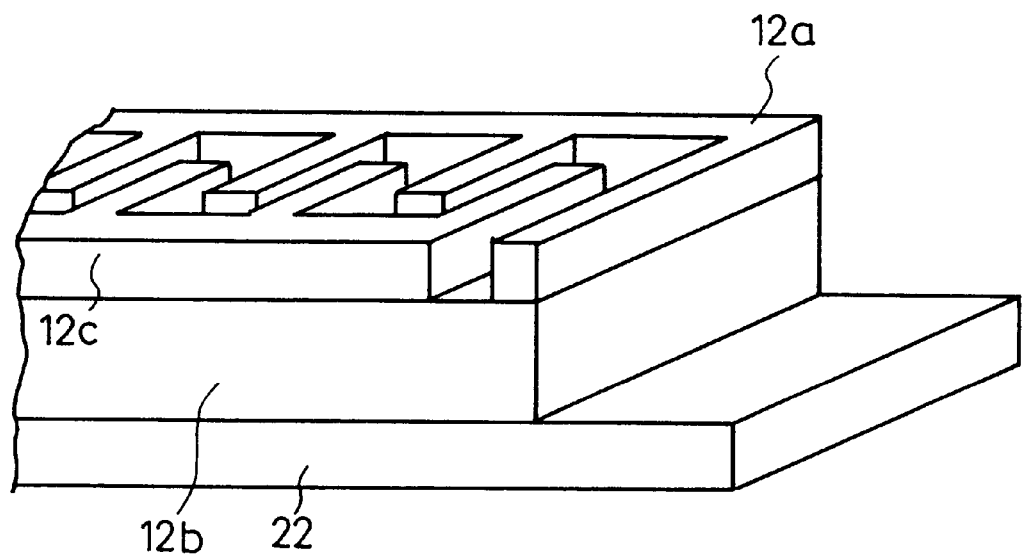
FIG. 19 shows a perspective view illustrating a magnified electrode structure of the type based on the use of the longitudinal effect of the electric field-induced strain.

The electrodes 12a, 12c, which are formed by using the material as described above, are allowed to have appropriate thicknesses depending on the use or application. As shown in FIG. 3, in the case of the type based on the use of the lateral effect of the electric field-induced strain, the electrode is generally formed to have a thickness of not more than 15 μm, and preferably not more than 5 μm. As shown in FIG. 19, in the case of the type based on the use of the longitudinal effect of the electric field-induced strain, the electrode is appropriately formed to have a thickness of not less than 3 μm, preferably not less than 10 μm, and more preferably not less than 20 μm.

Any material may be used as the piezoelectric/electrostrictive material to give the film-shaped piezoelectric/electrostrictive layer 12b for constructing the piezoelectric/electrostrictive elements 12, 14, provided that the material exhibits the electric field-induced strain such as the piezoelectric or electrostrictive effect. The material may be crystalline materials, or amorphous materials. No problem occurs when the material is any of semiconductor materials, dielectric ceramic materials, or ferroelectric ceramic materials. The material may be materials which require the polarization treatment, or materials which do not require the polarization treatment.

Specifically, those preferably used as the piezoelectric/electrostrictive material employed in the present invention include, for example, materials comprising a major component of lead zirconate titanate (PZT system), materials comprising a major component of lead magnesium niobate (PMN system), materials comprising a major component of lead nickel niobate (PNN system), materials comprising a major component of lead zinc niobate, materials comprising a major component of lead manganese niobate, materials comprising a major component of lead antimony stannate, materials comprising a major component of lead titanate, materials comprising a major component of barium titanate, and composite materials thereof. No problem occurs when the material comprising the major component of the PZT system is appropriately added with predetermined additives to give materials, for example, those of the PLZT system containing, as additives, oxides of lanthanum, barium, niobium, zinc, nickel, and manganese, or other types of compounds thereof.

It is desirable that the thickness of the piezoelectric/electrostrictive element 12, 14 constructed as described above is generally not more than 100 μm, preferably not more than 50 μm, and more preferably not more than 30 μm.

The present invention has been specifically described above on the basis of the several embodiments. However, the present invention should not be interpreted at all as one which is limited by the foregoing embodiments. It should be understood that various changes, modifications, and improvements may be added to the present invention on the basis of the knowledge of those skilled in the art without deviating from the scope of the present invention.

For example, in the illustrative respective embodiments, the spacer section 18 is provided, for example, for the support base 4, the attachment frame 30, 36, or the attachment section 34 so that the respective vibrators 2, 2 do not interfere with the attachment plane even when the vibrators 2, 2 makes vibration for detection. However, in some cases, it is unnecessary to provide such a spacer section 18 depending on the shape or the structure of the attachment plane.

In the illustrative embodiments, for example, the support base 4, the attachment frame 30, 36, or the attachment section 34 is fixed by using the bolts. However, it is also effective to glue and fix such components by using an adhesive. In this case, it is preferable to fix the entire lower surface of the spacer section 18 by using an adhesive. Those usable as the adhesive include, for example, those of the epoxy resin type, the acrylic resin type, the synthetic rubber type, the hot melt type, the cyanoacrylate type, and the polyurethane resin type.

Figure 20:
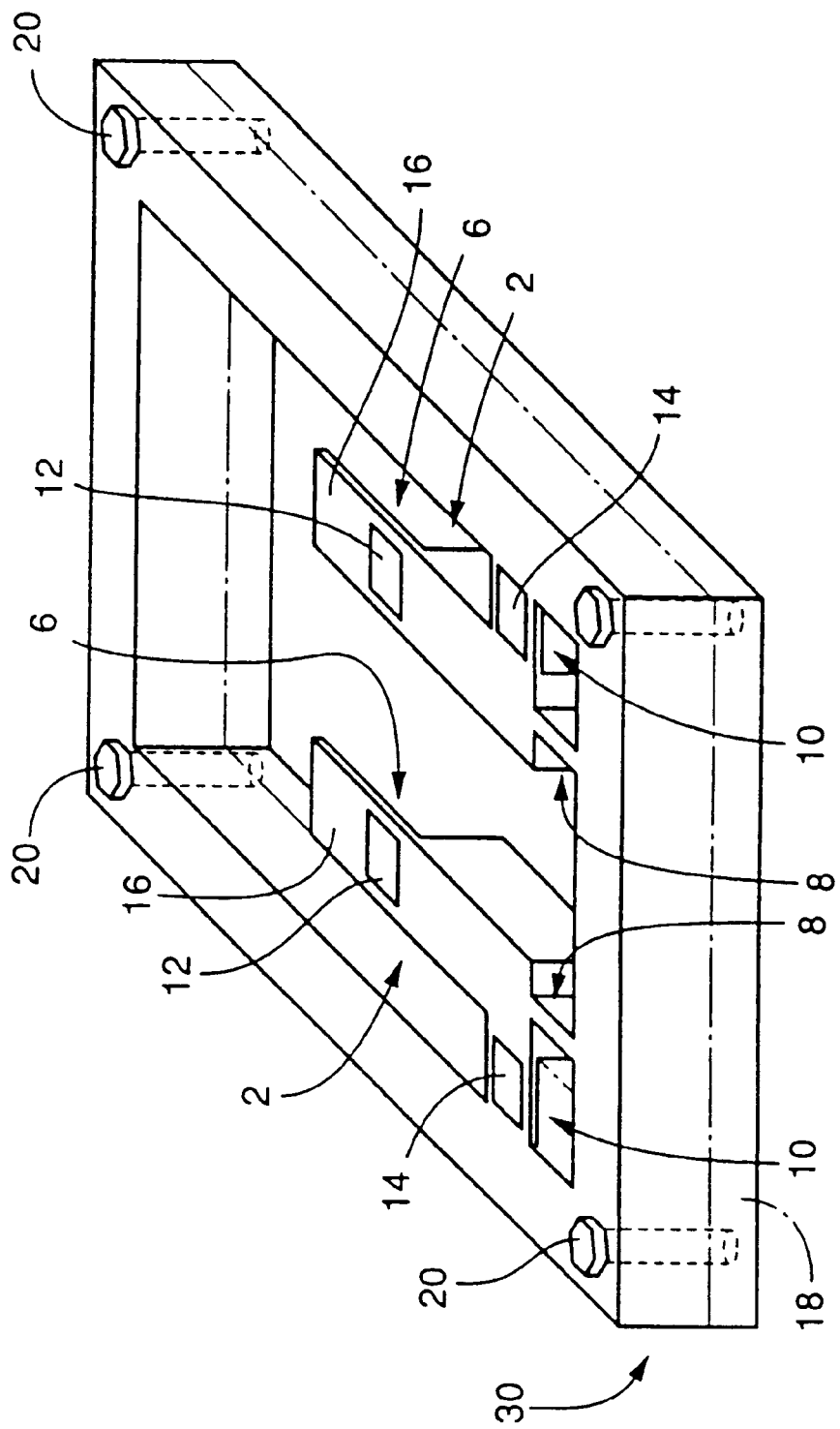
FIG. 20 schematically shows a perspective view illustrating a thirteenth preferred embodiment of the vibration gyro sensor according to the present invention.
Figure 21:
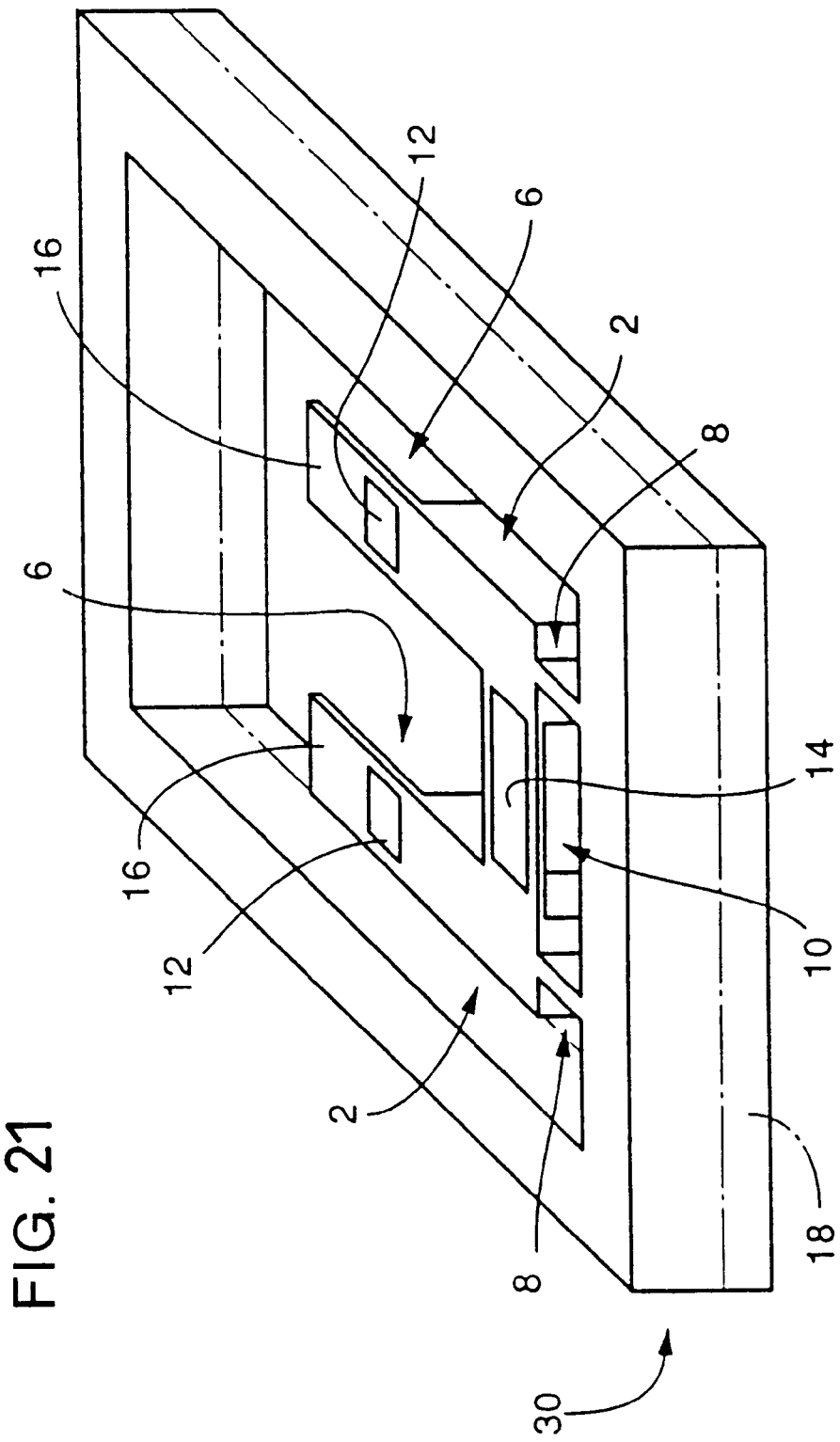
FIG. 21 schematically shows a perspective view illustrating a fourteenth preferred embodiment of the vibration gyro sensor according to the present Invention.

In the illustrative vibration gyro sensor according to the present invention, the first plate-shaped section 6, on which the detecting piezoelectric/electrostrictive element 12 is formed in the integrated manner, is provided at the intermediate portion or the proximal end of the vibrator 2. However, as shown in FIGS. 20 and 21, it is possible to provide the first plate-shaped section 6 at the forward end of the vibrator 2 to give an integrated structure continued to the excisable section 16. In this case, the Coriolis force applied to the detecting piezoelectric/electrostrictive element 12 is lowered, and the sensitivity is decreased. However, this structure has a feature that it is advantageous concerning achievement of a compact size and concerning breakage.

Next, a fifteenth embodiment of the vibration gyro sensor according to the present invention will be described with reference to FIG. 22.

The vibration gyro sensor according to the fifteenth embodiment comprises a rectangular parallelepiped-shaped support base 100 with its longitudinal direction extending in a certain direction (X direction in FIG. 22), two vibrators 102A, 102B provided on one side surface of the support base 100 and having their direction of major axes extending in a direction (Y direction in FIG. 22) perpendicular to the certain direction, two vibrators 102C, 102D provided on another side surface of the support base 100 and having their direction of major axes extending in the Y direction, and a frame 104 having its frame surface parallel to a plane including the X and Y directions, for surrounding the support base 100 and the four vibrators 102A to 102D.

The respective two vibrators 102A, 102B and 102C, 102D are supported by the support base 100 at the respective side surfaces so that they extend in parallel to one another while giving a predetermined spacing width "d".

Each of the vibrators 102A to 102D has a rectangular parallelepiped-shaped main vibrator body 106, and a thin-walled plate-shaped connecting section (second plate-shaped section) 108 for connecting the main vibrator body 106 to the support base 100. The connecting section 108 extends from a central portion in the widthwise direction of an end surface of the main vibrator body 106 on the side of the support base 100 to the support base 100. The height of the connecting section 108 is approximately the same as that of the main vibrator body 106, and the width thereof is designed to be smaller than the width of the main vibrator body 106, in the same manner as described in the first embodiment (see FIG. 1).

An opening 110, which has an approximately rectangular planar configuration, is formed through the frame 104 at its central portion. The opening 110 penetrates through the frame 104 in its direction of height, and it has an opening area of a degree to make it possible to surround the support base 100 and the four vibrators 102A to 102D. The opening 110 has rectangular cutouts 112 at portions corresponding to both longitudinal ends of the support base 100. The distance between bottoms of the respective cutouts 112 is designed to be longer than the length of the support base 100 in the longitudinal direction. Side surfaces of the respective cutouts 112 are opposed, at portions near to the opening 110, to the side surfaces of the support base 100. Namely, the support base 100 is formed such that its both ends in the longitudinal direction are inserted into the corresponding cutouts 112 respectively.

The respective two vibrators 102A, 102B and 102C, 102D, which are connected to the both side surfaces of the support base 100, are provided with plate-shaped driving sections (third plate-shaped sections) 114 which are thin-walled in the direction of height and formed between the main vibrator bodies 106 respectively. In the illustrative embodiment shown in FIG. 22, each of the driving sections 114 has its upper surface which is disposed on a side of the upper surface of the main vibrator body 106, and which is disposed at a position nearest to the connecting sections 108. The respective driving sections 114 are actually disposed on the side of the upper surface of the main vibrator body 106. However, strictly speaking, they are convex upward or convex downward, giving a structure in which they are not in an identical plane (plate spring structure).

Plate-shaped sections 116, which are thin-walled in their direction of height, are provided between portions of the both side surfaces of the support base 100 in the vicinity of the both ends in the longitudinal direction and side surfaces of the cutouts 112 opposing the portions. In the illustrative embodiment shown in FIG. 22, the upper surfaces of the respective plate-shaped sections 116 are depicted in a state in which they are flush with the upper surface of the support base 100 and the upper surface of the frame 104. However, in fact, although the respective plate-shaped sections 116 are disposed on the side of the upper surface of the support base 100 and on the side of the upper surface of the frame 104, they are convex upward or convex downward. Strictly speaking, the respective plate-shaped sections 116 have a structure in which they are not disposed in an identical plane (plate spring structure).

In the vibration gyro sensor according to the fifteenth embodiment, the support base 100, the four vibrators 102A to 102D, the frame 104, the four connecting sections 108, the two driving sections 114, and the four plate-shaped sections 116 are constructed by an integrated fired product made of ceramics. The vibration gyro sensor further comprises driving piezoelectric/electrostrictive elements 118 formed on the driving sections 114, and detecting piezoelectric/electrostrictive elements 120 formed on the plate-shaped sections 116. Accordingly, driving means 122 for vibrating the vibrators 102 in an excited manner are constructed by the driving sections 114 and the driving piezoelectric/electrostrictive elements 118, and detecting sections 124 are constructed by the plate-shaped sections 116 and the detecting piezoelectric/electrostrictive elements 120. When the driving piezoelectric/electrostrictive elements 118 are operated by applying an electric power thereto, the respective two vibrators 102A, 102B and 102C, 102D vibrate while being bent in mutually opposite directions in the X axis direction, i.e., in directions to make mutual approach or separation in the arrangement plane thereof.

The connecting sections 108 provided between the main vibrator bodies 106 and the support base 100 will now be described. The aspect ratio (width: height) of the connecting section 108 is preferably within a range of 1:1.2 to 1:1000, and more preferably within a range of 1:1.8 to 1:50. The aspect ratio should be designed within the foregoing range because when the aspect ratio of the connecting section 108 is larger than 1:1.2, unnecessary vibration in the Z axis direction tends to occur in the vibrators 102A to 102D. As a result, unnecessary vibration tends to occur in the detecting sections 124. On the other hand, if the aspect ratio is smaller than 1:1000, it is difficult to process and machine the connecting sections 108. As a result, the processing accuracy is deteriorated.

Since integrated firing of the ceramics and formation of the piezoelectric/electrostrictive elements have been described in detail above repetitive, explanation of those aspects of the present invention will be omitted in this section.

In the vibration gyro sensor according to the fifteenth embodiment, when the driving piezoelectric/electrostrictive elements 118 are operated, the driving sections 114 undergo deformation. Thus the respective two vibrators 102A, 102B and 102C, 102D vibrate laterally (lateral vibration) (lateral vibration) in mutually opposite directions along the X axis.

When an angular velocity is applied around the axis (around the Z axis in FIG. 22) perpendicular to the plane including the certain direction and the extending direction of the support base 100 in a state in which the respective two vibrators 102A, 102B and 102C, 102D are vibrated, a force acts in the Y axis direction on the plate-shaped sections 116 of the detecting sections 124. The force causes the detecting sections 124 to make lateral vibration. Namely, rotational vibration occurs around the Z axis, and the vibration is detected as an electromotive force (voltage) by the piezoelectric/electrostrictive elements 120 of the detecting sections 124.

In the present invention, all of the vibrators 102, the support base 100, and the detecting sections 124 are constructed by the integrated fired product of ceramics. Therefore, there is no magnetic material such as the conventional elinvar alloy in the materials for constructing the vibration gyro sensor. Accordingly, the characteristics of the sensor are not affected by any ambient magnetic field.

The detecting section 124 is constructed as having the plate-shaped section 116 which is more thin-walled than the main vibrator body 106 in its direction of height so that it has a structure having low rigidity. Therefore, when the vibration is caused around the Z axis by the angular velocity as described above, a large strain or distortion is obtained in the plate-shaped section 116. Thus it is possible to greatly improve the detection sensitivity of the detecting piezoelectric/electrostrictive element 120 formed on the plate-shaped section 116.

Especially, in the vibration gyro sensor according to the fifteenth embodiment, the vibration is generated in the detecting section 124 only when the angular velocity is applied. Therefore, the output (null voltage), which is obtained from the detecting piezoelectric/electrostrictive element 120 in a state in which no angular velocity is applied, is extremely small. Thus the detection sensitivity is greatly improved. Moreover, the probability of fatigue fracture at the detecting section 124 due to vibration is lowered, and it is possible to contemplate a long service life of the vibration gyro sensor.

The vibration gyro sensor has a structure not for measuring the angular velocity around the major axis of the vibrator 106 (around the Y axis), but instead for measuring the angular velocity around the axis perpendicular to the plane which includes the certain direction and the extending direction of the support base 100 (around the Z axis). Therefore, the vibrators 102, the support base 100, and the frame 104 can be made thin in their direction of height. Thus it is possible to facilitate realization of a compact size and a light weight of the vibration gyro sensor.

The four vibrators 102A to 102D have the structure in which each of the main vibrator bodies 106 includes no thin-walled plate member and each of them is supported singly by the support base 100 having the high strength. Therefore, each of the main vibrator bodies 106 itself is allowed to have a large mass. Accordingly, the Coriolis force (Fc=2 mvΩ) generated in the vibrators 102A to 102D is increased, and hence it is possible to realize a high sensitivity in relation to the detection of strain effected by the detecting sections 124.

Next, a vibration gyro sensor according to a sixteenth embodiment will be explained with reference to FIG. 23. Components or parts corresponding to those shown in FIG. 22 are designated by the same reference numerals, duplicate explanation of which will be omitted.

Figure 22:
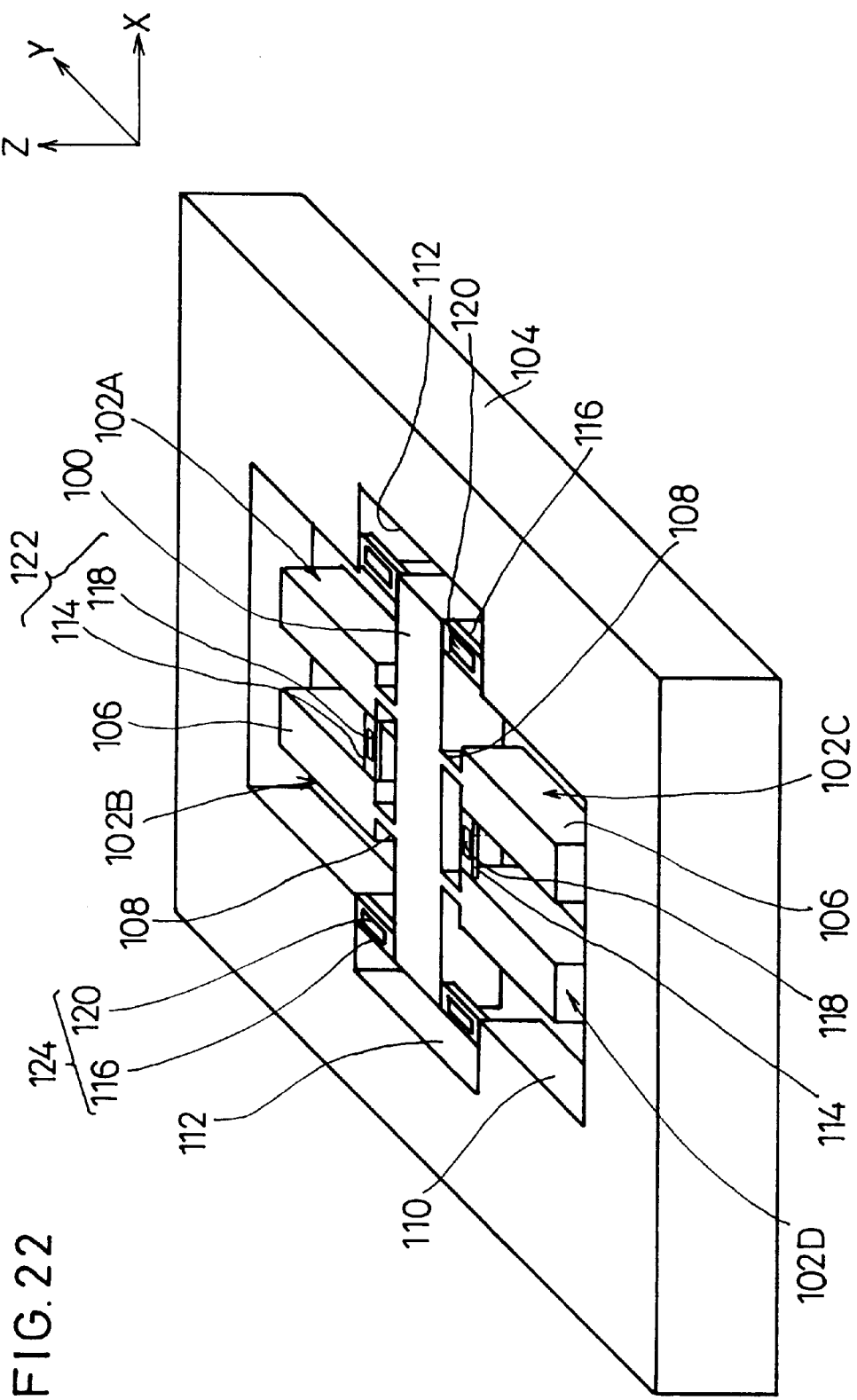
FIG. 22 schematically shows a perspective view illustrating a fifteenth preferred embodiment of the vibration gyro sensor according to the present invention.
Figure 23:
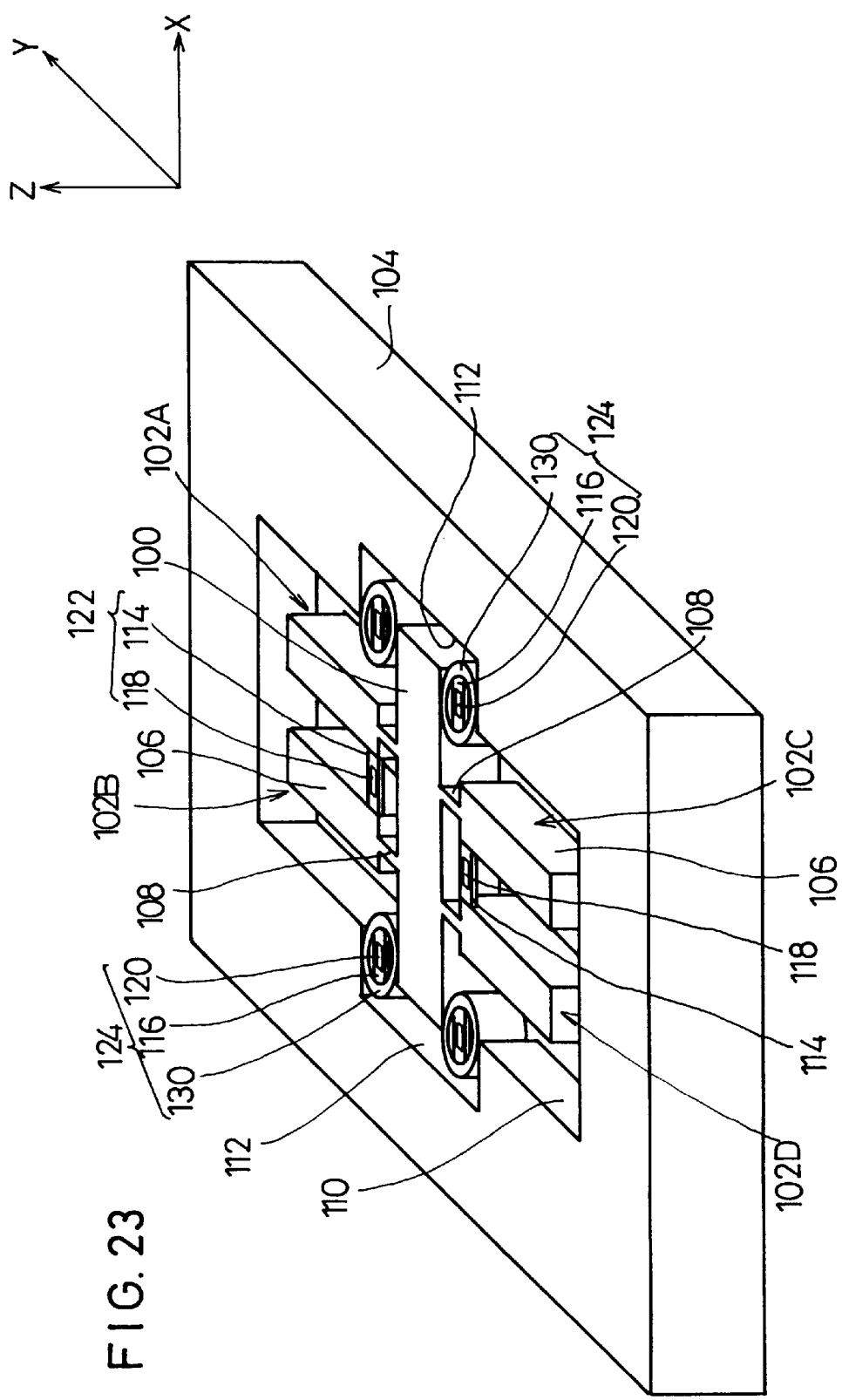
FIG. 23 schematically shows a perspective view illustrating a sixteenth preferred embodiment of the vibration gyro sensor according to the present invention.

As shown in FIG. 23, the vibration gyro sensor according to the sixteenth embodiment has approximately the same structure as that of the vibration gyro sensor according to the fifteenth embodiment (see FIG. 22). However, the detecting sections 124 are different in the following points.

Namely, the detecting section 124 comprises a ring member 130 formed of ceramics in an integrated manner between a side surface of the cutout 112 and a portion of both side surfaces of the support base 100 in the vicinity of the both ends in the longitudinal direction, a plate-shaped section 116 provided in an integrated and bridged manner in parallel to the extending direction of the support base 100 (X axis direction) in the ring member 130, and a detecting piezoelectric/electrostrictive element 120 formed on the plate-shaped section 116.

The vibration gyro sensor according to the sixteenth embodiment is operated as follows. Namely when an angular velocity is applied around the axis perpendicular to the plane including the certain direction and the extending direction of the support base 100 (around the Z axis) in a state in which the respective two vibrators 102A, 102B and 102C, 102D are vibrated in accordance with the operation of the driving piezoelectric/electrostrictive elements 118, a force acts in the Y axis direction on the detecting sections 124. The action of the force causes the ring members 130 to make vibration while forming elliptic configurations with their major or minor axis directed in the Y axis direction. The vibration of the ring members 130 in the Y axis direction is detected as an electromotive force (voltage) by the detecting piezoelectric/electrostrictive elements 120. In the sixteenth embodiment, the strain in the detecting sections 124 in the Y axis direction is indirectly measured via the deformation of the ring members 130 by using the detecting piezoelectric/electrostrictive elements 120. This embodiment provides an effect that the vibration gyro sensor is excellent in durability.

In the vibration gyro sensors according to the fifteenth and sixteenth embodiments, the resonance frequency is adjusted in the same manner as, for example, the vibration gyro sensor according to the first embodiment described above (see FIG. 1). The adjustment for the resonance frequency will be specifically explained with reference to FIGS. 24 and 25, as represented by the vibration gyro sensor according to the fifteenth embodiment.

The gyro sensor according to the fifteenth embodiment is actually constructed as follows in order to adjust the resonance frequency. Namely, as shown in FIG. 24, thin-walled first projections 132, which protrude outwardly from respective free ends of the respective two vibrators 102A, 102B and 102C, 102D, are formed of ceramics in an integrated manner. Further, thin-walled second projections 134, which protrude outwardly from both ends of the support base 100 in the longitudinal direction, are formed of ceramics in an integrated manner.

The resonance frequency for driving is adjusted by trimming-treating the first projections 132, and the resonance frequency for detection is adjusted by trimming-treating the second projections 134.

In this embodiment, the resonance frequency for driving can be adjusted by applying a trimming treatment (excising treatment) to the first projections 132, and the resonance frequency for detection can be adjusted by applying a trimming treatment (excising treatment) to the second projections 134. Namely, the resonance frequencies for driving and detection can be independently adjusted, respectively. Therefore, for example, it is possible to avoid the inconvenience that the resonance frequency for detection is affected by adjustment for the resonance frequency for driving.

Figure 25:
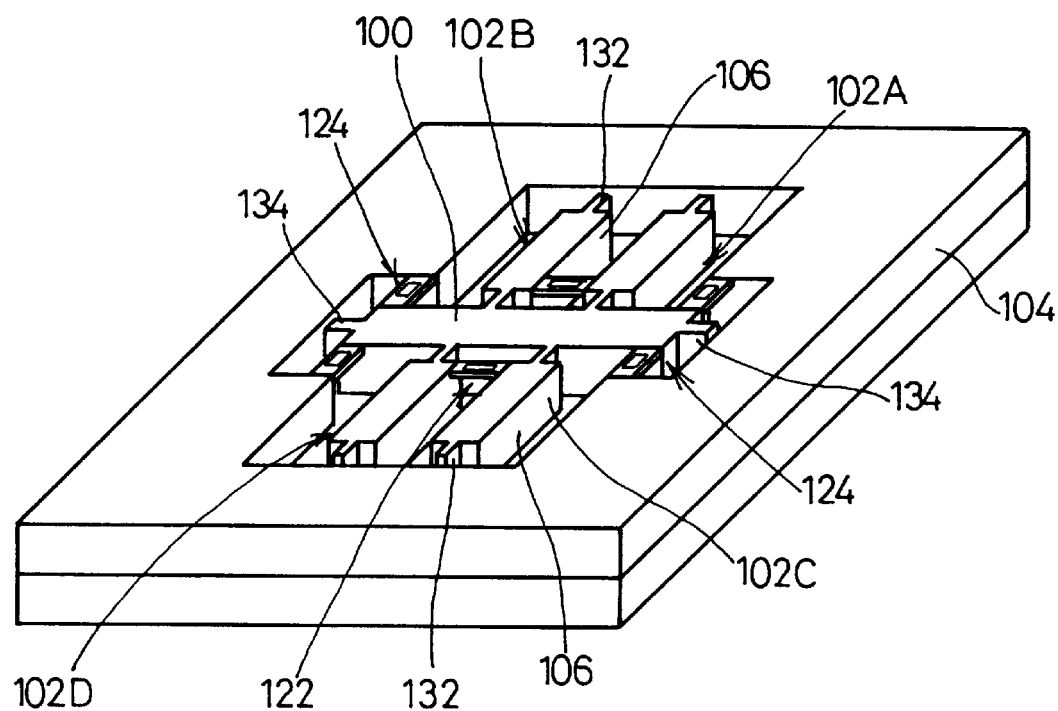
FIG. 25 schematically shows a perspective view illustrating another exemplary structure of projections used to adjust the resonance frequency in the vibration gyro sensor according to the fifteenth embodiment.

The shapes of the first and second projections 132, 134 may by constructed as follows. For example, as shown in FIG. 24, the first and second projections 132, 134 may be constructed as plate-shaped and thin-walled in the direction of height with respect to the respective main vibrator bodies 106. Alternatively, as shown in FIG. 25, the first and second projections 132, 134 may be constructed as plate-shaped and thin-walled in the extending direction of the support base 100 (X axis direction) with respect to the respective main vibrator bodies 106.

The shape shown in FIG. 24 is advantageous in that the trimming treatment can be easily performed by means of, for example, laser beam scanning over the upper surface. In the case of the shape shown in FIG. 25, regions to be subjected to the trimming treatment are disposed over entire surfaces perpendicular to the direction of vibration of the respective two vibrators 102A, 102B and 102C, 102D, and hence an extremely excellent mass balance is obtained. In this case, the trimming treatment is performed, for example, by applying percussion such as ultrasonic waves after laser radiation so that unnecessary portions are excised.

Actually, upon the adjustment for the resonance frequency, if the first projections 132 are subjected to the trimming treatment in order to adjust the resonance frequency for driving, the resonance frequency for detection is considerably affected. However, even when the second projections 134 are subjected to the trimming treatment in order to adjust the resonance frequency for detection, the resonance frequency for driving is not affected. Therefore, when the resonance frequency is actually adjusted, it is preferable that the resonance frequency for driving is firstly adjusted by trimming-treating the first projections 132, and then the resonance frequency for detection is adjusted by trimming-treating the second projections 134.

Next, a vibration gyro sensor according to a seventeenth embodiment will be explained with reference to FIG. 26. Components or parts corresponding to those shown in FIG. 22 are designated by the same reference numerals, duplicate explanation of which will be omitted.

Figure 26:
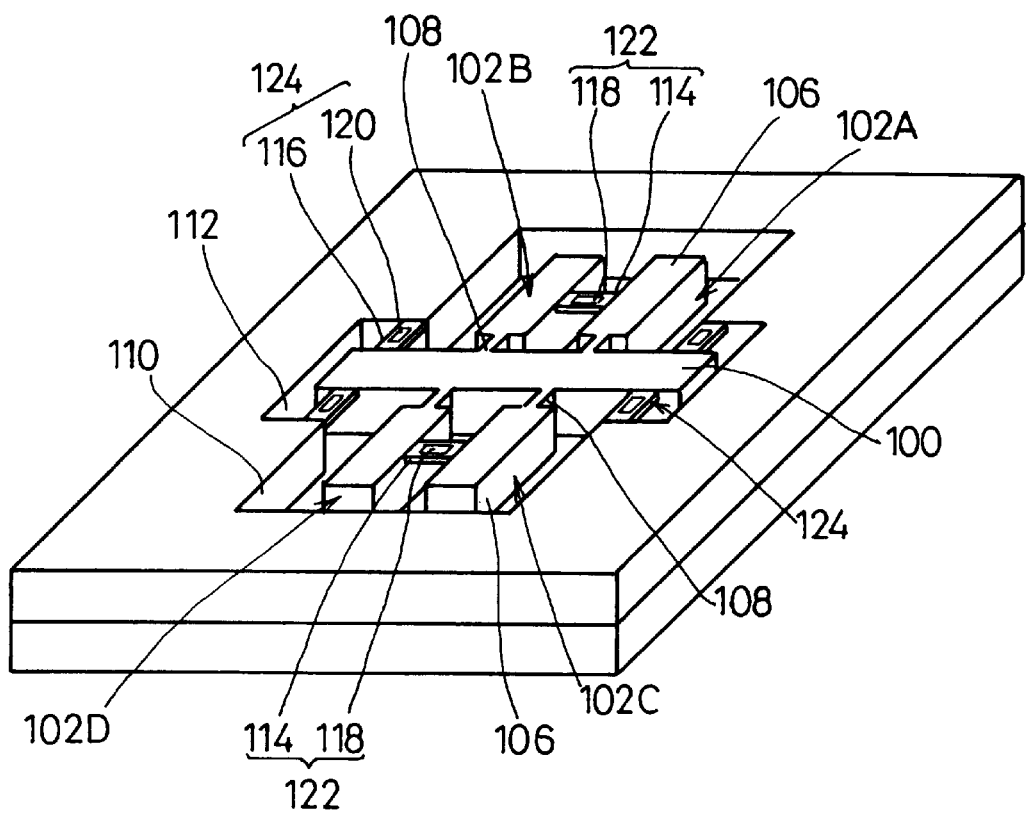
FIG. 26 schematically shows a perspective view illustrating a seventeenth preferred embodiment of the vibration gyro sensor according to the present invention.

As shown in FIG. 26, the vibration gyro sensor according to the seventeenth embodiment is constructed in approximately the same manner as the vibration gyro sensor according to the fifteenth embodiment. However, the former is different from the latter in that plate-shaped driving sections 114 of the driving means 122 are arranged on lines for connecting centers of gravity of the corresponding main vibrator bodies 106, respectively.

In this embodiment, the respective two vibrators 102A, 102B and 102C, 102D can efficiently make mutual approach and separation, as compared with the vibration gyro sensor including the driving sections 114 disposed in the vicinity of the connecting sections 108 (for example, the vibration gyro sensor according to the fifteenth embodiment). Accordingly, this embodiment is advantageous in that the detection sensitivity in the detecting sections 124 can be improved.

Figure 27:
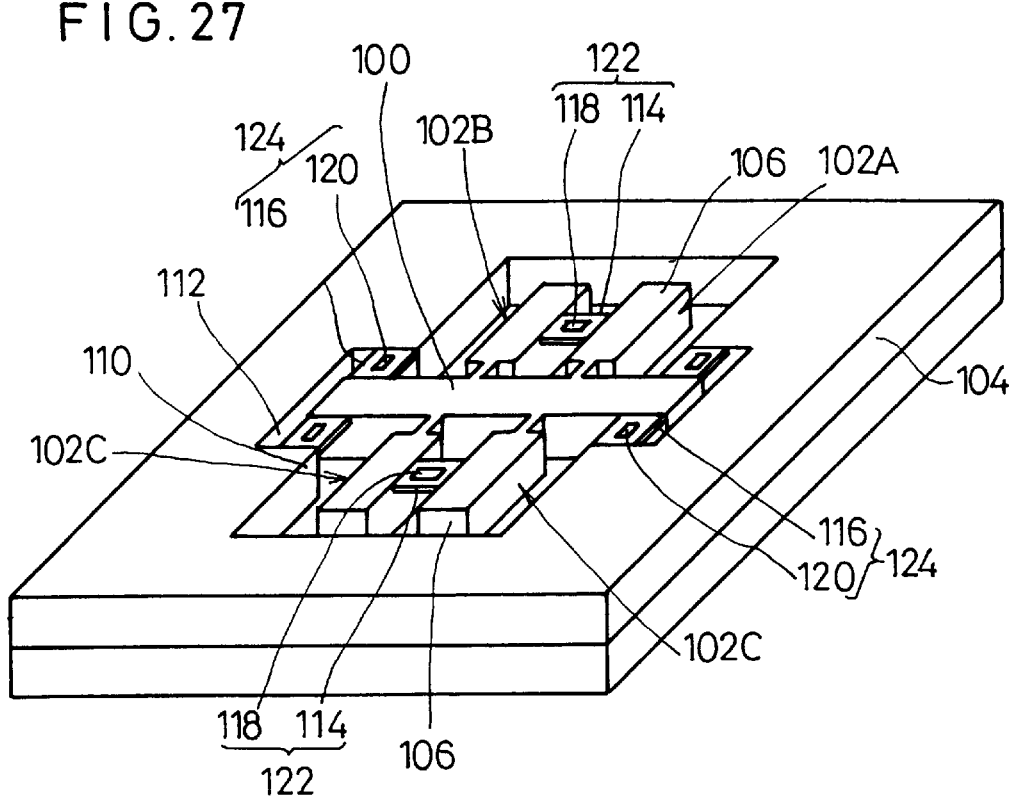
FIG. 27 schematically shows a perspective view illustrating an exemplary structure used to adjust the resonance frequencies for driving and detection by changing spring constants of the driving and detecting sections in the vibration gyro sensor according to the seventeenth embodiment.

The adjustment for the resonance frequency by means of the trimming treatment for the vibration gyro sensor may be performed in another way, in place of the trimming treatment for the first and second projections 132, 134 described above (see FIGS. 24 and 25). As shown in FIG. 27, the driving sections 114 provided between the respective main vibrator bodies 106, and the plate-shaped sections 116 of the detecting sections 124 provided between the support base 100 and the frame 104 are allowed to have wide widths beforehand. The widths of the driving sections 114 and the plate-shaped sections 116 are appropriately changed. Thus the resonance frequencies for driving and detection may be adjusted.

In this adjustment method, the resonance frequencies for driving and detection are not adjusted by changing the masses of the main vibrator bodies 106 and the support base 100. Instead the resonance frequencies for driving and detection are adjusted by changing spring constants of the driving sections 114 and the plate-shaped sections 116.

Specifically, when the frequency for driving is changed, the two plate-shaped driving sections 114 disposed between the respective main vibrator bodies 106 are excised by means of, for example, laser machining or ultrasonic machining. When the frequency for detection is changed, the four plate-shaped sections 116 disposed between the support base 100 and the frame 104 are excised by means of, for example, laser machining or ultrasonic machining.

In this embodiment, it is unnecessary to form the first projections 132 and the second projections 134 at the free ends of the respective main vibrator bodies 106 and at the both ends of the support base 100 in the longitudinal direction respectively. Accordingly, the production steps can be simplified. Moreover, the resonance frequency is easily adjusted because the region subjected to the trimming treatment is thin-walled. Unlike the method in which the resonance frequency is adjusted by changing the mass, the method of this embodiment is also advantageous in that the resonance frequency for driving and the resonance frequency for detection can be adjusted independently from each other.

The fifteenth to seventeenth embodiments are illustrative of the formation of the driving section 114 between the main vibrator bodies 106. In addition, the driving section 114 may be formed between the support base 100 and the main vibrator body 106. Several examples of this arrangement are shown in FIGS. 28 and 29 as the eighteenth and nineteenth embodiments, respectively.

Figure 28:
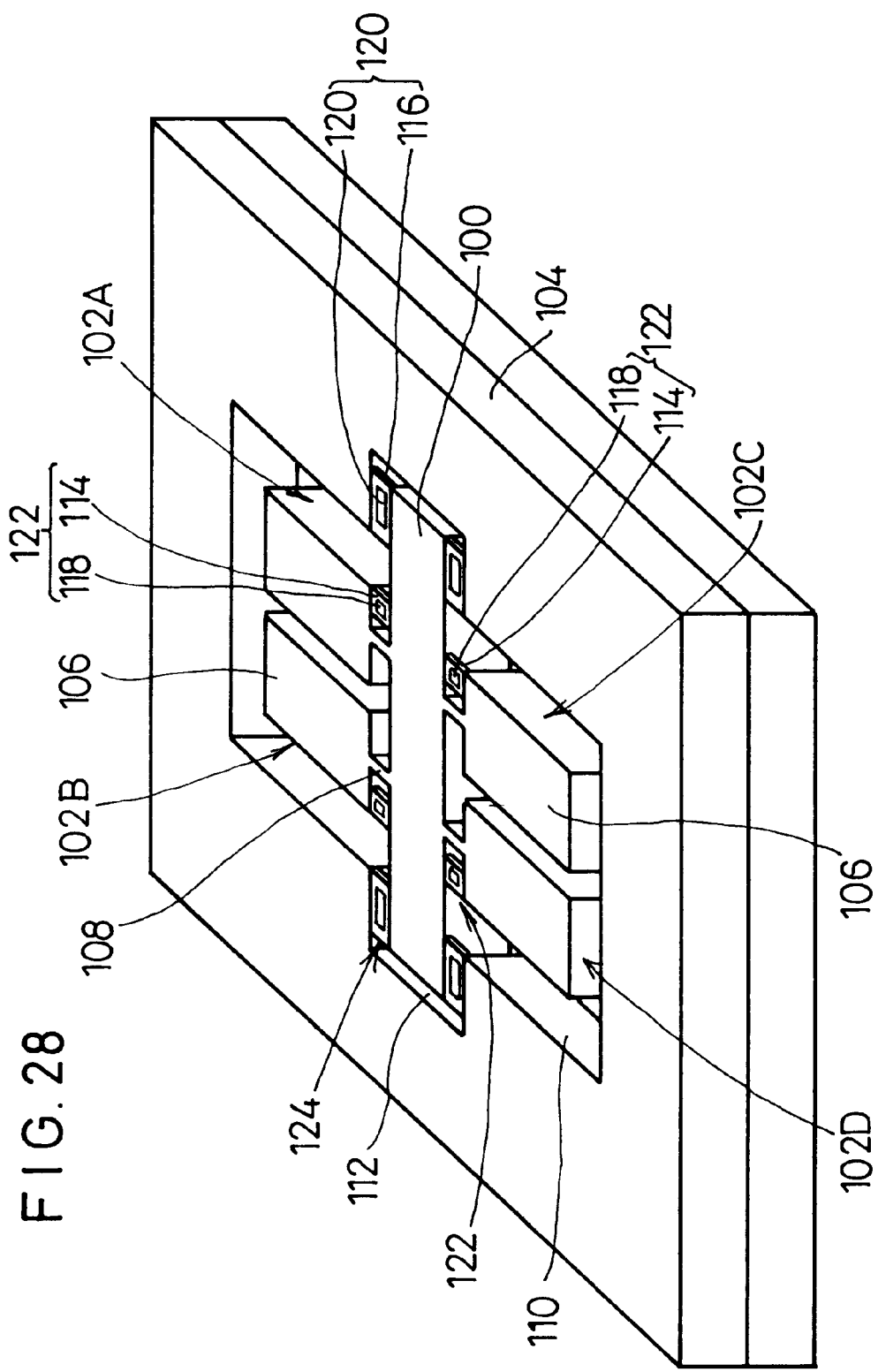
FIG. 28 schematically shows a perspective view illustrating an eighteenth preferred embodiment of the vibration gyro sensor according to the present invention.
Figure 29:
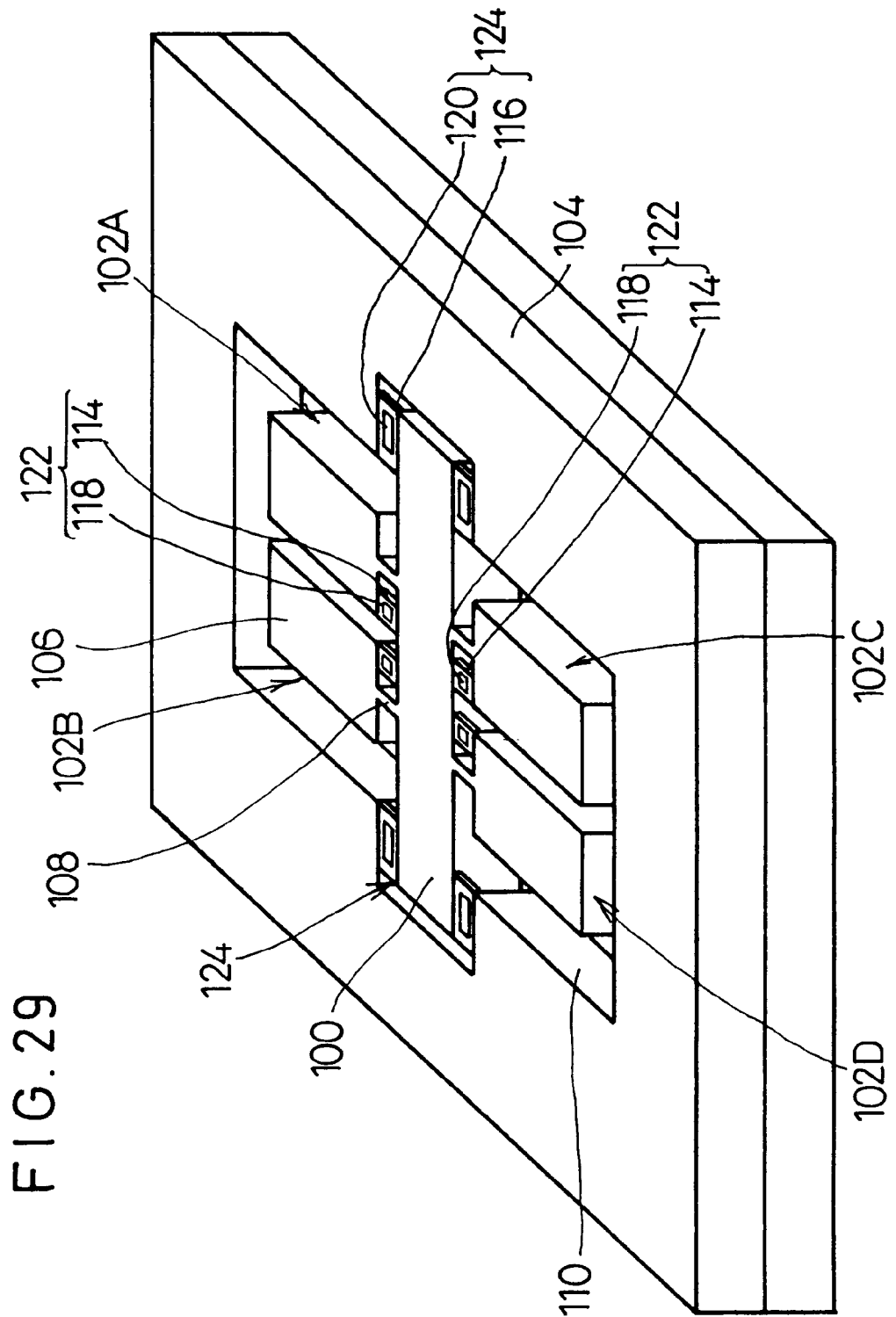
FIG. 29 schematically shows a perspective view illustrating a nineteenth preferred embodiment of the vibration gyro sensor according to the present invention.

Namely, as shown in FIG. 28, a vibration gyro sensor according to the eighteenth embodiment comprises driving sections 114 each of which is formed between a support base 100 and a portion of an end surface of a main vibrator body 106 disposed on a side of the support base 100 in the vicinity of a frame 104. As shown in FIG. 29, a vibration gyro sensor according to the nineteenth embodiment comprises driving sections 114 each of which is formed between a support base 100 and a portion corresponding to a region of the end surface of the main vibrator body 106 on the side of the support base 100 in the vicinity of the center of the support base 100 in the longitudinal direction.

In both of the vibration gyro sensors according to the eighteenth and nineteenth embodiments, the driving section 114 is not formed between the adjacent main vibrator bodies 106. Accordingly, it is possible to narrow the spacing distance between the adjacent main vibrator bodies 106, making it possible to facilitate realization of a compact size of the vibration gyro sensor.

Figure 30:
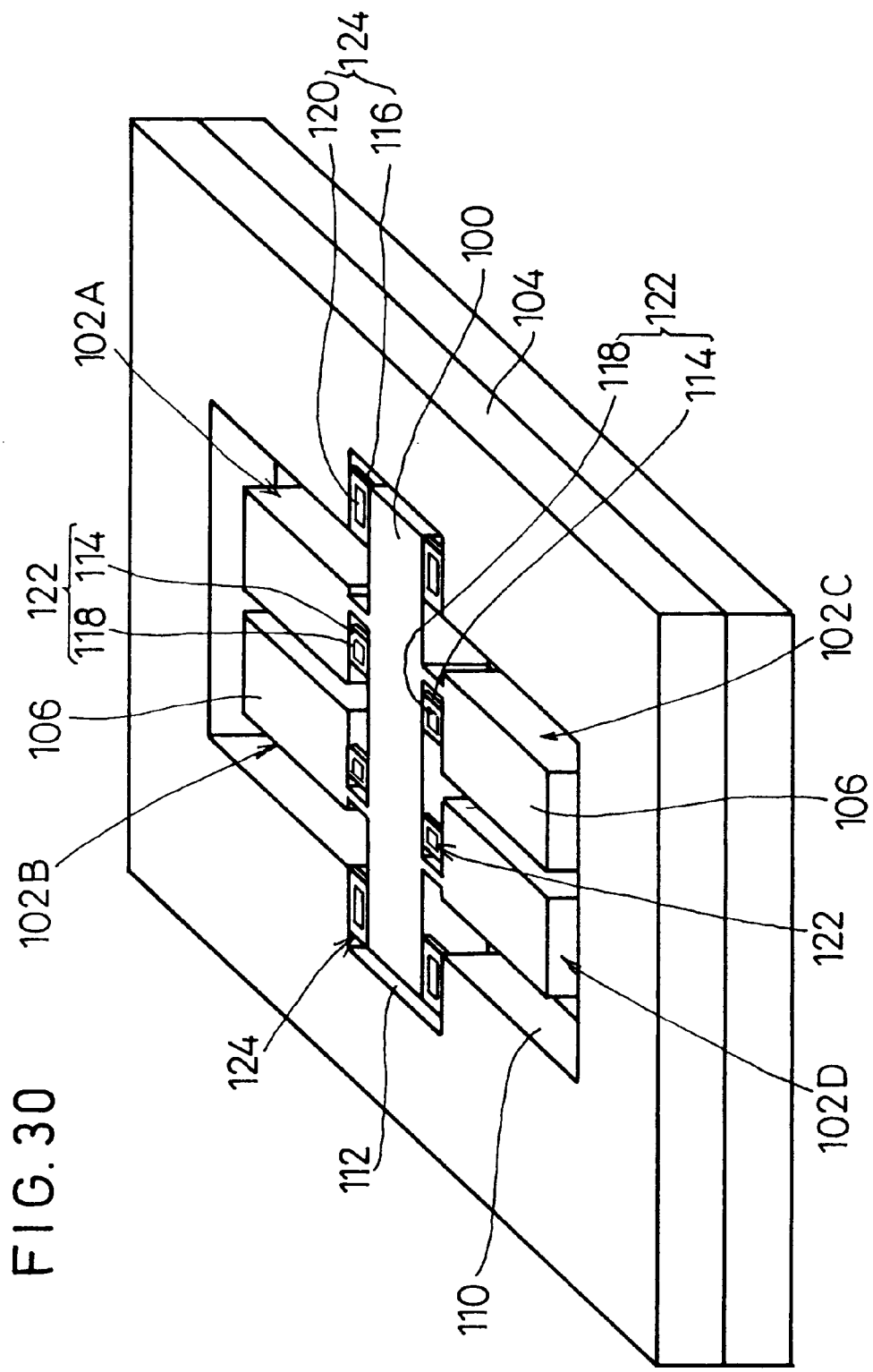
FIG. 30 schematically shows a perspective view illustrating a twentieth preferred embodiment of the vibration gyro sensor according to the present invention.

In the fifteenth to nineteenth embodiments, the connecting section 108, which is formed between each of the main vibrator bodies 106 and the support base 100, is disposed at the position on each of the main vibrator bodies 106, the position being located at the central portion of the end surface of the main vibrator body 106 on the side of the support base 100. However, it is not necessarily indispensable that the position is the central portion. For example, as shown in FIG. 30, the position, at which the connecting section 108 is formed on each of the main vibrator bodies 106, may be disposed at a portion of the end surface of the main vibrator body 106 on the side of the support base 100 in the vicinity of the frame 106 (twentieth embodiment). Although not shown, the position may be a portion corresponding to a region of the end surface of the main vibrator body 106 on the side of the support base 100 in the vicinity of the center of the support base 100 in the longitudinal direction.

Figure 31:
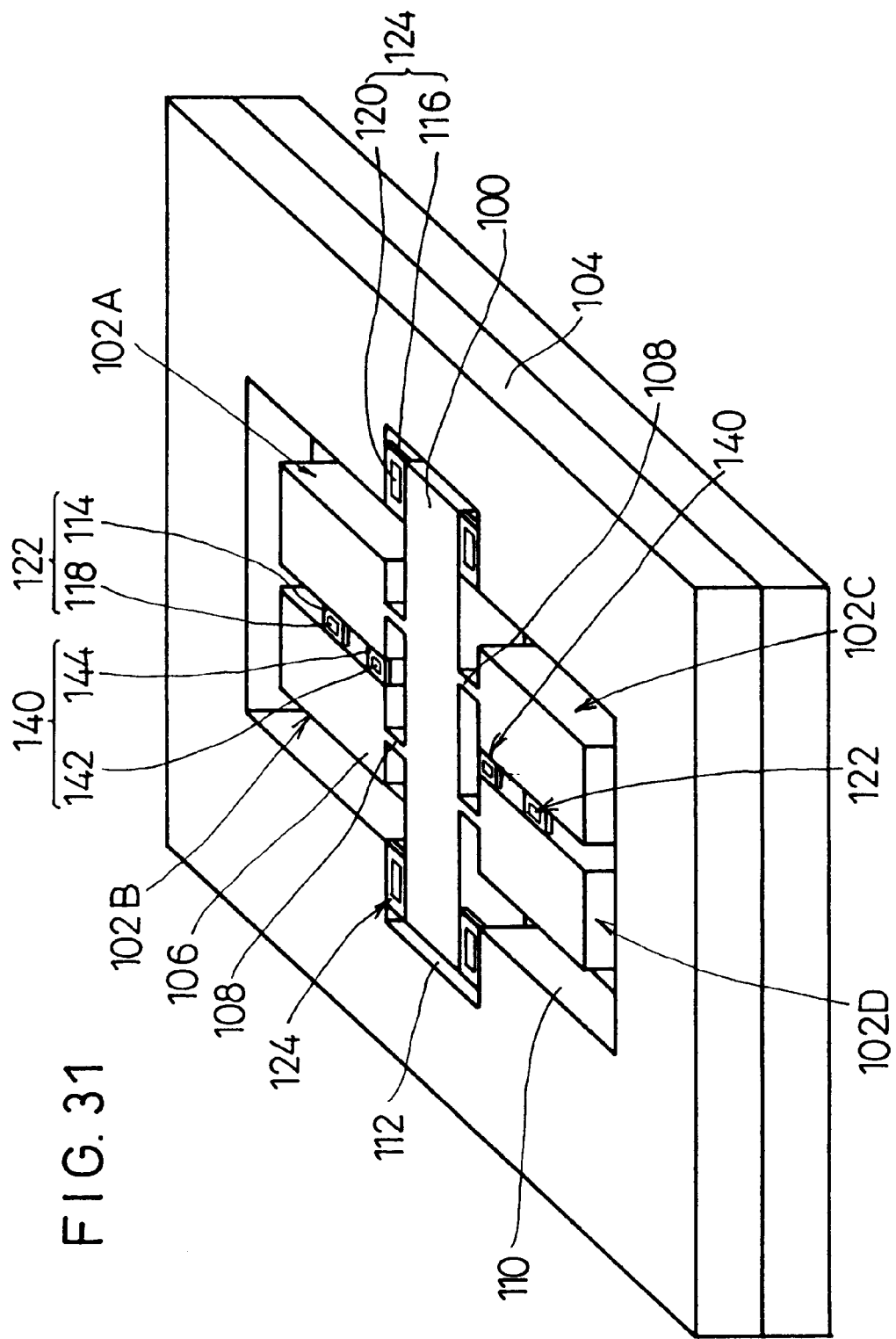
FIG. 31 schematically shows a perspective view illustrating a twenty-first preferred embodiment of the vibration gyro sensor according to the present invention.
Figure 32:
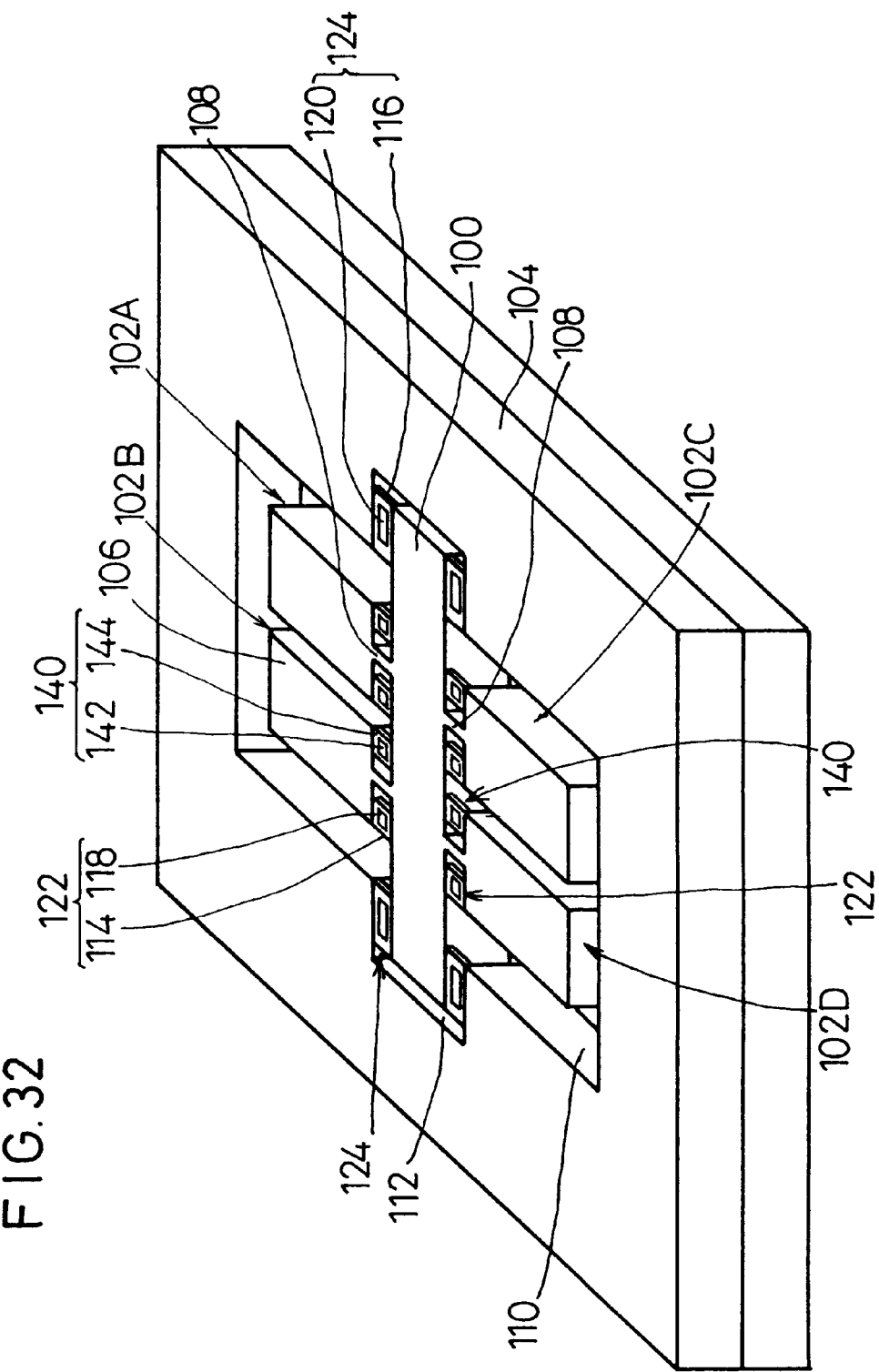
FIG. 32 schematically shows a perspective view illustrating a twenty-second preferred embodiment of the vibration gyro sensor according to the present invention.
Figure 33:
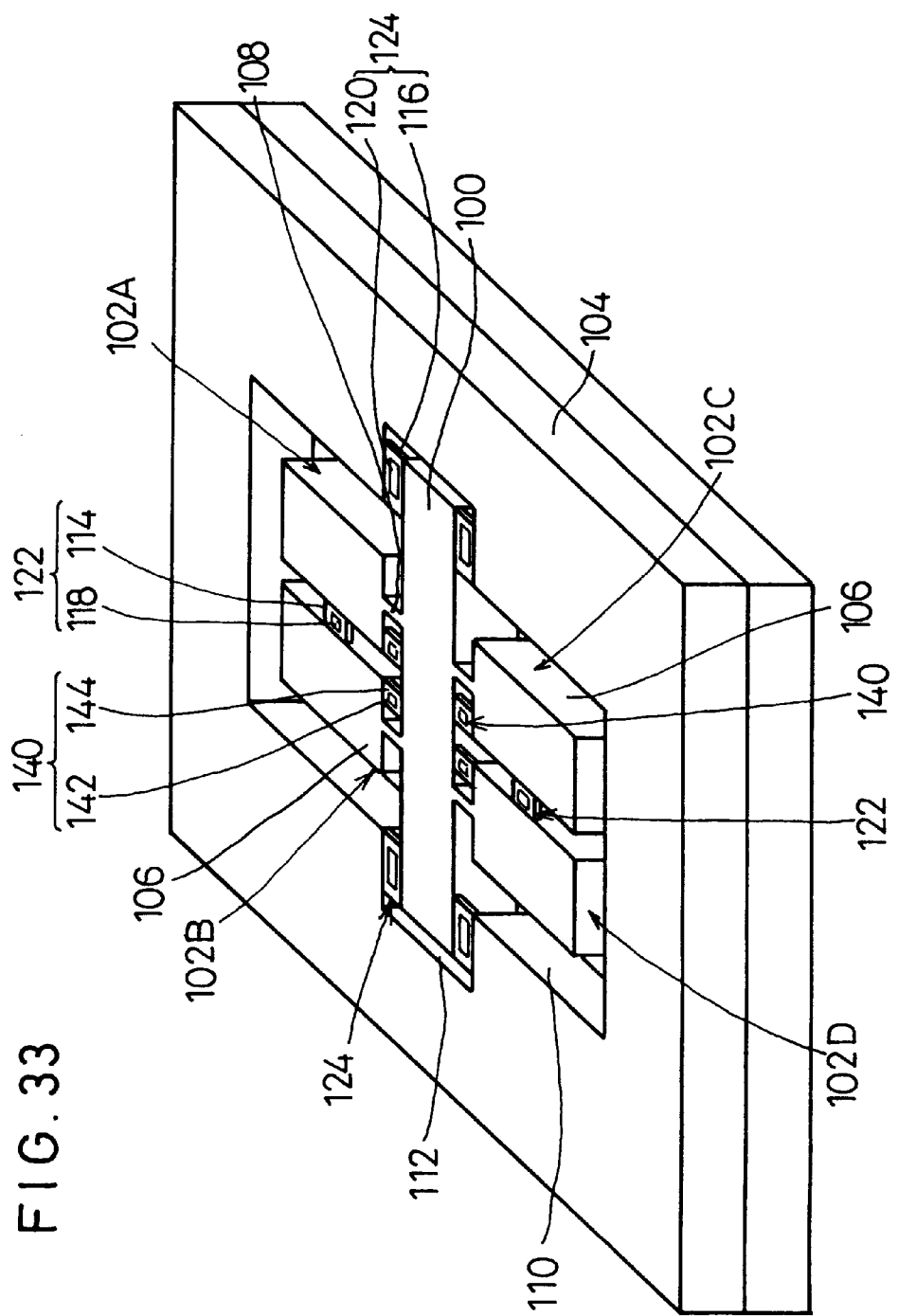
FIG. 33 schematically shows a perspective view illustrating a twenty-third preferred embodiment of the vibration gyro sensor according to the present invention.

As shown in FIGS. 31 to 33, in order to maintain constant vibration of the driving section 114 effected by the driving piezoelectric/electrostrictive element 118 of the driving means 122, it is also preferable to adopt a mechanism wherein a signal, which is obtained from a reference piezoelectric/electrostrictive element 142 of a reference means 140 provided at a position different from that for the driving means 122, is fed back to the driving means 122.

Namely, a vibration gyro sensor according to a twenty-first embodiment shown in FIG. 31 is constructed such that the vibration gyro sensor according to the seventeenth embodiment shown in FIG. 26 further comprises reference means 140 provided in the vicinity of the connecting sections 108 of the respective main vibrator bodies 106. The reference means 140 is constructed in approximately the same manner as the driving means 122, comprising a plate-shaped reference section (fourth plate-shaped section) 144 which is thin-walled in the direction of height, and a reference piezoelectric/electrostrictive element 142 formed on the reference section 144. The reference section 144 is formed of ceramics in an integrated manner in the same manner as the driving section 114.

A signal, which is obtained from the reference piezoelectric/electrostrictive element 142 of the reference means 140, is fed to the driving piezoelectric/electrostrictive element 118 in the feedback manner to give constant vibration of the driving means 122 formed on the line for connecting the centers of gravity of the respective main vibrator bodies 106.

In the embodiment described above, the plate-shaped section provided on the line for connecting the centers of gravity of the respective main vibrator bodies 106 and the piezoelectric/electrostrictive element formed on the plate-shaped section are used as the driving means 122, and the plate-shaped section provided in the vicinity of the connecting section 108 of each of the main vibrator bodies 106 and the piezoelectric/electrostrictive element formed on the plate-shaped section are used as the reference means 140. However, an arrangement in which the driving means 122 and the reference means 140 are disposed in an inverse manner is also allowed.

Next, a vibration gyro sensor according to a twenty-second embodiment shown in FIG. 32 is constructed such that the vibration gyro sensor according to the eighteenth embodiment shown in FIG. 28 further comprises reference means 140 provided between the support base 100 and a portion corresponding to a region of the end surface of the main vibrator body 106 on the side of the support base 100 in the vicinity of the center of the support base 100 in the longitudinal direction.

A signal, which is obtained from a reference piezoelectric/electrostrictive element 142 of the reference means 140, is fed back to the driving piezoelectric/electrostrictive element 118 to give constant vibration of the driving means 122 provided between the support base 100 and a portion of the end surface of the main vibrator body 106 on the side of the support base 100 in the vicinity of the frame 104.

In the embodiment described above, the plate-shaped section provided between the support-base 100 and the portion of the end surface of the main vibrator body 106 on the side of the support base 100 in the vicinity of the frame 104 and the piezoelectric/electrostrictive element formed on the plate-shaped section are used as the driving means 122. By contrast the plate-shaped section provided between the support base 100 and the portion corresponding to the region of the end surface of the main vibrator body 106 on the side of the support base 100 in the vicinity of the center of the support base 100 in the longitudinal direction and the piezoelectric/electrostrictive element formed on the plate-shaped section are used as the reference means 140. However, an arrangement in which the driving means 122 and the reference means 140 are disposed in an inverse manner may be utilized.

Next, a vibration gyro sensor according to a twenty-third embodiment shown in FIG. 33 is constructed such that the vibration gyro sensor according to the seventeenth embodiment shown in FIG. 26 further comprises a reference means 140 provided between the support base 100 and a portion corresponding to a region of the end surface of the main vibrator body 106 on the side of the support base 100 in the vicinity of the center of the support base 100 in the longitudinal direction.

A signal, which is obtained from a reference piezoelectric/electrostrictive element 142 of the reference means 140, is fed back to the driving piezoelectric/electrostrictive element 118 to give constant vibration of the driving means 122 formed on the line for connecting the centers of gravity of the respective main vibrator bodies 106.

In the embodiment described above, the plate-shaped section provided on the line for connecting the centers of gravity of the respective main vibrator bodies 106 and the piezoelectric/electrostrictive element formed on the plate-shaped section are used as the driving means 122, and the plate-shaped section provided between the support base 100 and the portion corresponding to the region of the end surface of the main vibrator body 106 on the side of the support base 100 in the vicinity of the center of the support base 100 in the longitudinal direction and the piezoelectric/electrostrictive element formed on the plate-shaped section are used as the reference means 140. However, it is allowable to adopt an arrangement in which the driving means 122 and the reference means 140 are disposed in an inverse manner.

Figure 34:
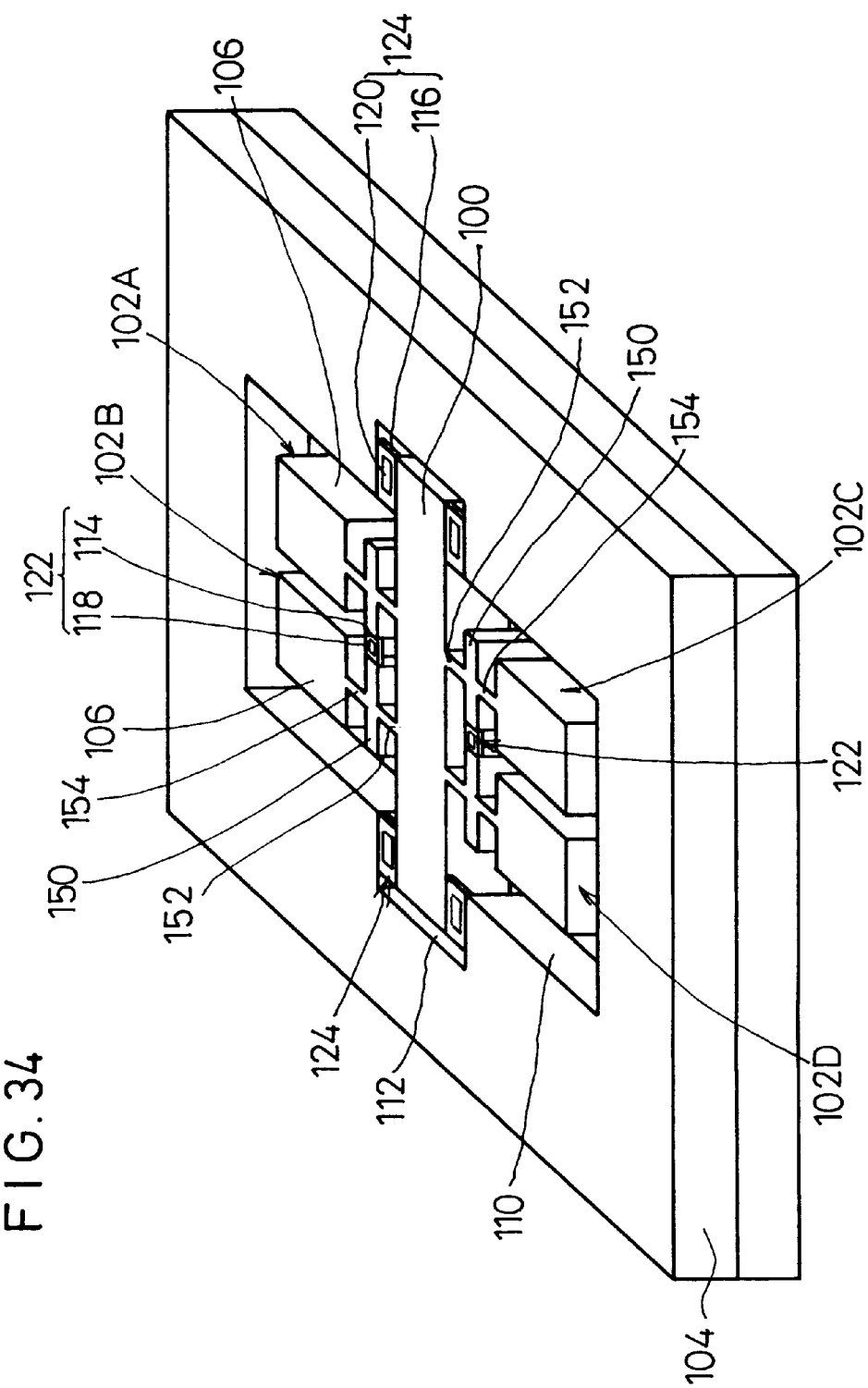
FIG. 34 schematically shows a perspective view illustrating a twenty-fourth preferred embodiment of the vibration gyro sensor according to the present invention.

Any of the vibration gyro sensors according to the first to twenty-third embodiments has the structure of the so-called forced vibration system in which the vibrator 2 (or 102) is directly vibrated by the driving section. However, as shown in FIGS. 34 to 36, it is allowable to adopt structures based on the free vibration system.

At first, a vibration gyro sensor according to a twenty-fourth embodiment shown in FIG. 34 will be described. This vibration gyro sensor is illustrative of a structure comprising plate-shaped vibration-applying sections (fifth plate-shaped sections) 150 arranged between a support base 100 and respective main vibrator bodies 106 and extending in parallel to the longitudinal direction of the support base 100, thin-walled plate-shaped first connecting sections (sixth plate-shaped sections) 152 for connecting the support base 100 and the vibration-applying sections 150, thin-walled plate-shaped connecting sections (seventh plate-shaped sections) 154 for connecting the main vibrator bodies 106 and the vibration-applying sections 150, and driving means 122 provided between the respective vibration-applying sections 150.

The first and second connecting sections 152, 154 have approximately the same dimensional relation as those of the connecting sections 108 of the vibration gyro sensors according to the fifteenth to twenty-third embodiments described above. The height of the vibration-applying section 150 is approximately the same as that of the main vibrator body 106. The width of the vibration-applying section 150 is designed to be smaller than the width of the main vibrator body 106 and slightly larger than those of the first and second connecting sections 152, 154.

Figure 35:
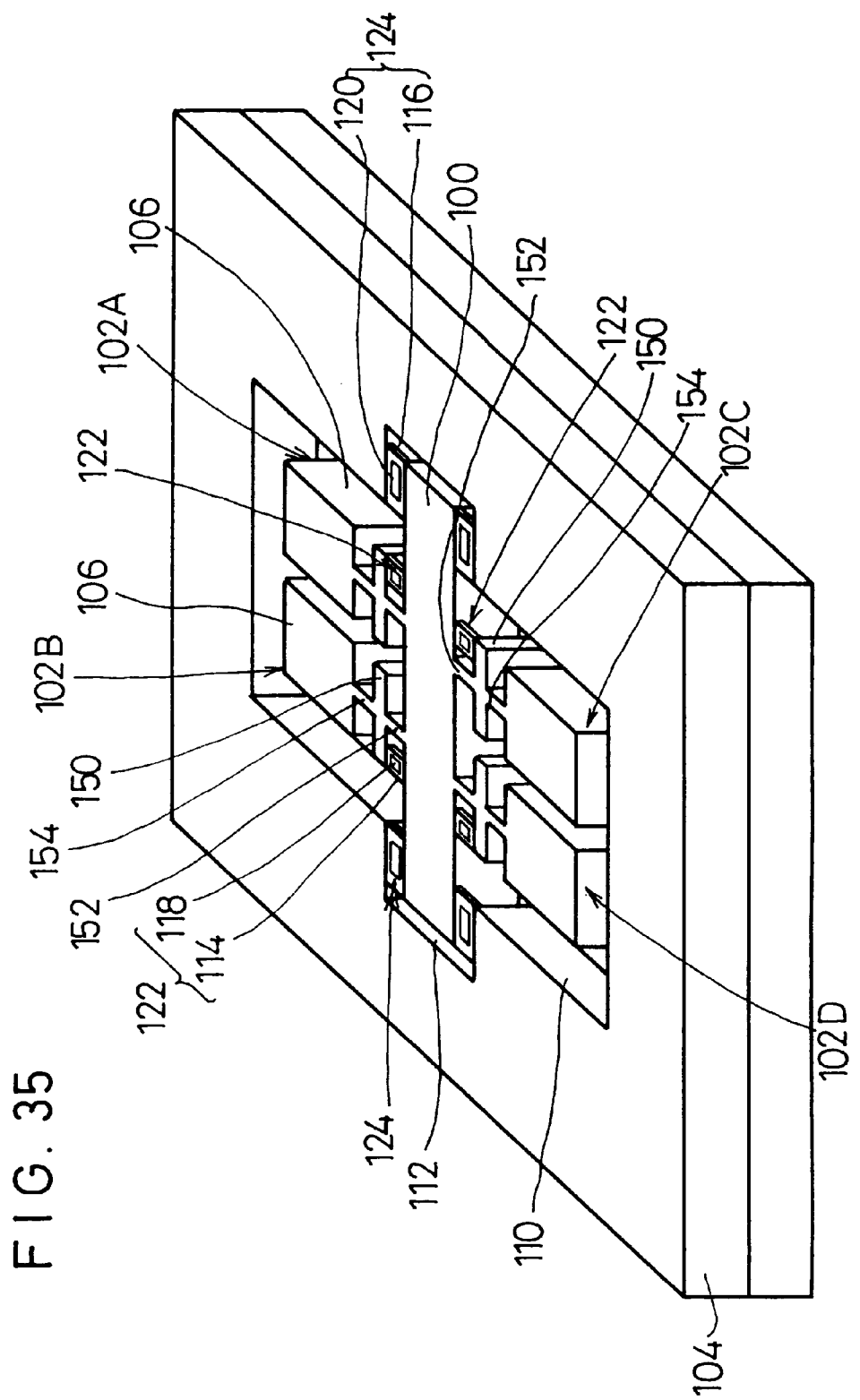
FIG. 35 schematically shows a perspective view illustrating a twenty-fifth preferred embodiment of the vibration gyro sensor according to the present invention.
Figure 36:
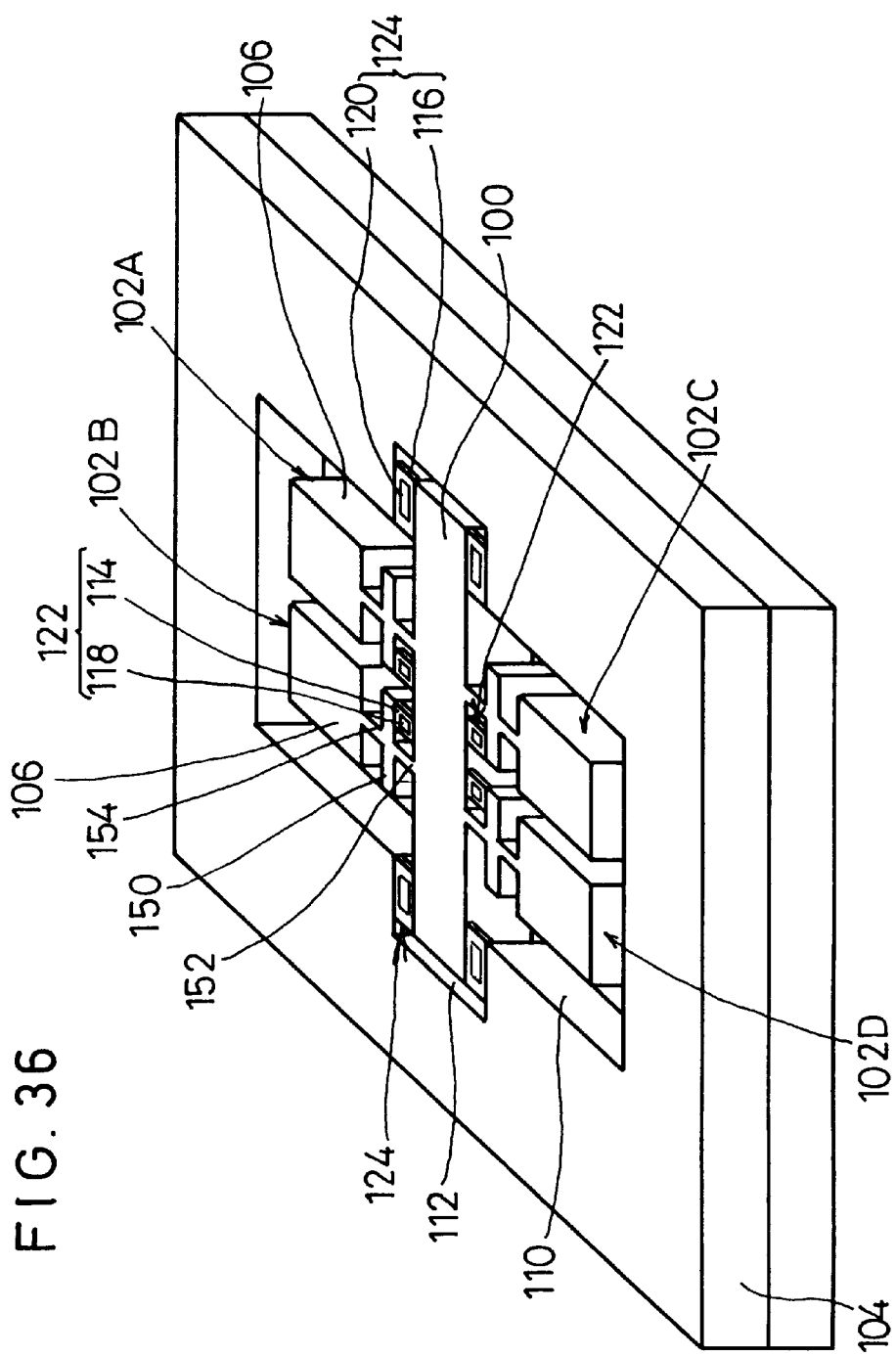
FIG. 36 schematically shows a perspective view illustrating a twenty-sixth preferred embodiment of the vibration gyro sensor according to the present invention.

A vibration gyro sensor according to a twenty-fifth embodiment shown in FIG. 35 is constructed in approximately the same manner as the vibration gyro sensor according to the twenty-fourth embodiment. However, the former is different from the latter in that the driving means 122 is provided between the support base 10 and a portion of the end surface of the vibration-applying section 150 on the side of the support base 100 in the vicinity of the frame 104.

A vibration gyro sensor according to a twenty-sixth embodiment shown in FIG. 36 is constructed in approximately the same manner as the vibration gyro sensor according to the twenty-fourth embodiment. However, the former is different from the latter in that the driving means 122 is provided between the support base 10 and a portion corresponding to a region of the end surface of the vibration-applying section 150 on the side of the support base 100 in the vicinity of the center of the support base 100 in the longitudinal direction.

In the vibration gyro sensors according to the twenty-fourth to twenty-sixth embodiments, the vibrators 102A to 102D are indirectly vibrated by giving vibration to the vibration-applying sections 150 disposed between the main vibrator bodies 106 and the support base 100 by the aid of the driving means 122. These vibration gyro sensors are advantageous in the following points because the main vibrator bodies 106 are scarcely affected by the driving sections 114. Namely, (1) it is easy to obtain large amplitude when the vibrators 102A to 102D are vibrated, and (2) the vibration waveform rarely suffers disturbance in the vibrators 102A to 102D, and it is possible to obtain a vibration waveform following the regular sine wave.

Vibration gyro sensors, which have been hitherto used, employ the elinvar alloy for the vibrator in many cases, in which the bulky piezoelectric/electrostrictive element formed with the electrodes is fixed to the vibrator by means of adhesion. Therefore, it is necessary to use, for example, solder or Ag paste for connecting external wiring to the electrodes of the piezoelectric/electrostrictive element. In this procedure, for example, the solder, the Ag paste, and the external wiring itself behave as added weights which greatly affect the vibration characteristics of the vibrator, making it difficult to produce the vibration gyro sensors.

A vibration gyro sensor of another type is also known, in which a piezoelectric ceramic is used for the vibrator.

However, such vibration gyro sensors are not essentially different from the foregoing conventional vibration gyro sensors in that the lead wire is connected to the part which is used to make vibration. Problems arise in that (a) the connecting section to the external wiring is less reliable, and (b) the dispersion in production is large.

On the contrary, the vibration gyro sensors according to the first to twenty-sixth embodiments described above are advantageous in that external wiring can be easily connected to the pair of electrodes of the respective piezoelectric/electrostrictive elements 118, 120.

Figure 37:
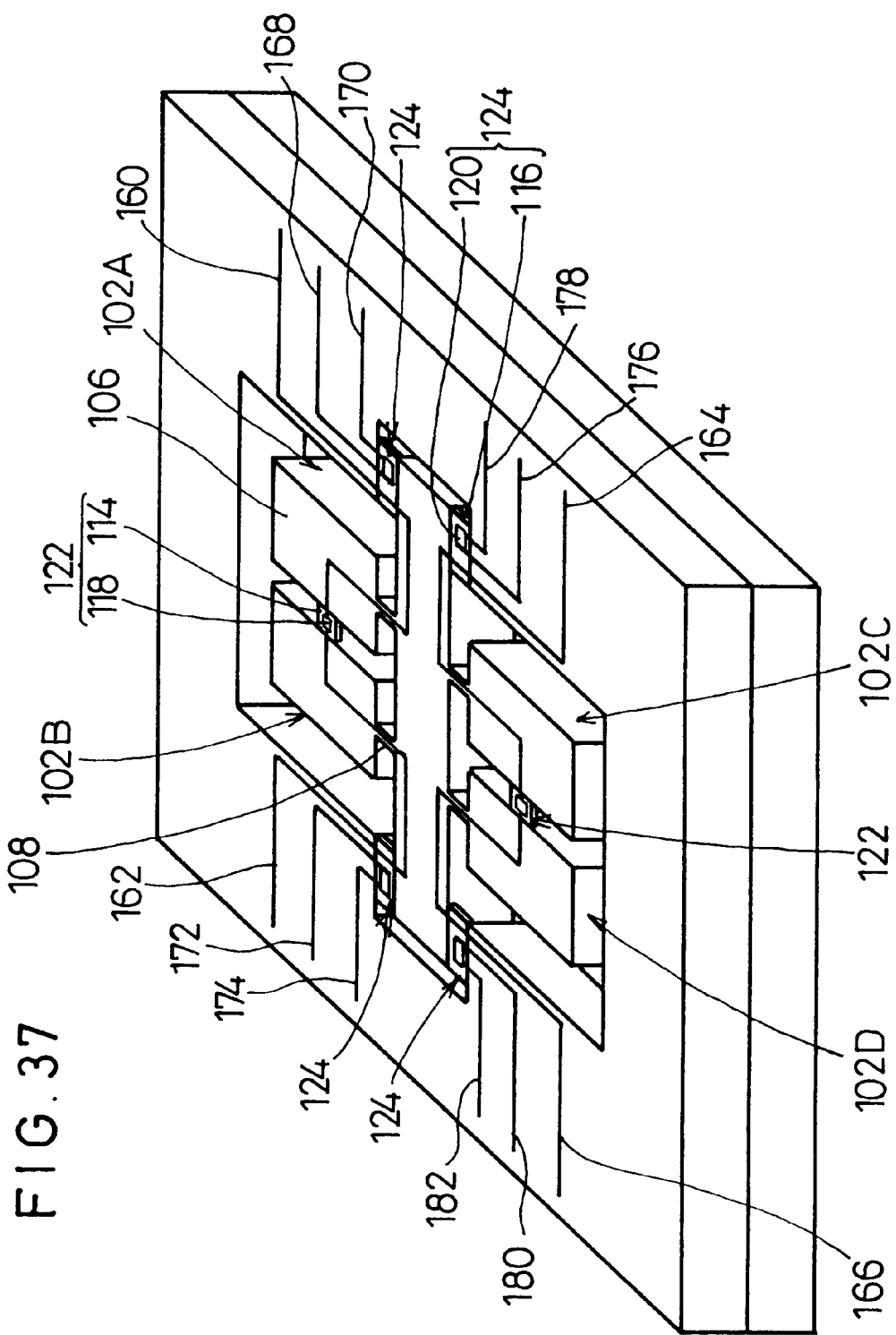
FIG. 37 schematically shows a perspective view illustrating an exemplary wiring formation pattern led from pairs of electrodes of piezoelectric/electrostrictive elements in the vibration gyro sensor according to the seventeenth embodiment.

This advantage will be explained on the basis of the vibration gyro sensor according to the seventeenth embodiment shown in FIG. 26. As shown in FIG. 37, the vibration gyro sensor is constructed by the integrated fired product made of ceramics (non-conductive materials) except for the respective pairs of electrodes of the driving means 122 and the detecting sections 124. Accordingly, the pair of electrodes for constructing the piezoelectric/electrostrictive element 118 of the driving means 122, two external wirings (160, 162) and (164, 166) led from the pair of electrodes, the pair of electrodes for constructing the piezoelectric/electrostrictive element 120 of the detecting section 124, and two external wirings (168, 170), (172, 174), (176, 178) and (180, 182) led from the pair of electrodes can be formed with an identical wiring material in accordance with the film formation method respectively.

The wiring formation pattern will be specifically explained below. The two wirings (160, 162) and (164, 166) which are led from the pairs of electrodes for constructing the piezoelectric/electrostrictive elements 118 of the driving means 122 provided between the respective main vibrator bodies 106, are formed such that they are led to the frame 104 via the upper surfaces of the main vibrator bodies 106 adjacent to the respective electrodes, the upper surfaces of the connecting sections 108, the upper surface of the support base 100, and the upper surfaces of the plate-shaped sections 116 of the detecting sections 124 adjacent to the vibrators 102A, 102B.

The two wirings (168, 170), (172, 174), (176, 178) and (180, 182) which are led from the pairs of electrodes of the piezoelectric/electrostrictive elements 120 of the respective detecting sections 124 are formed such that they are led to the frame 104 from the respective detecting sections 124.

As described above, the material for constructing the electrodes and the wirings is not specifically limited provided that the material is a conductor which can withstand the oxidizable atmosphere at a high temperature of a degree of the heat treatment temperature and the firing temperature. For example, the material may be a simple substance of metal or an alloy. The material may be a mixture of a metal or an alloy and an additive such as an insulative ceramic and glass. Further, no problem occurs when the material is a conductive ceramic. More appropriately, it is preferable to use electrode materials comprising major components of high melting point noble metals such as platinum, palladium, and rhodium, and alloys such as silver-palladium, silver-platinum, and platinum-palladium.

As for the method for forming the electrodes and the wirings, it is possible to appropriately adopt, for example, thick film methods such as screen printing, application methods such as dipping, and thin film methods such as ion beam, sputtering, vacuum vapor deposition, ion plating, CVD, and plating. However, there is no limitation thereto.

Next, other embodiments will be further explained. The embodiments described below may be grasped as modified embodiments of the various embodiments shown in FIGS. 1 to 21. Accordingly, components or parts corresponding to those shown in FIGS. 1 to 21 are designated by the same reference numerals, and duplicate explanation will be omitted.

Figure 38:
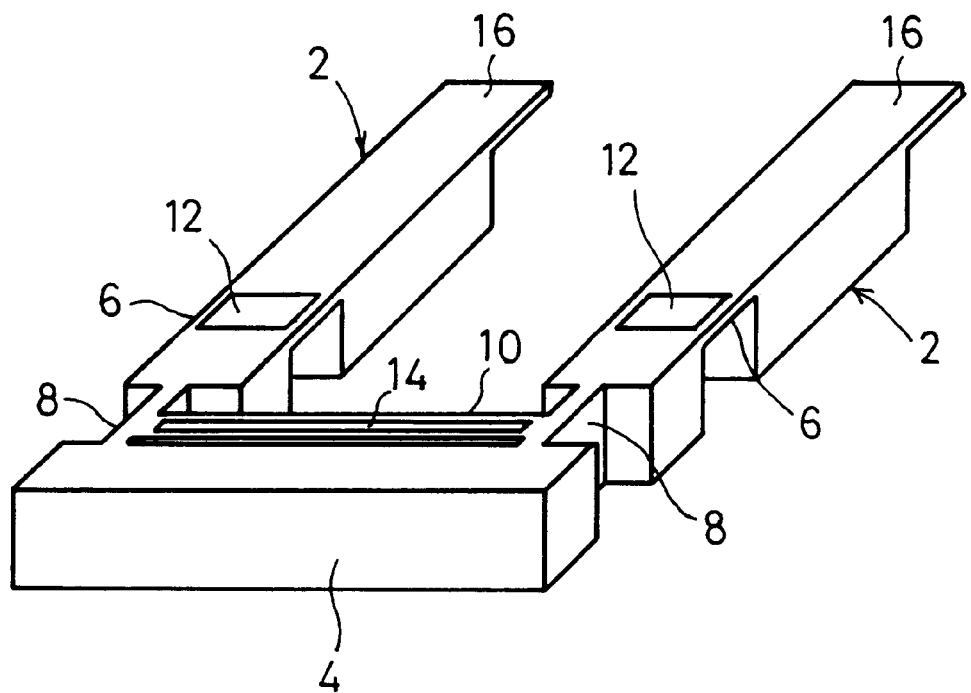
FIG. 38 schematically shows a perspective view illustrating a twenty-seventh preferred embodiment of the vibration gyro sensor according to the present invention.

At first, a vibration gyro sensor according to a twenty-seventh embodiment shown in FIG. 38 is constructed in approximately the same manner as the vibration gyro sensor according to the first embodiment shown in FIG. 1. However, the former is different from the latter in that a third plate-shaped section 10, on which a driving piezoelectric/electrostrictive element 14 is provided, is formed in an integrated manner so that the two second plate-shaped sections 8 are bridged with the third plate-shaped section 10.

Figure 39:
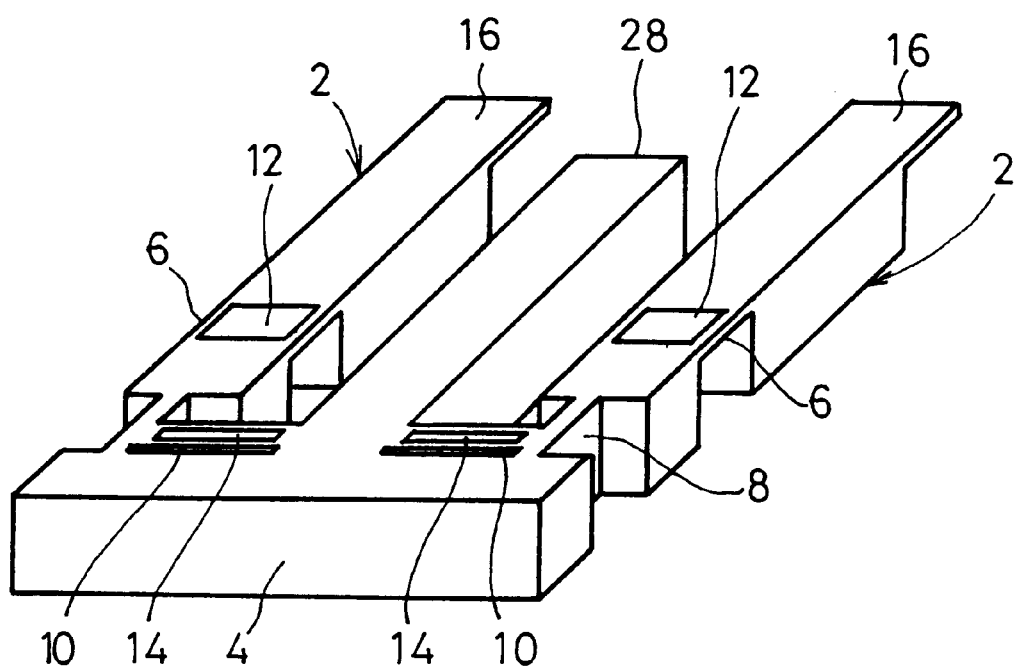
FIG. 39 schematically shows a perspective view illustrating a twenty-eighth preferred embodiment of the vibration gyro sensor according to the present invention.

A vibration gyro sensor according to a twenty-eighth embodiment shown in FIG. 39 is constructed in approximately the same manner as the vibration gyro sensor according to the third embodiment shown in FIG. 5. However, the former is different from the latter in that thin-walled third plate-shaped sections 10 are formed in an integrated manner between the support bar 28 and the second plate-shaped sections 8 disposed at the right and left thereof, and driving piezoelectric/electrostrictive elements 14 are formed on the third plate-shaped sections 10, respectively, so that the right and left two vibrators 2 are vibrated in an excited manner in mutually opposite directions by operating the driving piezoelectric/electrostrictive elements 14, respectively.

A vibration gyro sensor according to a twenty-ninth embodiment shown in FIG. 40 is constructed in approximately the same manner as the vibration gyro sensor according to the fifth embodiment shown in FIG. 7. However, the former is different from the latter in that thin-walled third plate-shaped sections 10 are formed in an integrated manner between the two second plate-shaped sections 8 and sides of the attachment frame 30 opposing thereto. Moreover, the driving piezoelectric/electrostrictive elements 14 are formed in an integrated manner on the third plate-shaped sections 10 in accordance with the film formation method.

Figure 41:
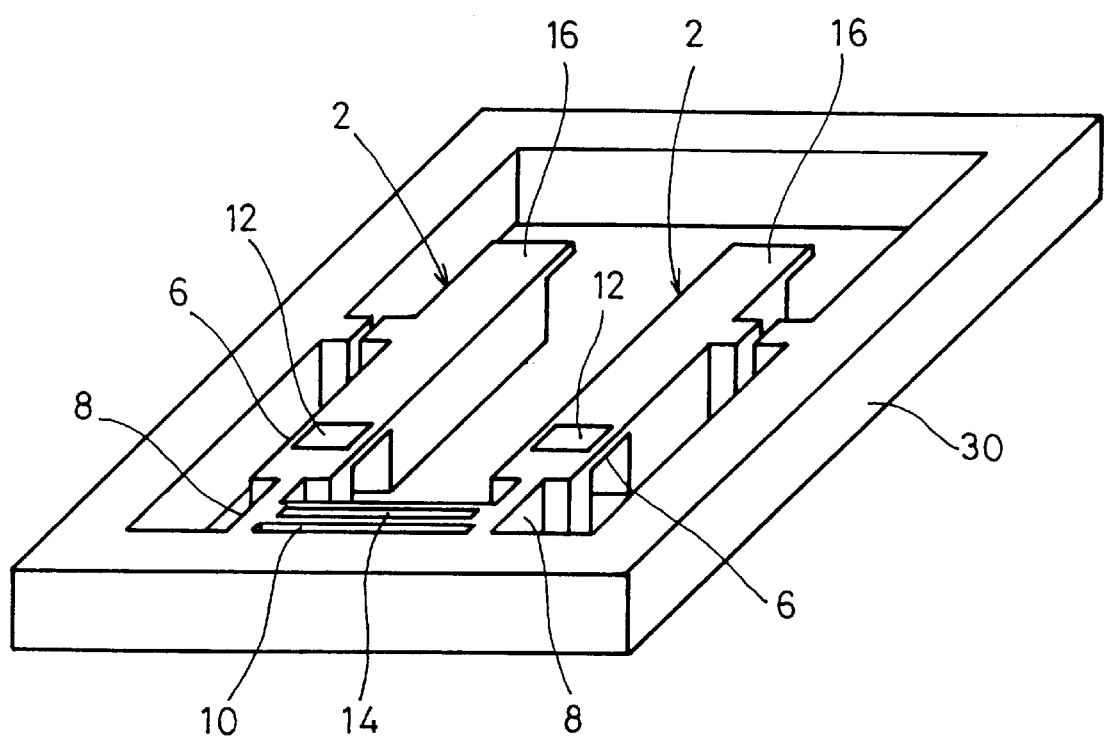
FIG. 41 schematically shows a perspective view illustrating a thirtieth preferred embodiment of the vibration gyro sensor according to the present invention.

A vibration gyro sensor according to a thirtieth embodiment shown in FIG. 41 is constructed in approximately the same manner as the vibration gyro sensor according to the seventh embodiment shown in FIG. 9. However, the former is different from the latter in that a thin-walled third plate-shaped section 10 is formed in an integrated manner between the two second plate-shaped sections 8 disposed in the attachment frame 30 having the rectangular frame structure. In addition, a driving piezoelectric/electrostrictive element 14 is formed in an integrated manner on the third plate-shaped section 10 in accordance with the film formation method.

The vibration gyro sensors according to the twenty-seventh to thirtieth embodiments are constructed such that the vibrators 2 are not driven directly, but the second plate-shaped sections 8 are driven. Accordingly, the vibrators 2 can make vibration without being restricted by the third plate-shaped section 10 which constructs the driving means 122. Therefore, the Q factor of the vibrator 2 is increased, and hence the vibration is not readily attenuated. Thus it is easy to handle the detection signal detected by the detecting piezoelectric/electrostrictive element 12. Further, the amplitude of vibration of the vibrator 2 is increased, and it is possible to further improve the sensitivity.

In the vibration gyro sensors according to the first to thirtieth embodiments, the first plate-shaped section 6 for constructing the detecting section is formed to be more thin-walled than the vibrator 2, and they are integrated with each other in structure. However, in view of the function, the first plate-shaped section 6 or the detecting section is constructed distinctly from the vibrator 2.

The following various embodiments are constructed such that the vibrator 2 and the detecting section are integrated with each other both in structure and function. Such embodiments are more advantageous in order to improve the sensitivity. Explanation for such embodiments will be made in an specified manner below. Components or parts corresponding to those shown in FIGS. 1 to 21 are designated by the same reference numerals, duplicate explanation of which will be omitted.

Figure 42:
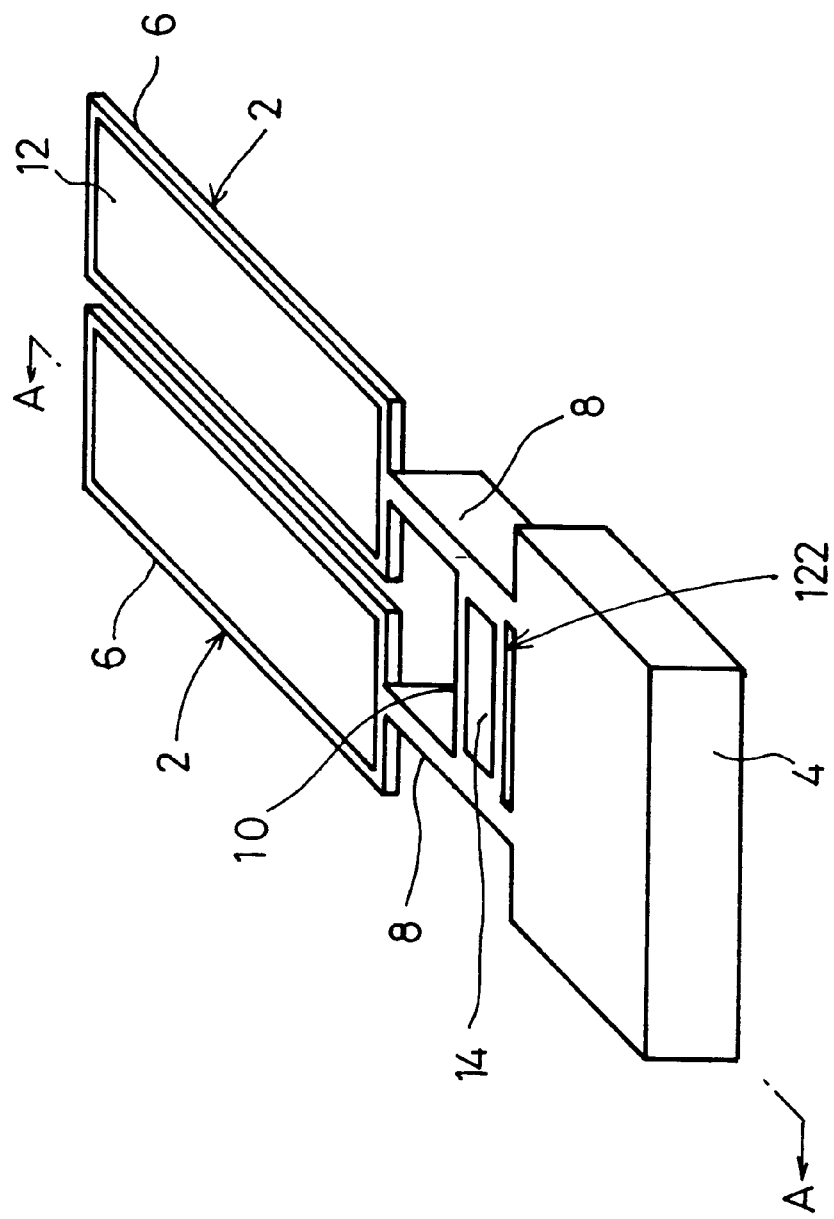
FIG. 42 schematically shows a perspective view illustrating a thirty-first preferred embodiment of the vibration gyro sensor according to the present invention.
Figure 43:
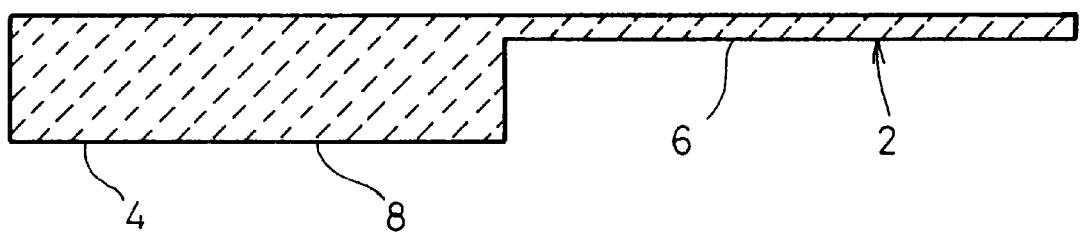
FIG. 43 shows a cross-sectional view taken along a line A—A shown in FIG. 42.

At first, a vibration gyro sensor according to a thirty-first embodiment shown in FIG. 42 is constructed in an integrated manner by using an integrated fired product made of ceramics to have a structure comprising a rectangular block-shaped support base 4 having a predetermined thickness, two second plate-shaped sections 8 which extend from proximal ends on a longitudinal side surface of the support base 4 in a direction perpendicular to the longitudinal side surface of the support base 4 while being separated from each other by a predetermined spacing distance, two first plate-shaped sections 6 each having an approximately strip-shaped (wide and lengthy) planar configuration which extend from proximal ends on upper portions of free ends of the respective second plate-shaped sections 8 in the direction perpendicular to the longitudinal side surface of the support base 4 while being separated from each other by a predetermined spacing distance (see FIG. 43), and a third plate-shaped section 10 having an approximately strip-shaped planar configuration formed to bridge the two second plate-shaped sections 8 therewith. In this embodiments, vibrators 2 are constructed by the first plate-shaped sections 6.

The width of the second plate-shaped section 8 is thinner than the width of the first plate-shaped section 6. The second plate-shaped section 8 is a thin-walled plate-shaped section having a principal surface which extends in the direction perpendicular to the first plate-shaped section 6. The first plate-shaped section 6 (vibrator 2) is connected in an integrated manner to the support base 4 via the second plate-shaped section 8.

The third plate-shaped section 10 is connected in an integrated manner between portions of the second plate-shaped sections 8 in the vicinity of the support base 4.

In the vibration gyro sensor according to the thirty-first embodiment, detecting piezoelectric/electrostrictive elements 12 are formed on approximately entire surfaces of upper surfaces of the respective first plate-shaped sections 6 which are formed to be wide. A driving piezoelectric/electrostrictive element 14 is formed on an approximately entire surface of an upper surface of the third plate-shaped section 10.

In the vibration gyro sensor according to the thirty-first embodiment, the vibrator 2 is constructed by the wide and lengthy first plate-shaped section 6. Accordingly, the vibrator 2 has a large mass and a large moment. As a result, the velocity (a amplitude) brought about by the driving vibration is increased. Therefore, it is possible to further improve the sensitivity. Further, the detecting piezoelectric/electrostrictive element 12 is formed on the approximately entire surface of the first plate-shaped section 6. Therefore, it is possible to accumulate a large amount of electric charge, and thus this embodiment is advantageous in the current detection system.

Figure 44:
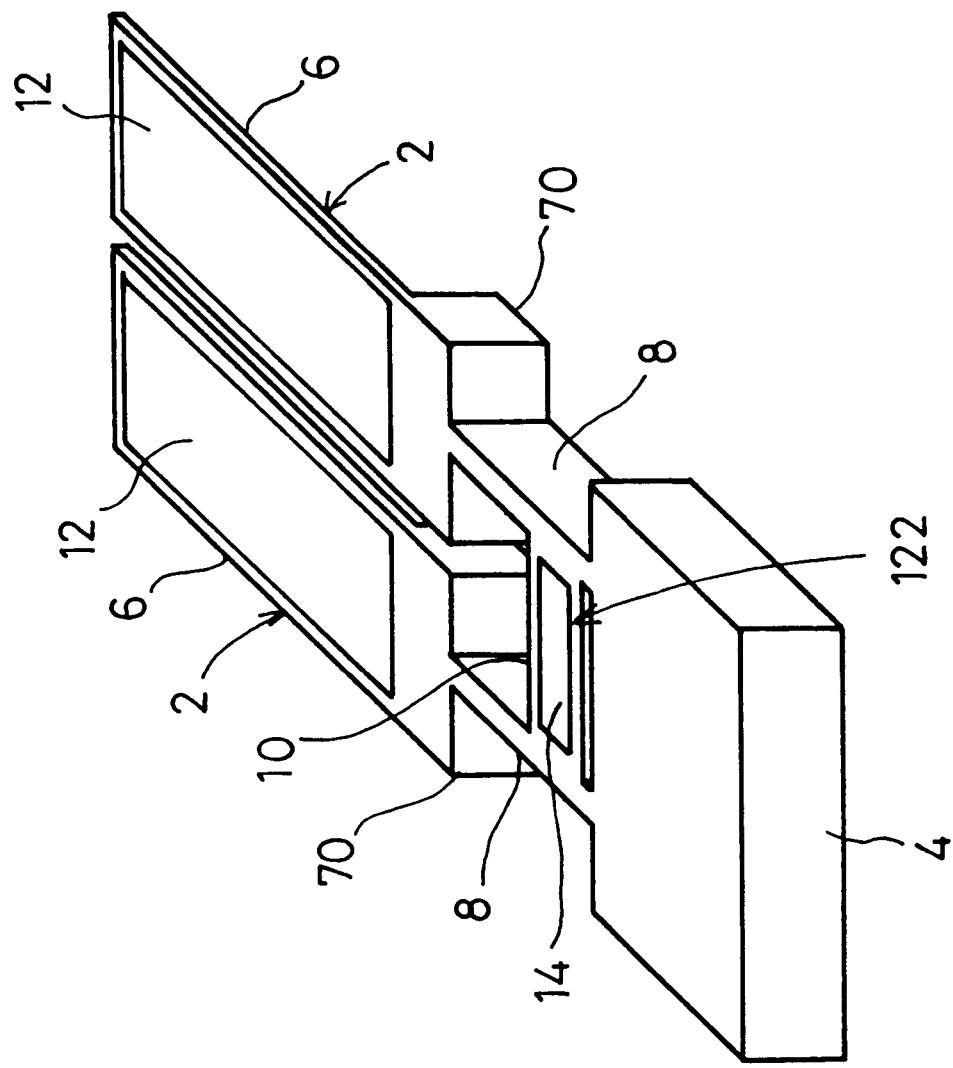
FIG. 44 schematically shows a perspective view illustrating a thirty-second preferred embodiment of the vibration gyro sensor according to the present invention.

A vibration gyro sensor according to a thirty-second embodiment shown in FIG. 44 is constructed in approximately the same manner as the vibration gyro sensor according to the thirty-first embodiment (see FIG. 42). However, the former is different from the latter in that thick-walled block sections 70 are formed in an integrated manner between the first plate-shaped sections 6 and the second plate-shaped sections 8 respectively.

In the vibration gyro sensor according to the thirty-first embodiment shown in FIG. 42, the first plate-shaped section 6 is directly formed on the second plate-shaped section 8. Therefore, it is feared that the boundary portion between the first plate-shaped section 6 and the second plate-shaped section 8 may be disadvantageous from a viewpoint of strength. However, in the vibration gyro sensor according to the thirty-second embodiment, the presence of the block section 70 makes it possible to increase the strength of the boundary portion. Accordingly, this embodiment is advantageous to improve the reliability.

Figure 45:
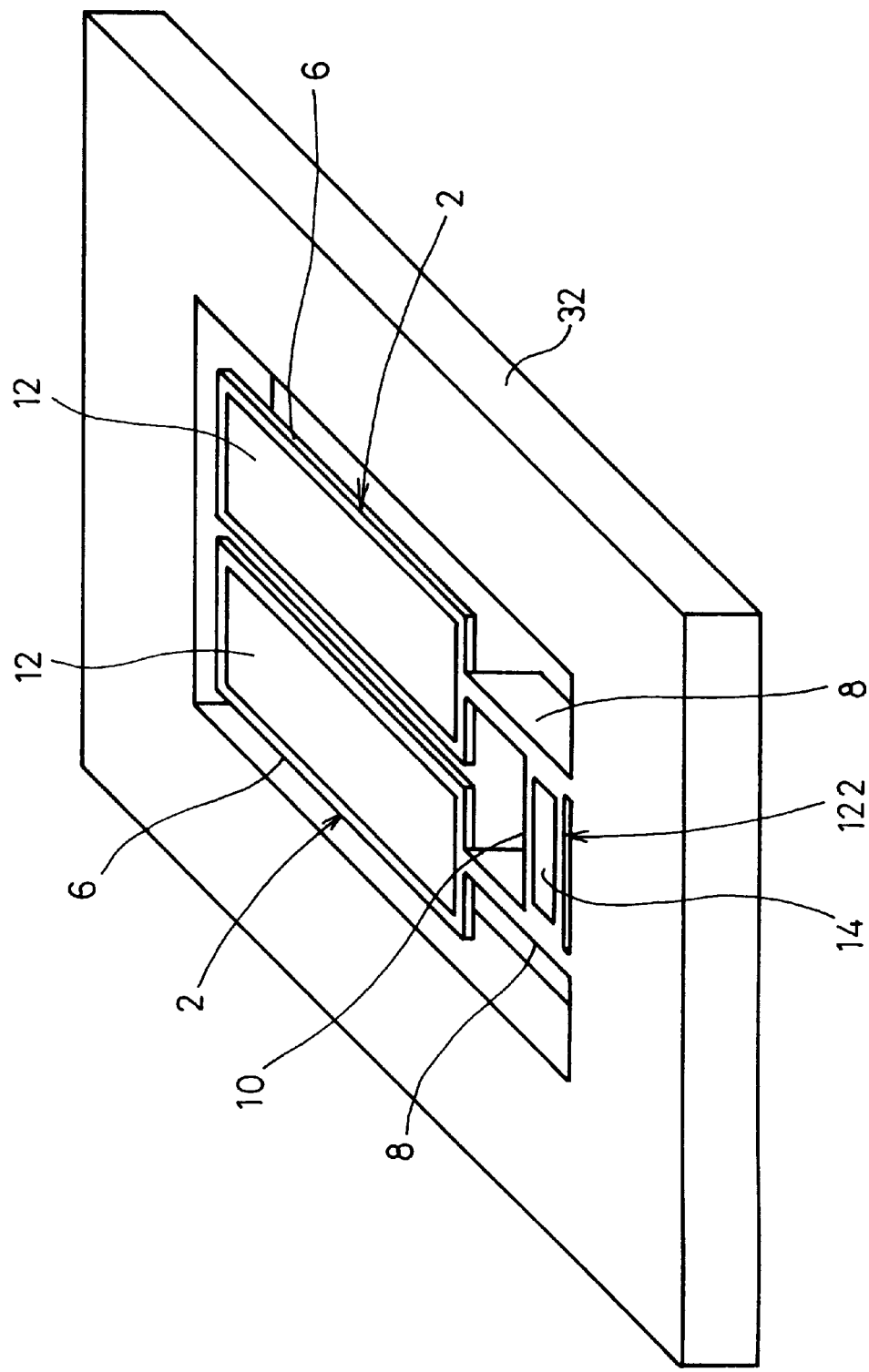
FIG. 45 schematically shows a perspective view illustrating a thirty-third preferred embodiment of the vibration gyro sensor according to the present invention.

Next, a vibration gyro sensor according to a thirty-third embodiment shown in FIG. 45 is constructed in approximately the same manner as the vibration gyro sensor according to the thirty-first embodiment shown in FIG. 42. However, the former is different from the latter in that the support base 4 is provided as a rectangular frame 32. Two second plate-shaped sections 8 are formed in an integrated manner so that they extend from proximal ends disposed on one short side of inner frame wall surfaces of the frame 32 in a direction parallel to long sides of the frame 32 while being separated from each other by a predetermined spacing distance.

For example, the vibration gyro sensor according to the thirty-first embodiment shown in FIG. 42 includes the block-shaped support base 4. Therefore, such a vibration gyro sensor suffers a from installation problem in that when the support base 4 is installed and fixed by using an adhesive or the like, the area for fixation is small. It also suffers from strength problems since the rigidity of the support base 4 tends to be lowered, and the vibration is transmitted to the support bars 4. However, in this embodiment, the support base 4 is provided in the form of the frame 32, and thus the degree of freedom for attachment is increased. Further, the rigidity is also improved. Therefore, the foregoing problems can be solved, and hence this embodiment is practically appropriate.

Figure 46:
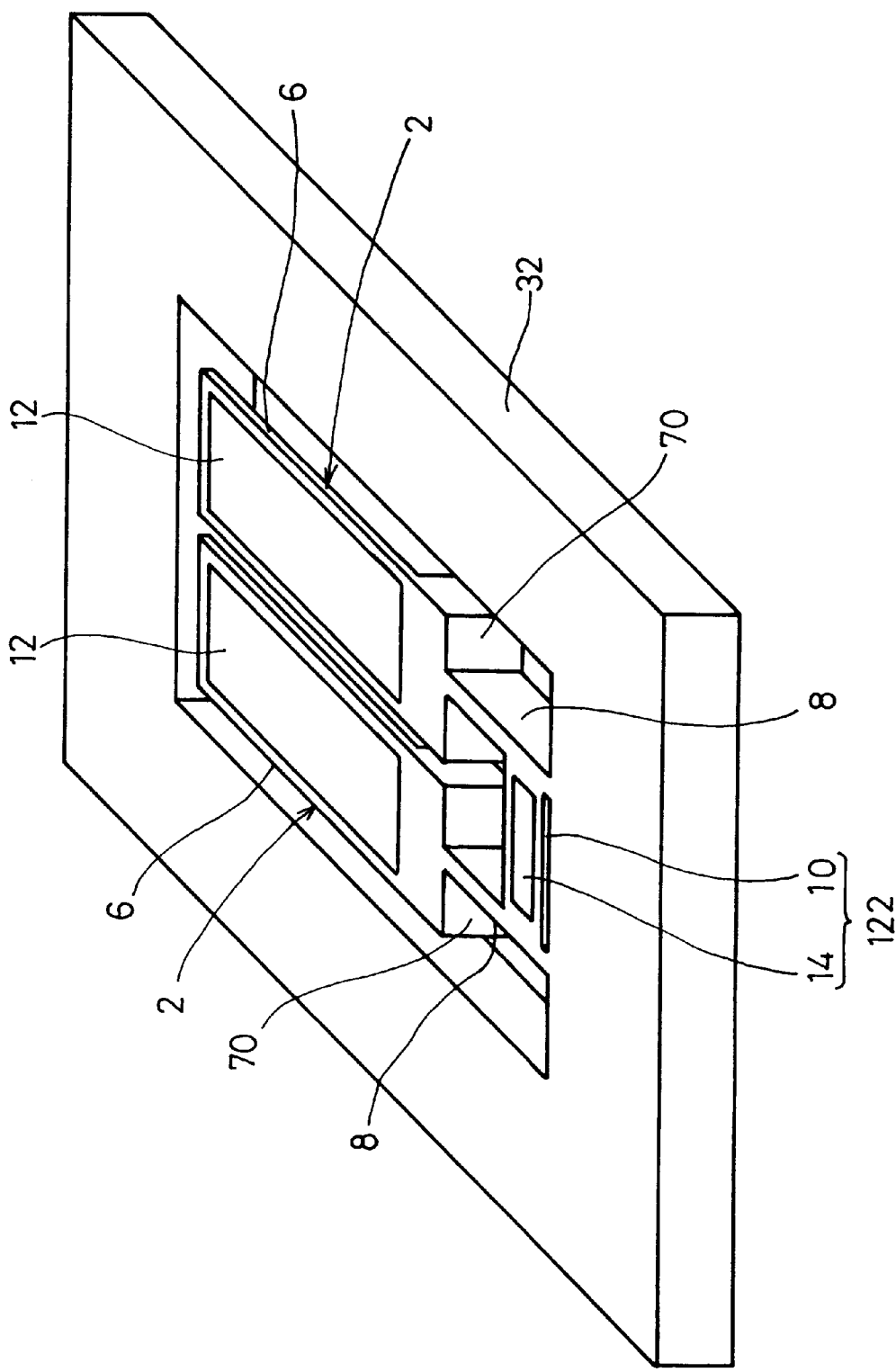
FIG. 46 schematically shows a perspective view illustrating a thirty-fourth preferred embodiment of the vibration gyro sensor according to the present invention.

Next, a vibration gyro sensor according to a thirty-fourth embodiment shown in FIG. 46 is constructed in approximately the same manner as the vibration gyro sensor according to the thirty-third embodiment (FIG. 45). However, the former is different from the latter in that thick-walled block sections 70 are formed in an integrated manner between the first plate-shaped sections 6 and the second plate-shaped sections 8, respectively.

In this embodiment, the presence of the block section 70 makes it possible to increase the strength of the boundary portion between the first plate-shaped section 6 and the second plate-shaped section 8. Further, this embodiment is advantageous from viewpoints of installation and rigidity because the frame 32 is used.

Figure 47:
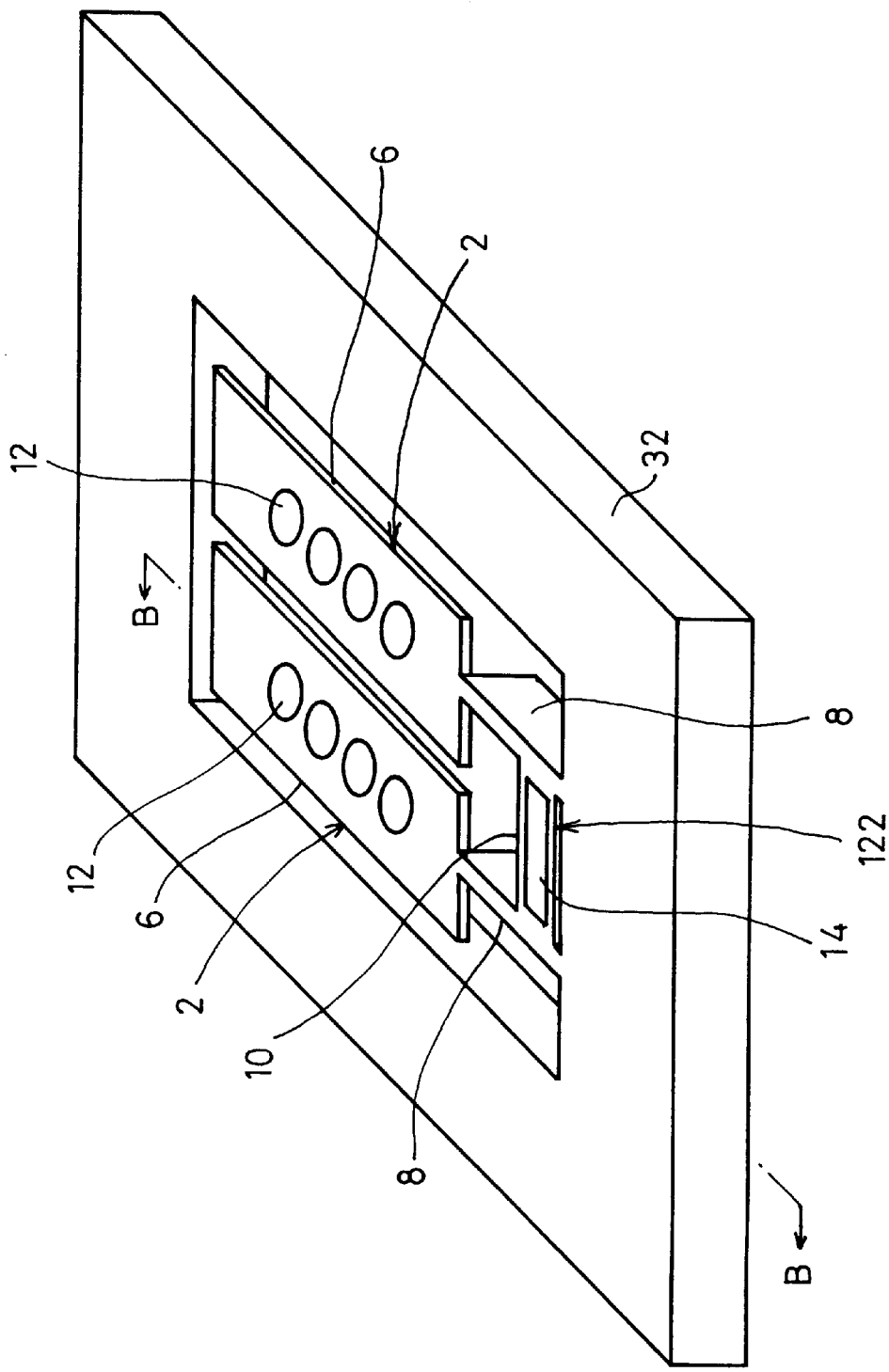
FIG. 47 schematically shows a perspective view illustrating a thirty-fifth preferred embodiment of the vibration gyro sensor according to the present invention.

Next, a vibration gyro sensor according to a thirty-fifth embodiment shown in FIG. 47 is constructed in approximately the same manner as the vibration gyro sensor according to the thirty-third embodiment (FIG. 45). However, the former is different from the latter in that a plurality of recesses 72 are formed on the back surface of the first plate-shaped section 6 as shown in FIG. 48. Moreover detecting piezoelectric/electrostrictive elements 12 are formed in an array of islands at positions on the upper surface of the first plate-shaped section 6 corresponding to the plurality of recesses 72. The embodiment shown in FIG. 47 is illustrative of a structure in which the recess 72 has a circular contour, and the detecting piezoelectric/electrostrictive element 12 has a circular planar configuration.

In the vibration gyro sensor according to the thirty-third embodiment, the strength is lowered at the portions of the first plate-shaped section 6 on which the recesses 72 are formed. Therefore, when the first plate-shaped section 6 is deformed by the Coriolis force, a strain, which is larger than that obtained at portions without having any recess 72, is generated at the portions on which the recesses 72 are formed. Accordingly, a large detection output can be obtained by forming the detecting piezoelectric/electrostrictive elements 12 at the portions corresponding to the recesses 72. Thus it is possible to further improve the sensitivity.

Figure 49:
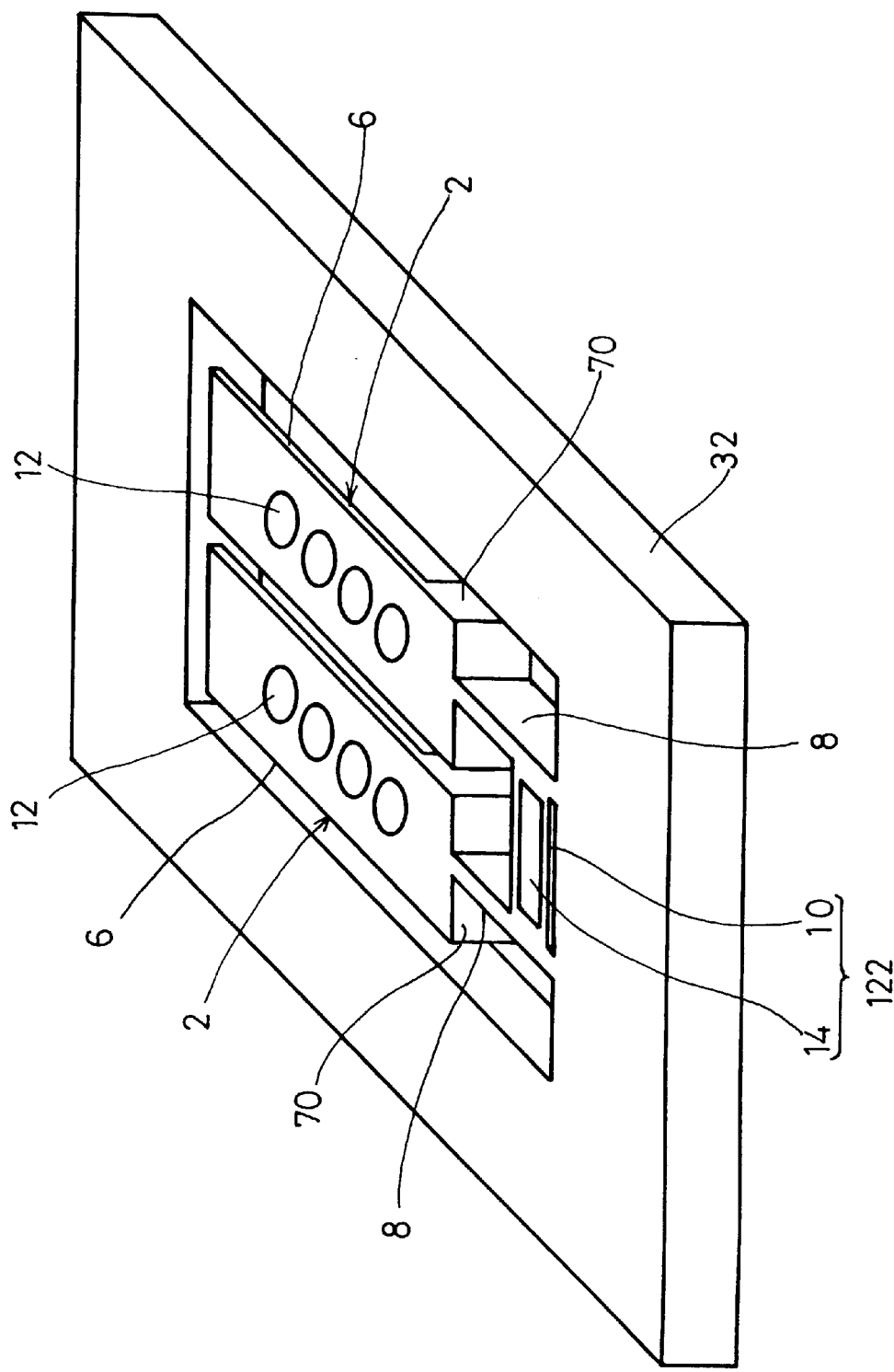
FIG. 49 schematically shows a perspective view illustrating a thirty-sixth preferred embodiment of the vibration gyro sensor according to the present invention.

Next, a vibration gyro sensor according to a thirty-sixth embodiment shown in FIG. 49 is constructed in approximately the same manner as the vibration gyro sensor according to the thirty-fifth embodiment shown in FIG. 47. However, the former is different from the latter in that thick-walled block sections 70 are provided in an integrated manner between the first plate-shaped sections 6 and the second plate-shaped sections 8, respectively.

In this embodiment, the presence of the block section 70 makes it possible to increase the strength of the boundary portion between the first plate-shaped section 6 and the second plate-shaped section 8. Further, this embodiment is advantageous in terms of reliability and sensitivity, because a large output can be obtained.

Figure 50:
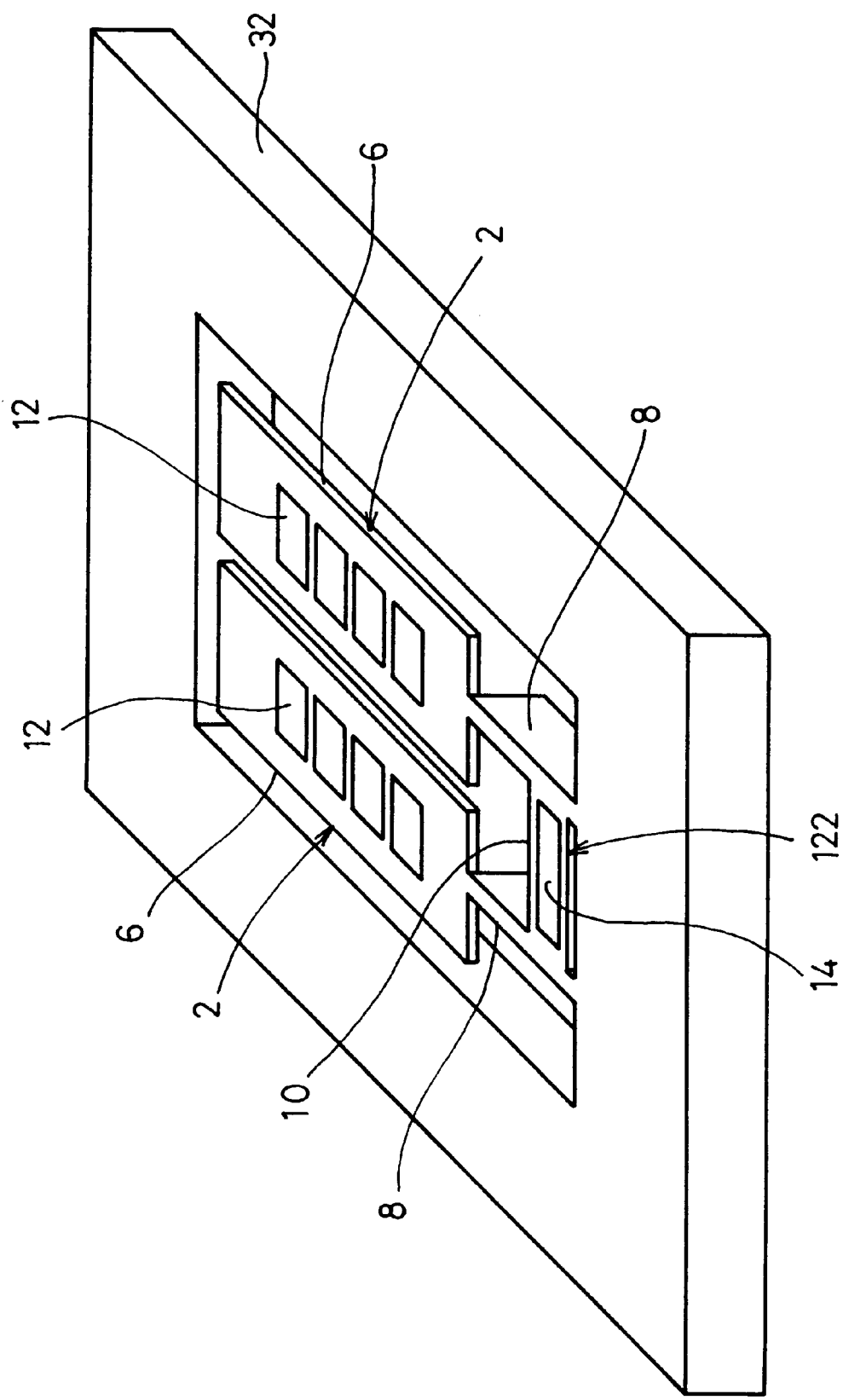
FIG. 50 schematically shows a perspective view illustrating a thirty-seventh preferred embodiment of the vibration gyro sensor according to the present invention.
Figure 51:
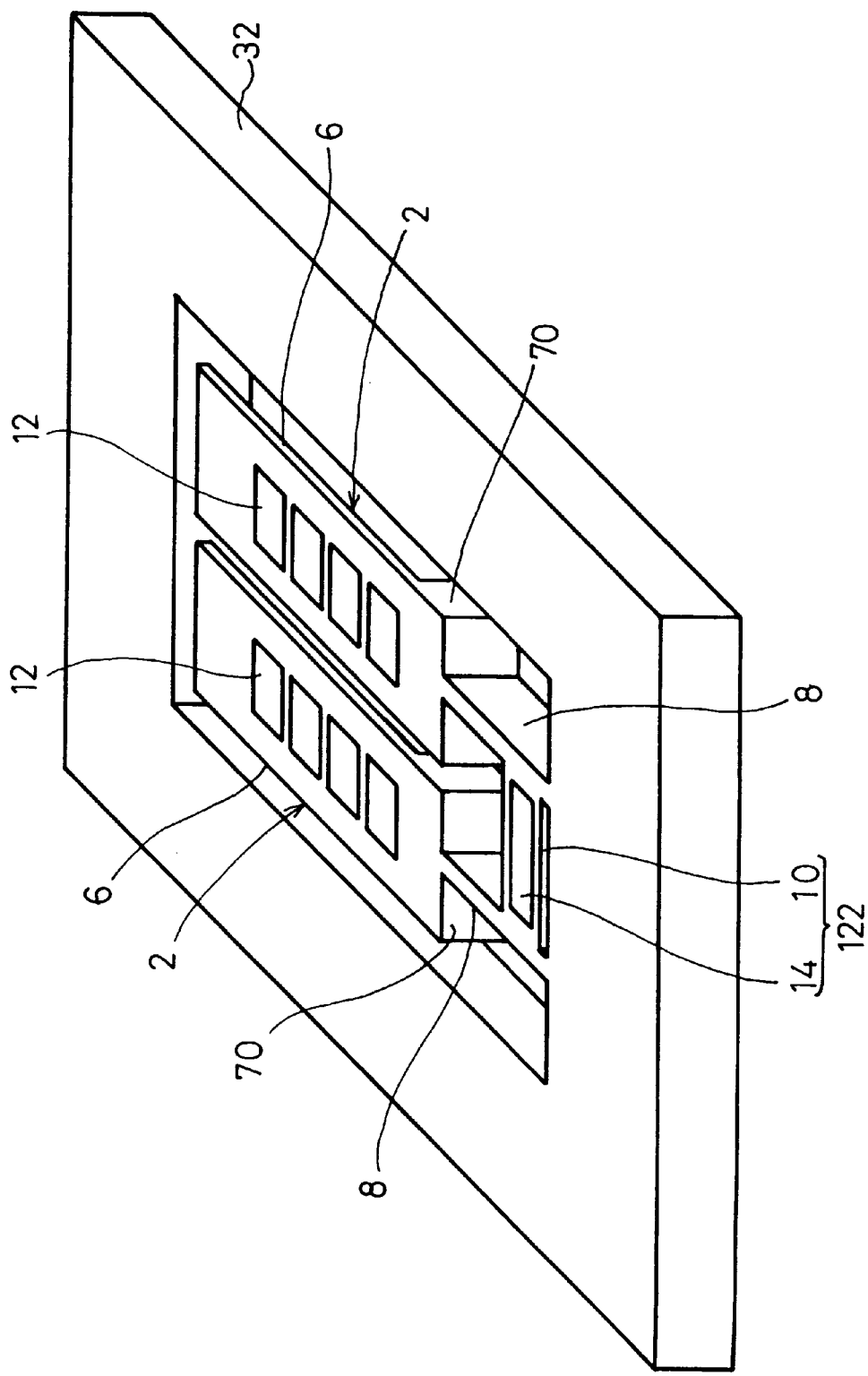
FIG. 51 schematically shows a perspective view illustrating a thirty-eighth preferred embodiment of the vibration gyro sensor according to the present invention.

The vibration gyro sensors according to the thirty-fifth and thirty-sixth embodiments described above are illustrative of the structure in which the detecting piezoelectric/electrostrictive elements 12 each having the approximately circular planar configuration are formed in the array of islands on the upper surface of the first plate-shaped section 6. Alternatively, as shown in FIGS. 50 and 51, both of the contour of each of the recesses 72 (see FIG. 48) and the detecting piezoelectric/electrostrictive elements 12 may be square or rectangular (thirty-seventh and thirty-eighth embodiments). Those conceivable as the planar configuration of the recess 72 and the detecting piezoelectric/electrostrictive element 12 include, for example, circular and rectangular configurations as described above, as well as rhombic configurations. The shape of these components is not specifically limited.

Figure 52:
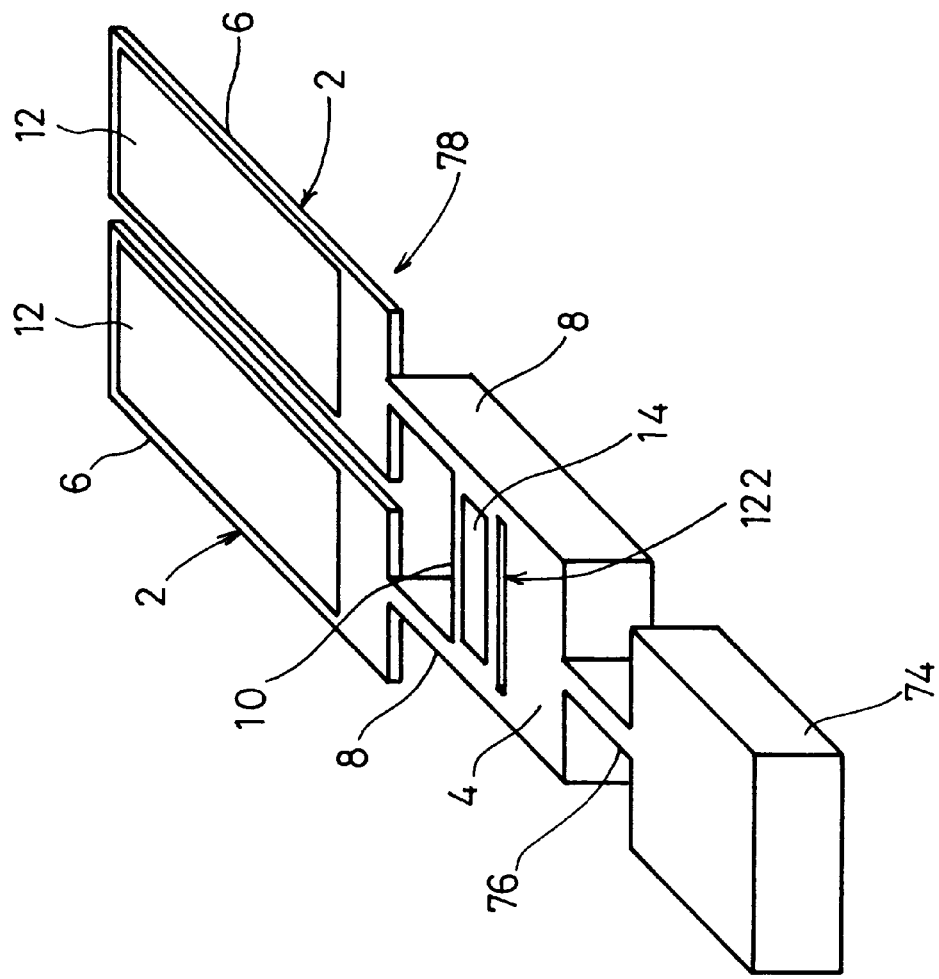
FIG. 52 schematically shows a perspective view illustrating a thirty-ninth preferred embodiment of the vibration gyro sensor according to the present invention.

Next, a vibration gyro sensor according to a thirty-ninth embodiment shown in FIG. 52 is constructed in approximately the same manner as the vibration gyro sensor according to the thirty-first embodiment shown in FIG. 42. However, the former is different from the latter in that an attachment section 74 for fixing the support base 4 is provided in an integrated manner on a surface of the support base 4 opposite to the surface on which the second plate-shaped sections 8 are formed. In addition, a support section (fifth plate-shaped section) 76, which is thin-walled in the widthwise direction of the support base 4, is provided in an integrated manner between the support base 4 and the attachment section 74.

Namely, the vibration gyro sensor according to the thirty-ninth embodiment has a structure in which a tuning fork 78 is constructed by the support base 4, the two second plate-shaped sections 8, and the two vibrators 2 (first plate-shaped sections 6), and the tuning fork 78 is connected in an integrated manner to the attachment section 74 via the support section (fifth plate-shaped section) 76.

In general, the mode, which is obtained when the tuning fork 78 is supported by an arbitrary fixing means with a support rod and the tuning fork 78 is vibrated, includes a mode in which the two vibrators 2 of the tuning fork 78 are vibrated in mutually opposite directions, and a mode in which the two vibrators 2 are vibrated in an identical direction, respectively.

The mode, which is required for the vibration gyro sensor, is the former mode (the mode of vibration in mutually opposite directions). The latter mode is an unnecessary mode for the vibration gyro sensor. Accordingly, when the frequency of the necessary mode is greatly different from the frequency of the unnecessary mode, they can be easily discriminated from each other, and the detection accuracy in the necessary mode can be improved.

Figure 53:
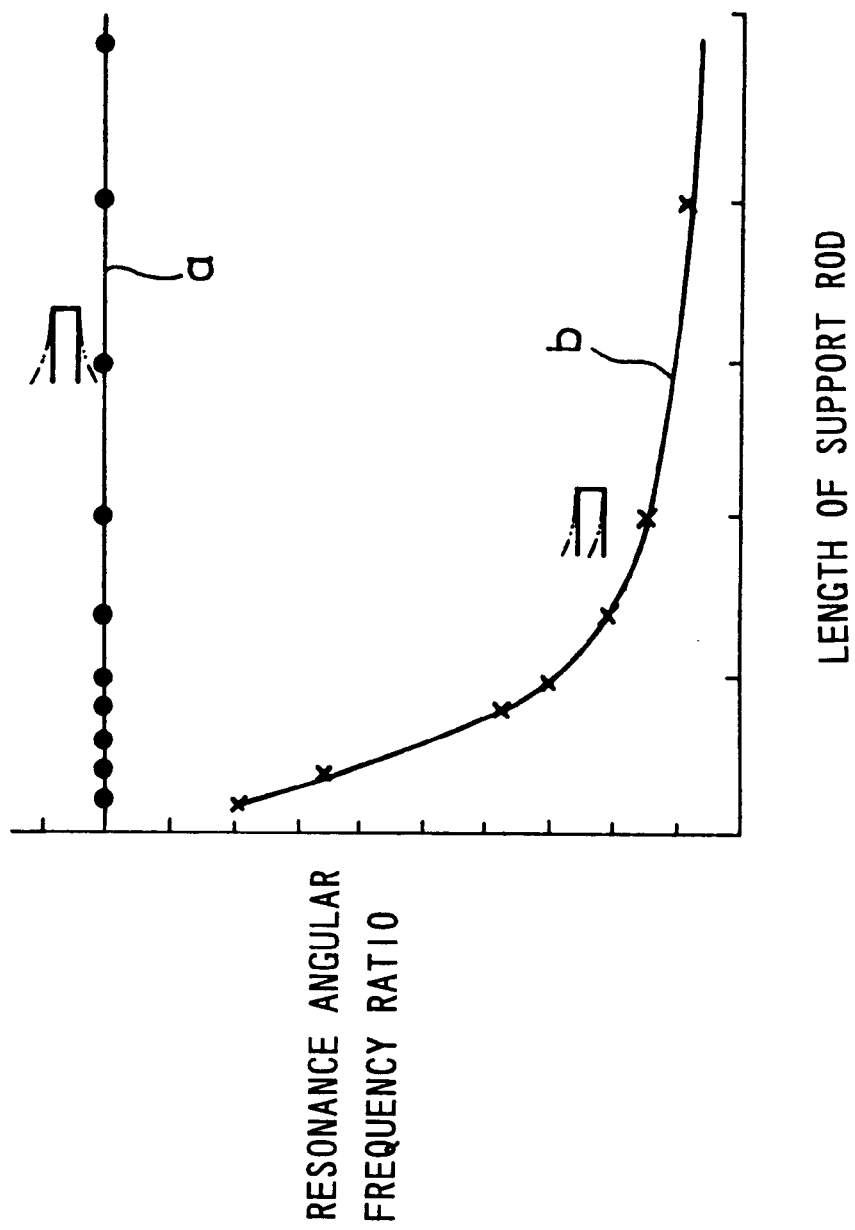
FIG. 53 shows characteristic curves illustrating the change in resonance angular frequency ratio depending on the length of the support rod for supporting the tuning fork.

FIG. 53 shows how the frequency in the necessary mode and the frequency in the unnecessary mode change depending on the length of the support rod. In FIG. 53, a curve "a" indicates a characteristic of the necessary mode, and a curve "b" indicates a characteristic of the unnecessary mode. As understood from FIG. 53, when the length of the support rod is large, the frequencies in the both modes greatly differ. However, as the support rod becomes short, the frequencies in the both modes approach to one another, and it is difficult to discriminate them from each other. Therefore, the short length is disadvantageous from a viewpoint of detection accuracy.

On the contrary, in the vibration gyro sensor according to the thirty-ninth embodiment, the support base 4 is connected in the integrated manner to the attachment section 74 via the support section 76. Therefore, the support section 76 functions as the support rod, making it possible to improve the detection accuracy.

Figure 54:
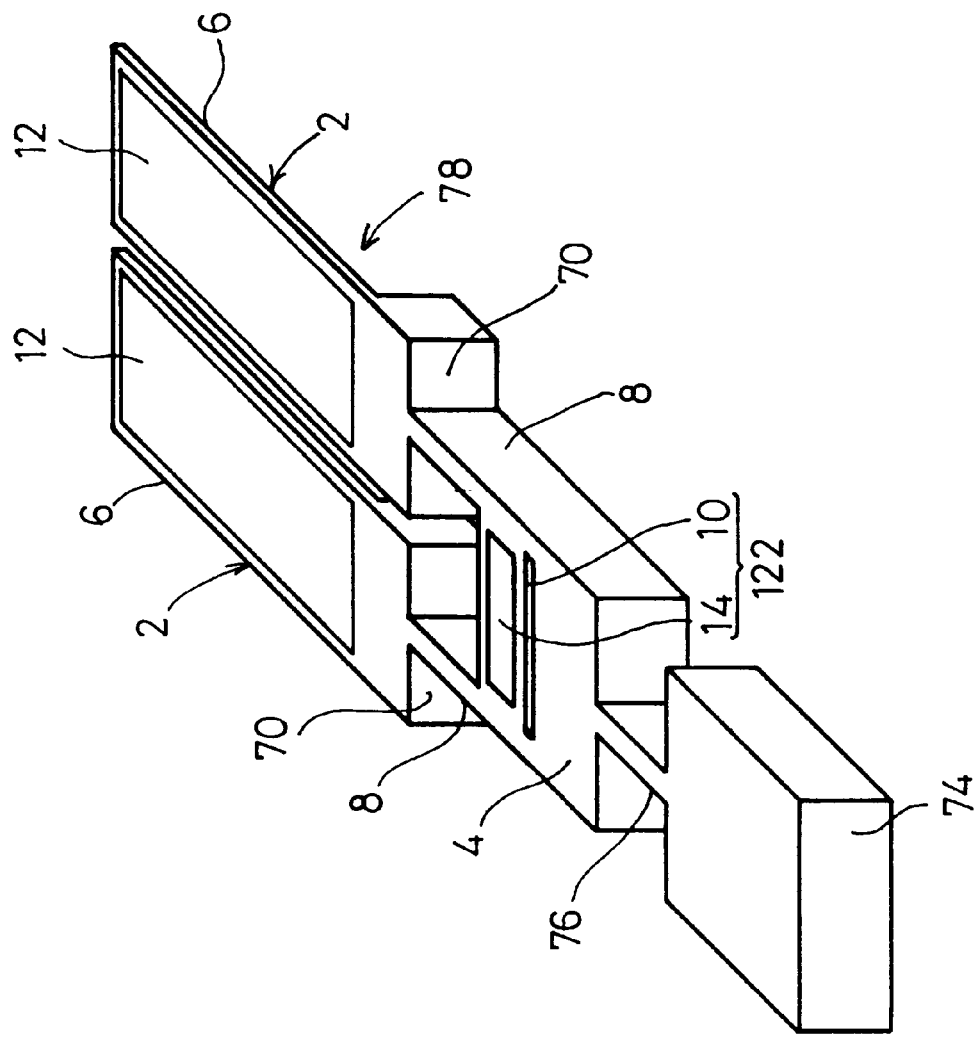
FIG. 54 schematically shows a perspective view illustrating a fortieth preferred embodiment of the vibration gyro sensor according to the present invention.

Next, a vibration gyro sensor according to a fortieth embodiment shown in FIG. 54 is constructed in approximately the same manner as the vibration gyro sensor according to the thirty-ninth embodiment shown in FIG. 52. However, the former is different from the latter in that thick-walled block sections 70 are provided in an integrated manner between the first plate-shaped sections 6 and the second plate-shaped sections 8 respectively.

In this embodiment, the presence of the block section 70 makes it possible to increase the strength of the boundary portion between the first plate-shaped section 6 and the second plate-shaped section 8. Moreover, the vibration gyro sensor has a tuning fork 78 which is constructed in an integrated manner on the support section 76. Therefore, this embodiment is advantageous in order to improve the detection accuracy.

Figure 55:
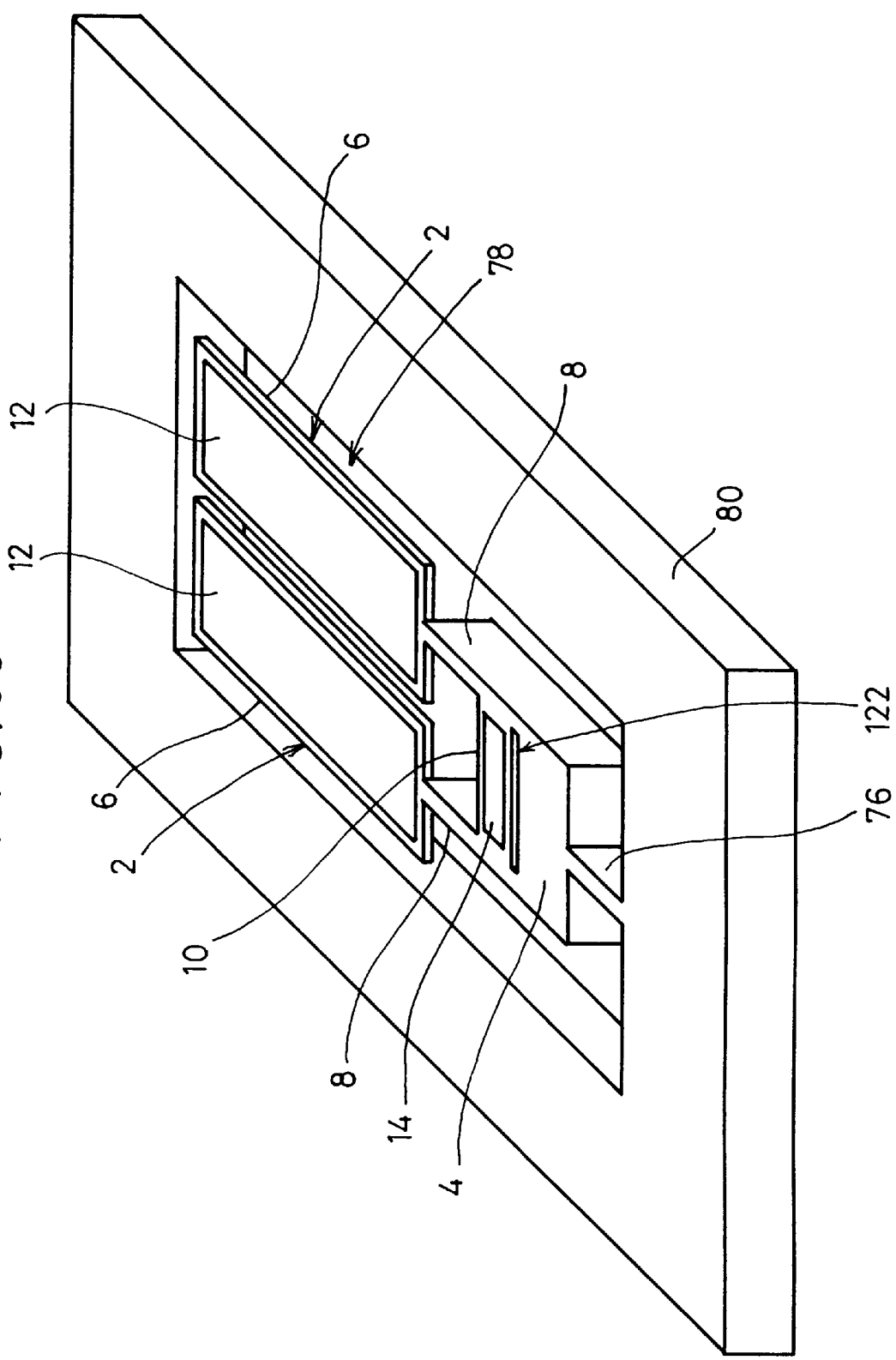
FIG. 55 schematically shows a perspective view illustrating a forty-first preferred embodiment of the vibration gyro sensor according to the present invention.

Next, a vibration gyro sensor according to a forty-first embodiment shown in FIG. 55 is constructed in approximately the same manner as the vibration gyro sensor according to the thirty-ninth embodiment shown in FIG. 52. However, the former is different from the latter in that the attachment section 76 has a form of a rectangular frame (hereinafter referred to as "attachment frame 80"). The support section 76 is formed in an integrated manner so that it extends from its proximal end disposed on one short side of inner frame wall surfaces of the attachment frame 80 in a direction parallel to long sides of the attachment frame 80.

In this embodiment, it is possible to improve the detection accuracy. This embodiment is practically preferred from viewpoints of, for example, the degree of freedom for attachment and rigidity, because the attachment section is provided in the form of the attachment frame 80.

Figure 56:
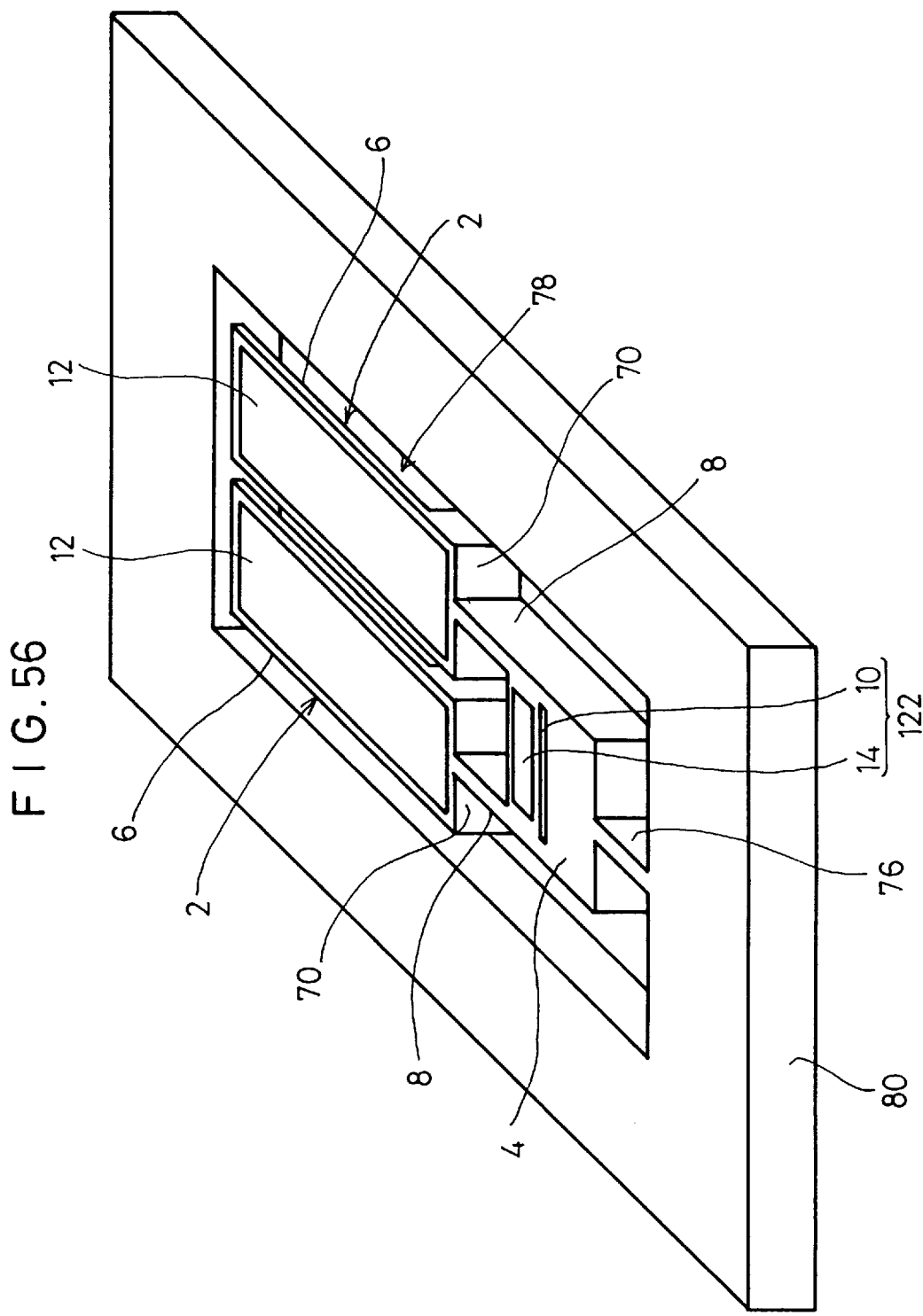
FIG. 56 schematically shows a perspective view illustrating a forty-second preferred embodiment of the vibration gyro sensor according to the present invention.

Next, a vibration gyro sensor according to a forty-second embodiment shown in FIG. 56 is constructed in approximately the same manner as the vibration gyro sensor according to the forty-first embodiment shown in FIG. 55. However, the former is different from the latter in that thick-walled block sections 70 are provided in an integrated manner between the first plate-shaped sections 6 and the second plate-shaped sections 8, respectively.

In this embodiment, the presence of the block section 70 makes it possible to increase the strength of the boundary portion between the first plate-shaped section 6 and the second plate-shaped section 8. Moreover, this embodiment is advantageous from viewpoints of installation and rigidity, because the attachment frame 80 is used.

Figure 57:
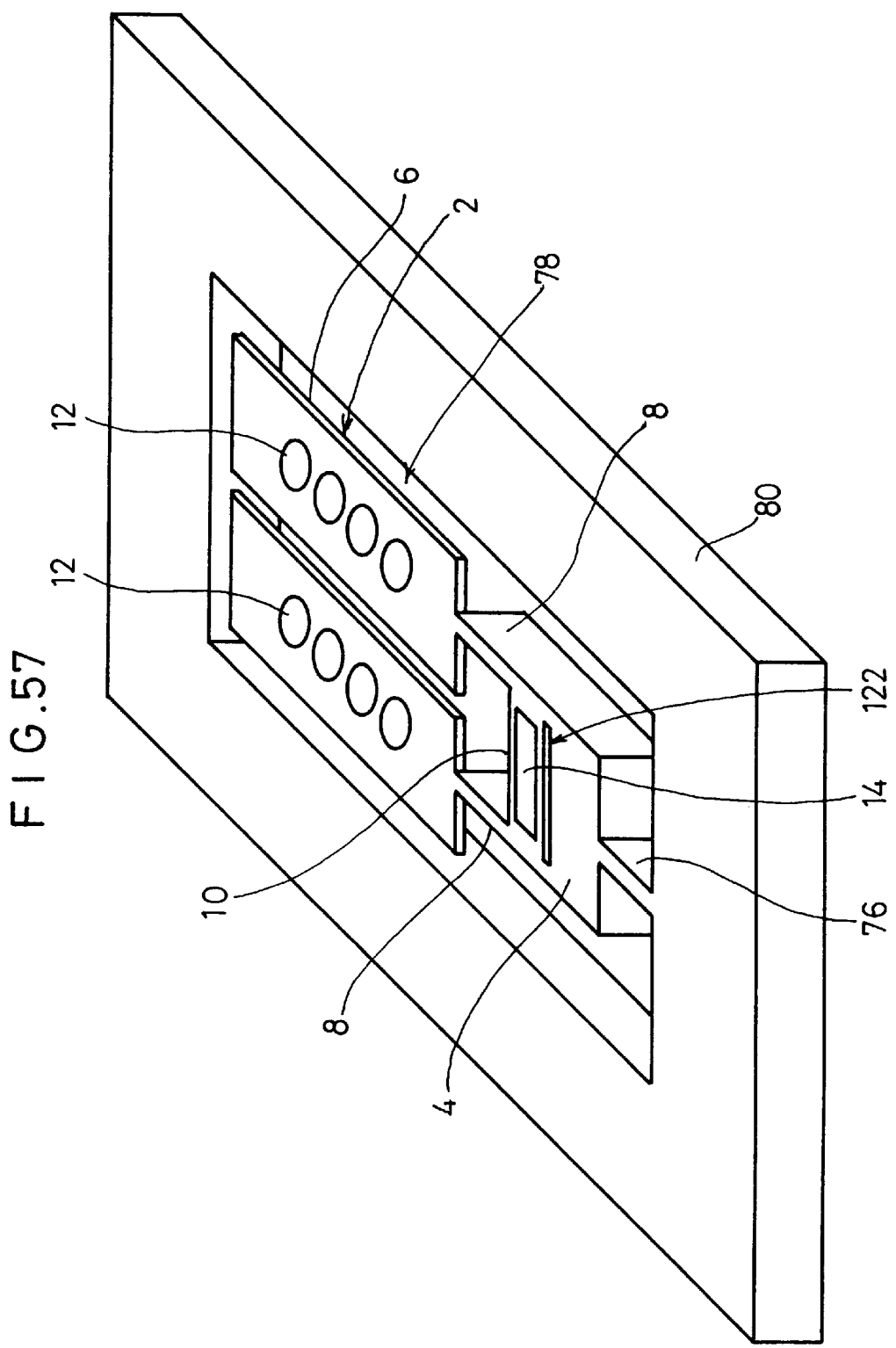
FIG. 57 schematically shows a perspective view illustrating a forty-third preferred embodiment of the vibration gyro sensor according to the present invention.

Next, a vibration gyro sensor according to a forty-third embodiment shown in FIG. 57 is constructed in approximately the same manner as the vibration gyro sensor according to the forty-first embodiment shown in FIG. 55. However, the former is different from the latter in that a plurality of recesses 72 are formed on the back surface of the first plate-shaped section 6 as shown in FIG. 48, and detecting piezoelectric/electrostrictive elements 12 are formed in an array of islands at positions on the upper surface of the first plate-shaped section 6 corresponding to the plurality of recesses 72. The embodiment shown in FIG. 57 is illustrative of a structure in which the recess 72 has a circular contour, and the detecting piezoelectric/electrostrictive element 12 has a circular planar configuration.

In this embodiment, it is possible to improve the detection accuracy, and a large detection output can be obtained. Thus, it is possible to improve the sensitivity.

Figure 58:
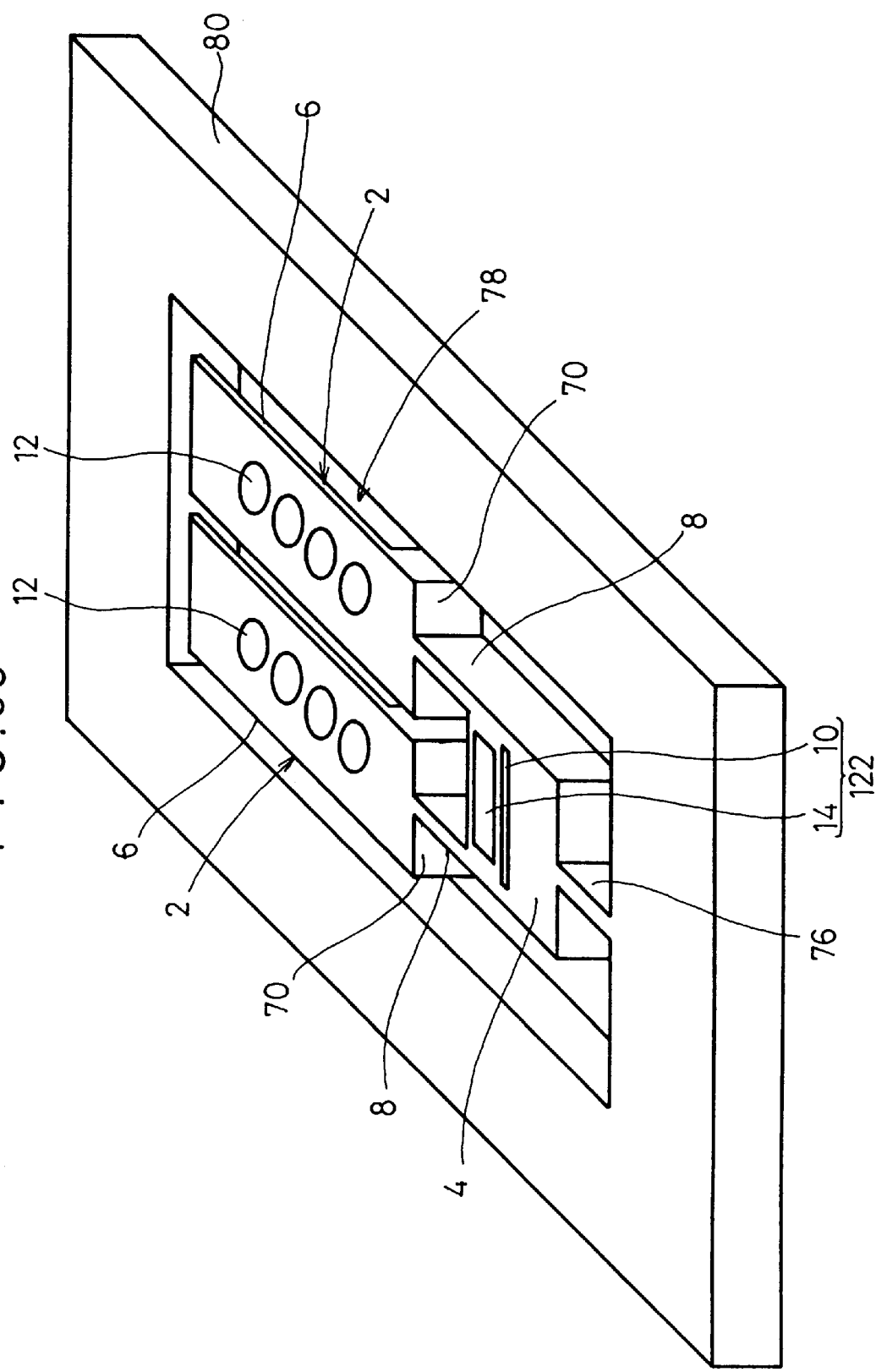
FIG. 58 schematically shows a perspective view illustrating a forty-fourth preferred embodiment of the vibration gyro sensor according to the present invention.

Next, a vibration gyro sensor according to a forty-fourth embodiment shown in FIG. 58 is constructed in approximately the same manner as the vibration gyro sensor according to the forty-third embodiment shown in FIG. 57. However, the former is different from the latter in that thick-walled block sections 70 are provided in an integrated manner between the first plate-shaped sections 6 and the second plate-shaped sections 8, respectively.

In this embodiment, the presence of the block section 70 makes it possible to increase the strength of the boundary portion between the first plate-shaped section 6 and the second plate-shaped section 8. Moreover, a large output can be obtained. Accordingly, this embodiment is advantageous in view of high reliability and improvement in sensitivity.

Figure 59:
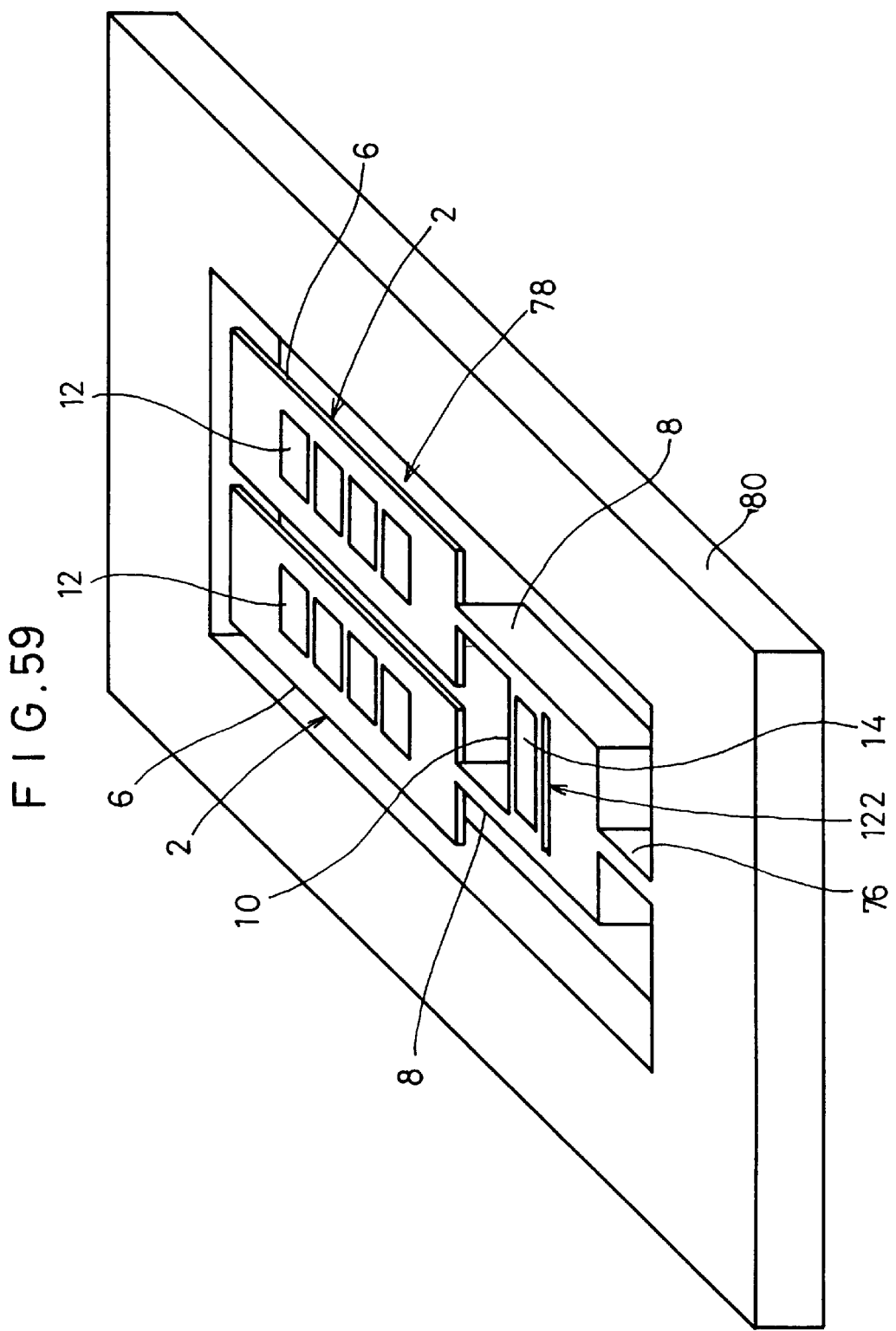
FIG. 59 schematically shows a perspective view illustrating a forty-fifth preferred embodiment of the vibration gyro sensor according to the present invention.
Figure 60:
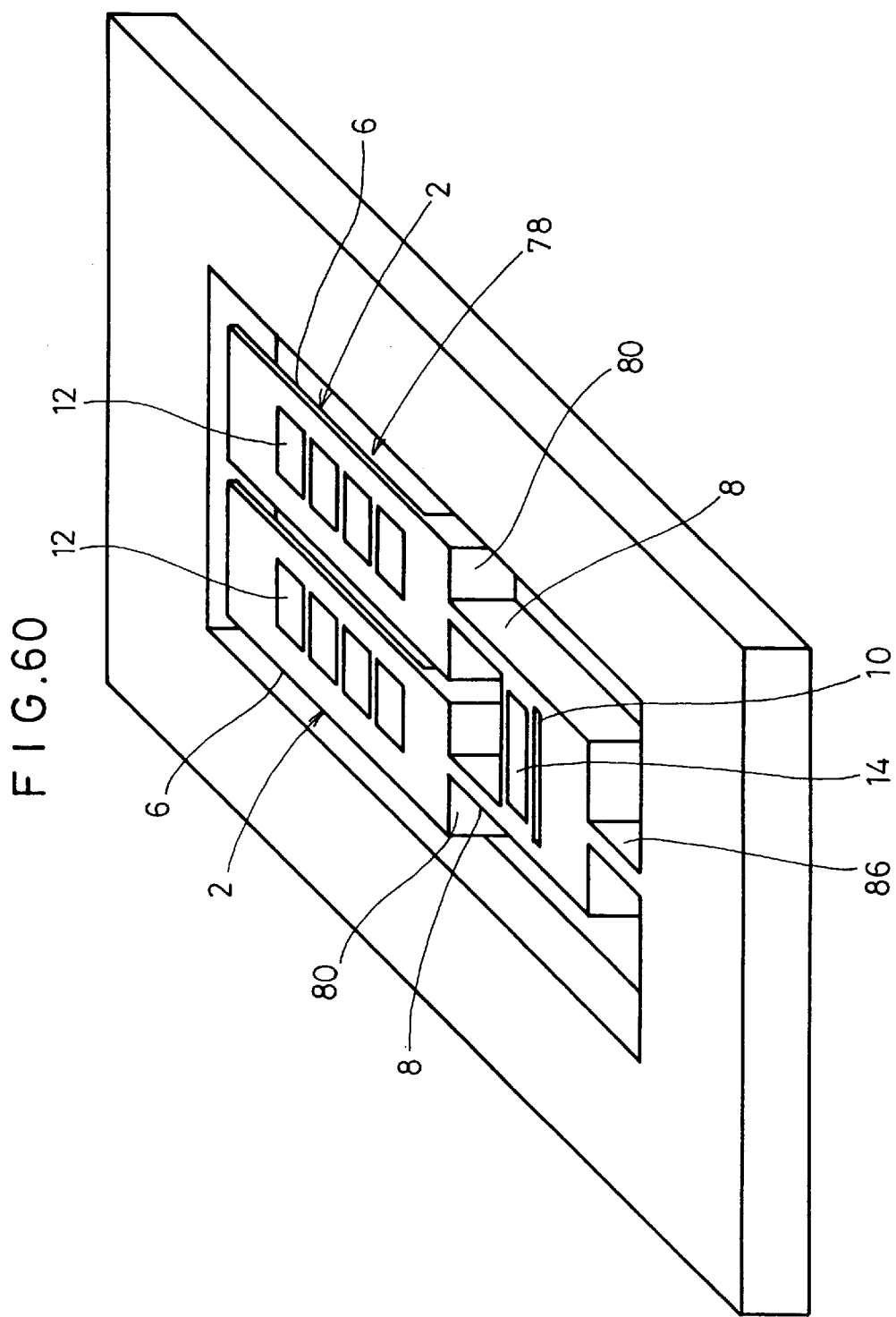
FIG. 60 schematically shows a perspective view illustrating a forty-sixth preferred embodiment of the vibration gyro sensor according to the present invention.

The vibration gyro sensors according to the forty-third and forty-fourth embodiments described above are illustrative of the structure in which the detecting piezoelectric/electrostrictive elements 12 each having the approximately circular planar configuration are formed in the array of islands on the upper surface of the first plate-shaped section 6. Alternatively, as shown in FIGS. 59 and 60, both of the contour of each of the recesses 72 (see FIG. 48) and the detecting piezoelectric/electrostrictive elements 12 may be square or rectangular (forty-fifth and forty-sixth embodiments). In these embodiments, those conceivable as the planar configuration of the recess 72 and the detecting piezoelectric/electrostrictive element 72 also include, for example, circular and rectangular configurations as described above, as well as rhombic configurations. The shape of these components is not specifically limited.

In the vibration gyro sensors according to the thirty-first through forty-sixth embodiments, the driving means 122, which has the driving section (third plate-shaped section) 10 with the driving piezoelectric/electrostrictive element 14 formed on its upper surface, is provided in the integrated manner between the second plate-shaped sections 8. Alternatively, as shown in FIG. 61, it is preferable to adopt a mechanism wherein a signal, which is obtained from a reference means 140 disposed at a position different from that of the driving section 10, is fed back to the driving means 122 in order to maintain constant vibration of the vibrators 2.

Figure 61:
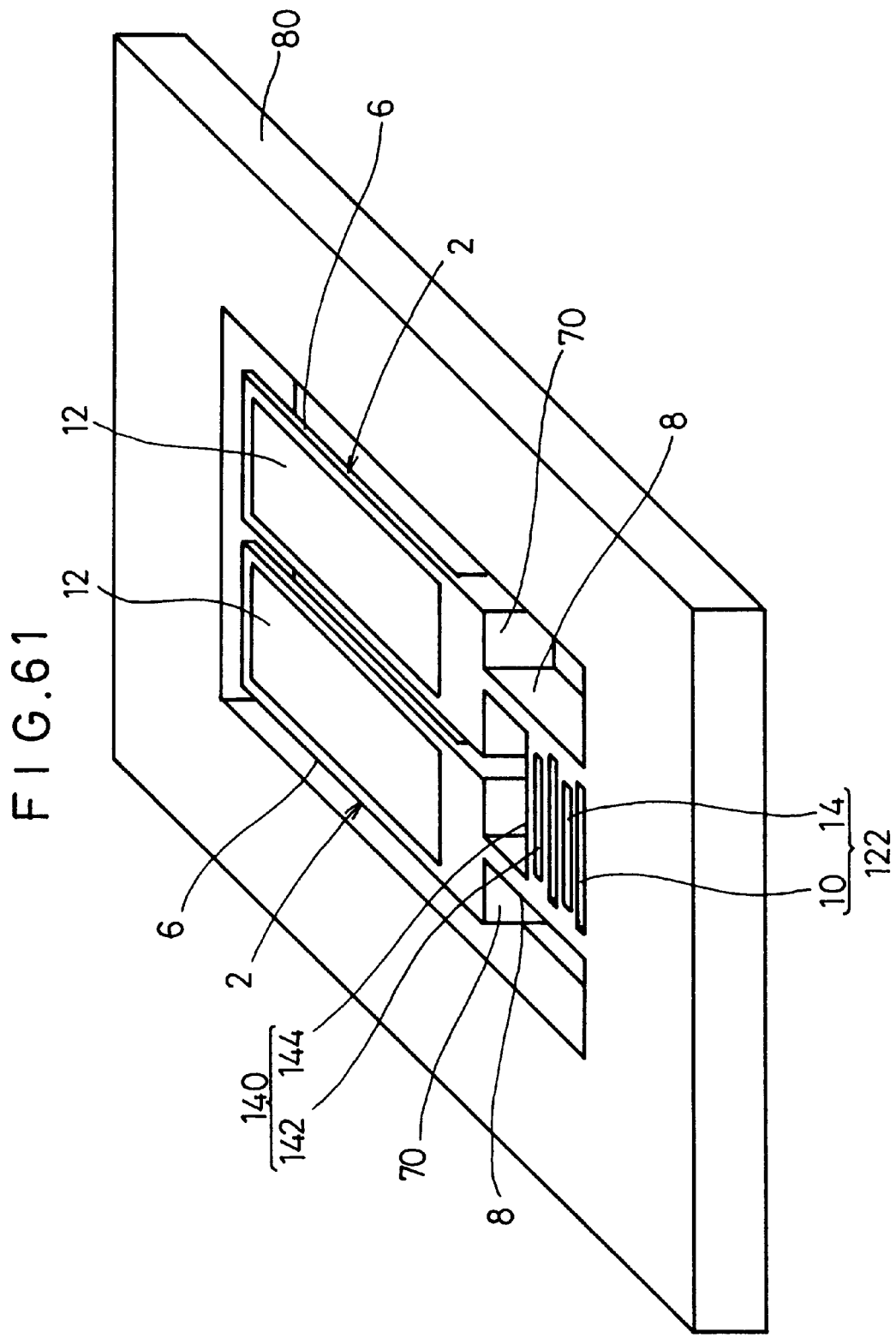
FIG. 61 schematically shows a perspective view illustrating a forty-seventh preferred embodiment of the vibration gyro sensor according to the present invention.

Namely, a vibration gyro sensor according to a forty-seventh embodiment shown in FIG. 61 has such a structure that the vibration gyro sensor according to the thirty-fourth embodiment (see FIG. 46) further comprises the reference means 140 which is provided in parallel to the driving means 122 between the two second plate-shaped sections 8.

The reference means 140 is constructed in approximately the same manner as the driving means 122, comprising a plate-shaped reference section (fourth plate-shaped section) 144 which is thin-walled in its direction of height, and a reference piezoelectric/electrostrictive element 142 formed on the reference section 144. The reference section 144 is integrally formed of ceramics in the same manner as the driving section 10. The reference section 144 and the driving section 10 are arranged in accordance with the following relation. Namely, the driving section 10 is formed in an integrated manner at a position close to the frame 80 between the second plate-shaped sections 8. The reference section 144 is formed in an integrated manner at a position slightly nearer to the first plate-shaped sections 6 as compared with the driving section 10.

The signal, which is obtained from the reference piezoelectric/electrostrictive element 142 of the reference means 140, is fed back to the driving piezoelectric/electrostrictive element 14 in order to give constant vibration of the driving means 122 formed between the second plate-shaped sections 8.

Figure 62:
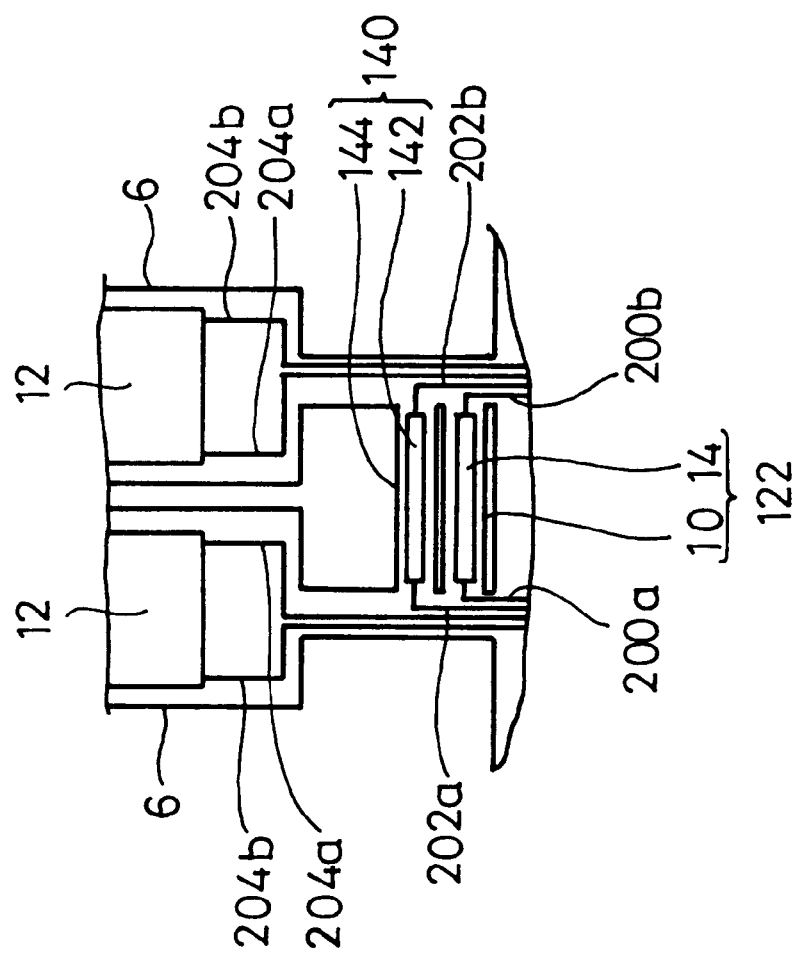
FIG. 62 shows a magnified structure of a portion at which lead wires are led in the vibration gyro sensor according to the forty-seventh embodiment.

As shown in FIG. 62, the driving signal is supplied to the driving means 122 via lead wires 200a, 200b connected to upper and lower electrodes (not shown) formed on upper and lower surfaces of the driving piezoelectric/electrostrictive element 14. The reference signal is obtained from the reference means 140 via lead wires 202a, 202b connected to upper and lower electrodes (not shown) formed on upper and lower surfaces of the reference piezoelectric/electrostrictive element 142.

The detection signal is obtained from the detecting piezoelectric/electrostrictive element 12 formed on the first plate-shaped section 6 via lead wires 204a, 204b connected to upper and lower electrodes (not shown) formed on upper and lower surfaces of the detecting piezoelectric/electrostrictive element 12.

Figure 63:
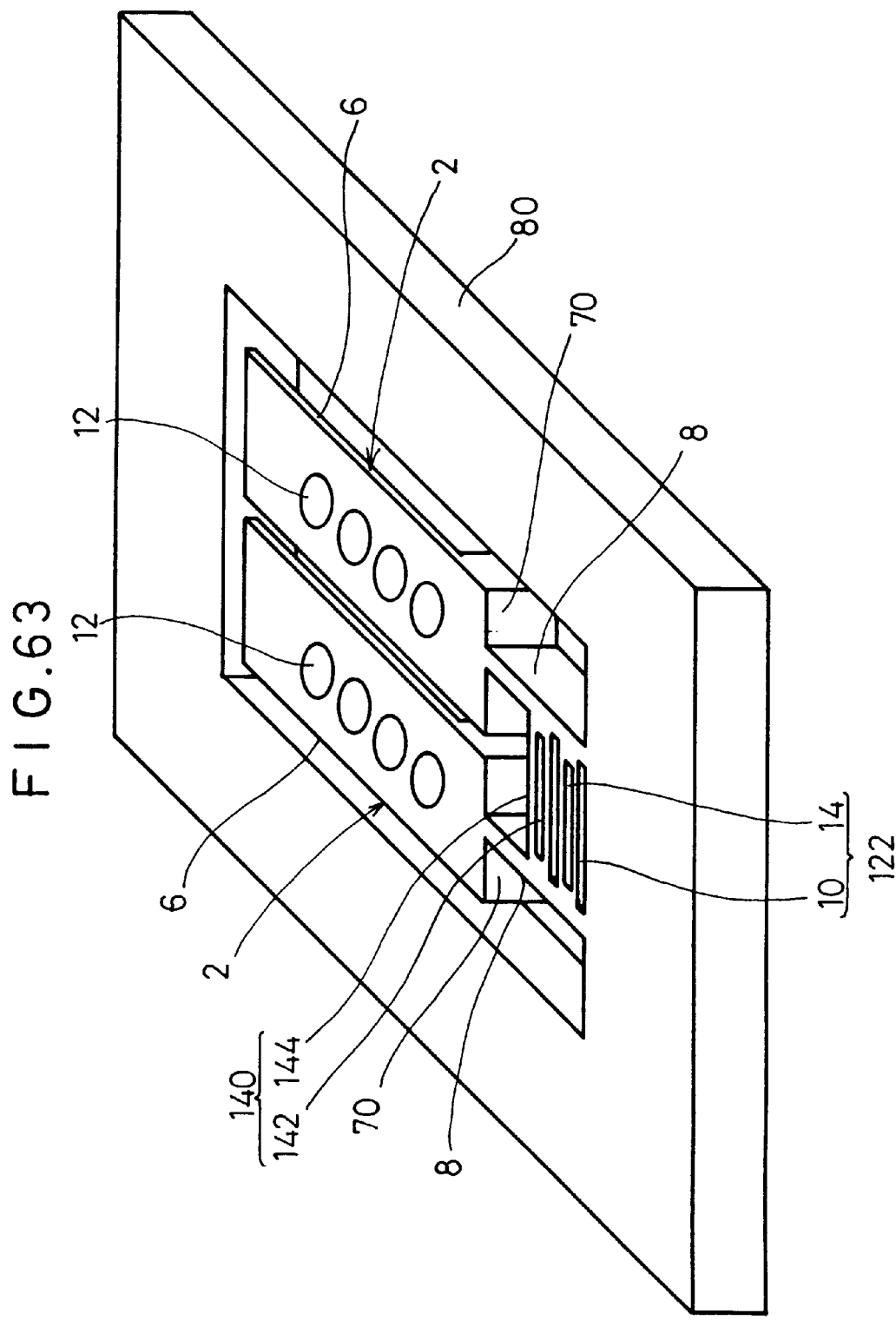
FIG. 63 schematically shows a perspective view illustrating a forty-eighth preferred embodiment of the vibration gyro sensor according to the present invention.

Other embodiments, in which the reference means 140 is formed, will be explained below. At first, a vibration gyro sensor according to a forty-eighth embodiment shown in FIG. 63 has such a structure that the vibration gyro sensor according to the thirty-sixth embodiment shown in FIG. 49 further comprises a reference means 140 which is provided in parallel to the driving means 122 between the two second plate-shaped sections 8.

Figure 64:
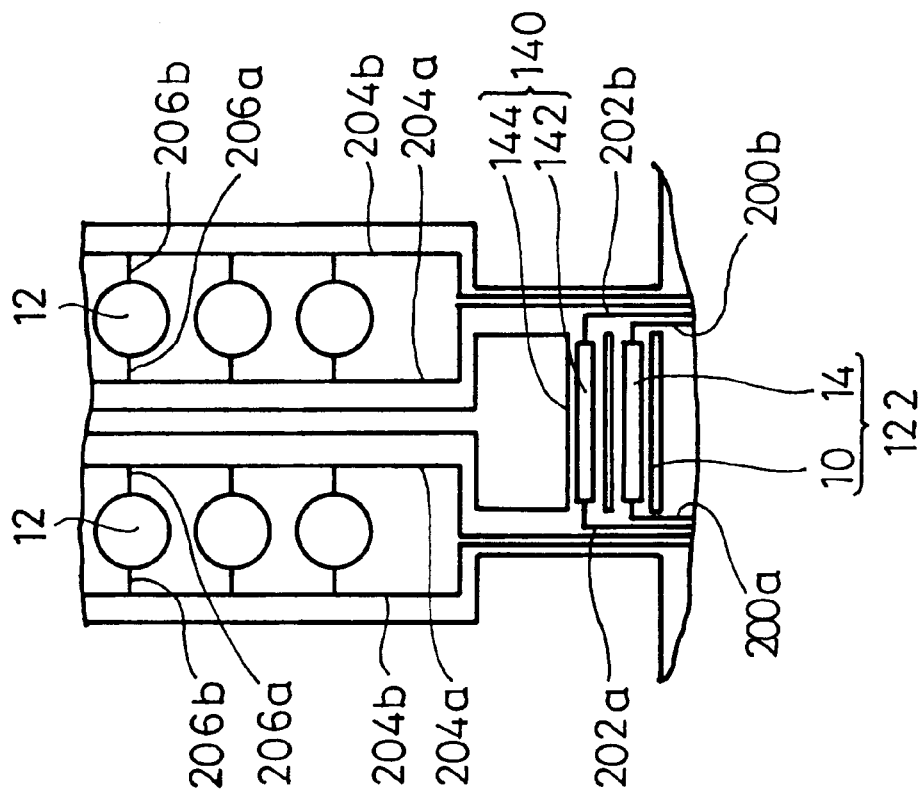
FIG. 64 shows a magnified structure of a portion at which lead wires are led in the vibration gyro sensor according to the forty-eighth embodiment.

This embodiment is constructed as shown in FIG. 64. Namely, the respective upper electrodes of the plurality of detecting piezoelectric/electrostrictive elements 12 formed in the array of islands are electrically connected to lead wires 204a via mediating conductors 206a, respectively. The respective lower electrodes of the plurality of detecting piezoelectric/electrostrictive elements 12 are electrically connected to lead wires 204b via mediating conductors 206b, respectively. The detection signal is obtained from the detecting piezoelectric/electrostrictive elements 12 via the lead wires 204a, 204b.

Figure 65:
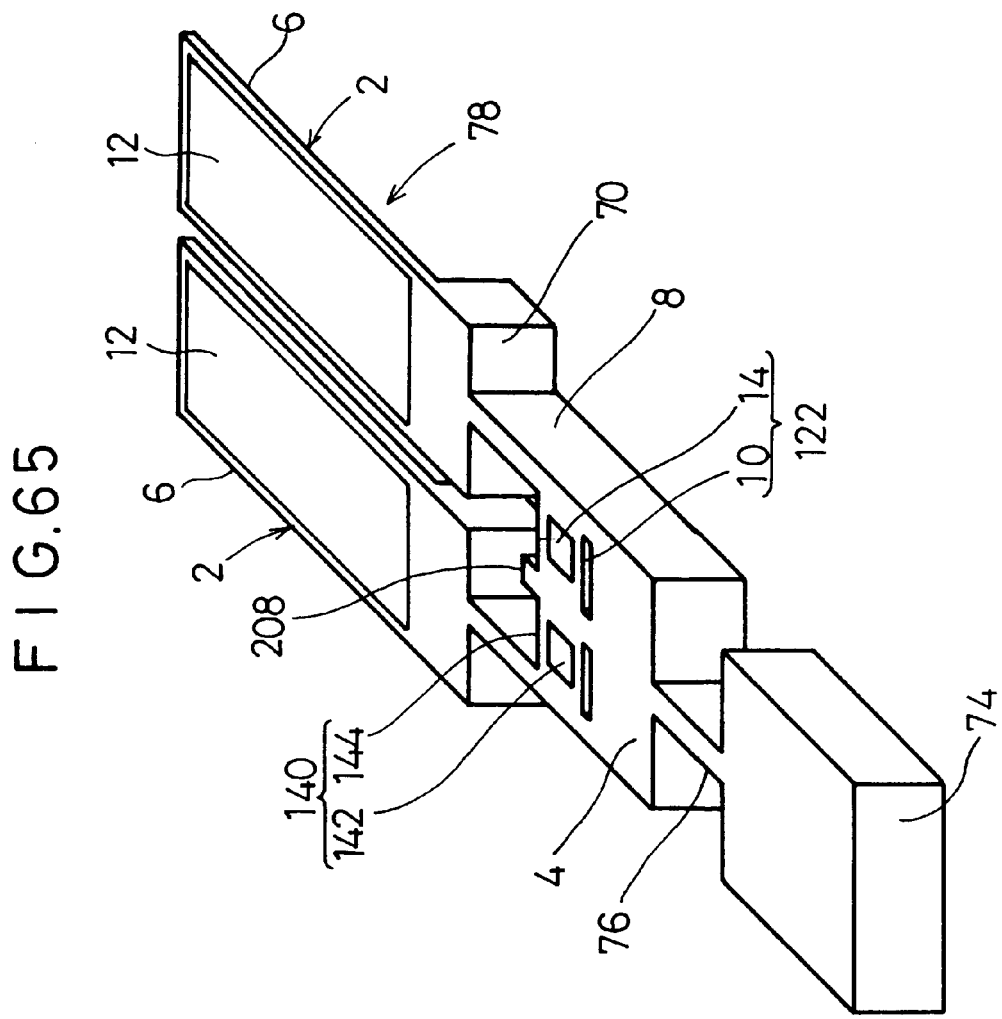
FIG. 65 schematically shows a perspective view illustrating a forty-ninth preferred embodiment of the vibration gyro sensor according to the present invention.

Next, a vibration gyro sensor according to a forty-ninth embodiment shown in FIG. 65 is constructed as follows, based on the vibration gyro sensor according to the thirty-ninth embodiment (see FIG. 52). Namely, a mediating section (sixth plate-shaped section) 208 having a free end is provided in an integrated manner at an approximately central portion of a side surface of the support base 4 facing the vibrators 2. A driving means 122 is provided in an integrated manner between the mediating section 208 and one of the second plate-shaped sections 8. A reference means 140 as described above is provided in an integrated manner between the mediating section 208 and the other second plate-shaped section 8.

This embodiment is based on the use of the following feature. Namely, the support section 76 (fifth plate-shaped section) is formed between the support base 4 and the attachment section 74 so that the support section 76 is disposed at a position which is approximately coincides with the position of the line symmetry of the tuning fork 78. Accordingly, when one of the two second plate-shaped sections 8 is vibrated to vibrate the corresponding vibrator 2, the other vibrator 2 is vibrated at an identical frequency.

Therefore, when one of the vibrators 2 is vibrated by operating the driving means 122, the other vibrator 2 is also vibrated at an identical frequency. Therefore, a signal obtained by the reference means 140 may be used to perform feedback control so that the vibration of the driving means 122 remains constant.

Figure 66:
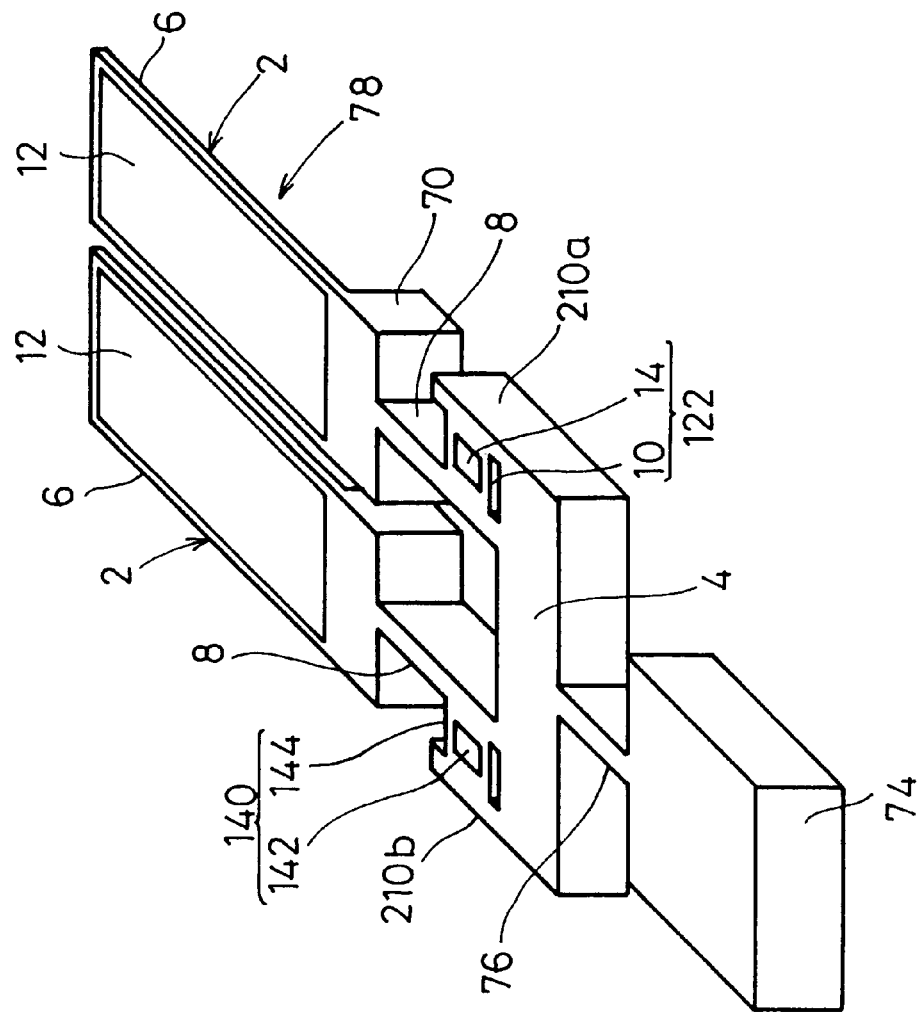
FIG. 66 schematically shows a perspective view illustrating a fiftieth preferred embodiment of the vibration gyro sensor according to the present invention.

Next, a vibration gyro sensor according to a fiftieth embodiment shown in FIG. 66 is constructed as follows, based on the vibration gyro sensor according to the thirty-ninth embodiment (see FIG. 52). Namely, a plurality of mediating sections 210a, 210b having respective free ends are provided in an integrated manner at positions of both ends in the longitudinal direction on a side surface of the support base 4 facing to the vibrators 2. A driving means 122 is provided in an integrated manner between one of the second plate-shaped sections 8 and one of the mediating sections 210a. A reference means 140 is provided in an integrated manner between the other second plate-shaped section 8 and the other mediating section 210b.

In this embodiment, when one of the vibrators 2 is vibrated by operating the driving means 122, the other vibrator 2 is also vibrated at an identical frequency in the same manner described above. Therefore, a signal obtained by the reference means 140 may be used to perform feedback control so that the vibration of the driving means 122 is constant.

The vibration gyro sensors according to the forty-ninth and fiftieth embodiments have the structure in which the tuning fork 78 is provided in the integrated manner on the block-shaped attachment section 74. Alternatively, the attachment section 74 is provided as a rectangular frame (attachment frame) 80, as exemplified by vibration gyro sensors according to fifty-first and fifty-second embodiments shown in FIGS. 67 and 68.

In these embodiments, the reference means 140 may be used to perform feedback control so that the vibration effected by the driving means 122 is constant. Further, these embodiments are advantageous from viewpoints of, for example, the degree of freedom for attachment and rigidity, because the attachment section is provided as the attachment frame 80.

Next, a vibration gyro sensor according to a fifty-third embodiment shown in FIG. 69 is constructed in approximately the same manner as the vibration gyro sensor according to the forty-second embodiment shown in FIG. 56. However, the former is different from the latter in that the support section 76 is constructed as follows.

Namely, the support section 76 comprises a first support section 212 provided in an integrated and bridged manner to bridge a pair of inner wall surfaces of inner wall surfaces of the attachment frame 80 along the extending direction of the vibrators 2 so that the vibrators 2 are disposed thereover as shown in FIGS. 70A and 70C, and a second support section 214 provided in an integrated and bridged manner to bridge the first support section 212 and the support base 4 so that the driving means 122 is disposed thereover as shown in FIG. 70B.

As described above, when the support rod for the tuning fork 78 is elongated, it is possible to more clearly discriminate the necessary mode from the unnecessary mode. Accordingly, the elongation of the support rod for the tuning fork 78 is preferred in order to improve the detection accuracy of the sensor. However, the vibration gyro sensor according to the forty-second embodiment (see FIG. 56) has the structure in which the support section 76 constructed by the fifth plate-shaped section is provided in the integrated manner between the support base 4 and the attachment frame 80. Therefore, if the support section 76 is elongated, the entire length of the sensor is also elongated in accordance therewith. Accordingly, the elongation of the support section 76 is limited.

On the contrary, in the vibration gyro sensor according to the fifty-third embodiment, the second support section 214, which functions in substantially the same manner as the support rod for the tuning fork 78, is provided in parallel to the two second plate-shaped sections 8, giving the structure in which the second support section 214 extends in the same direction as the second plate-shaped sections 8. Therefore, even when the length of the second support section 214 is elongated, the entire length of the sensor is not changed until the length of the second support section 214 exceeds a certain range. Accordingly, the second support section 214 can be elongated, and it is possible to realize further improvement in detection accuracy.

Figure 71:
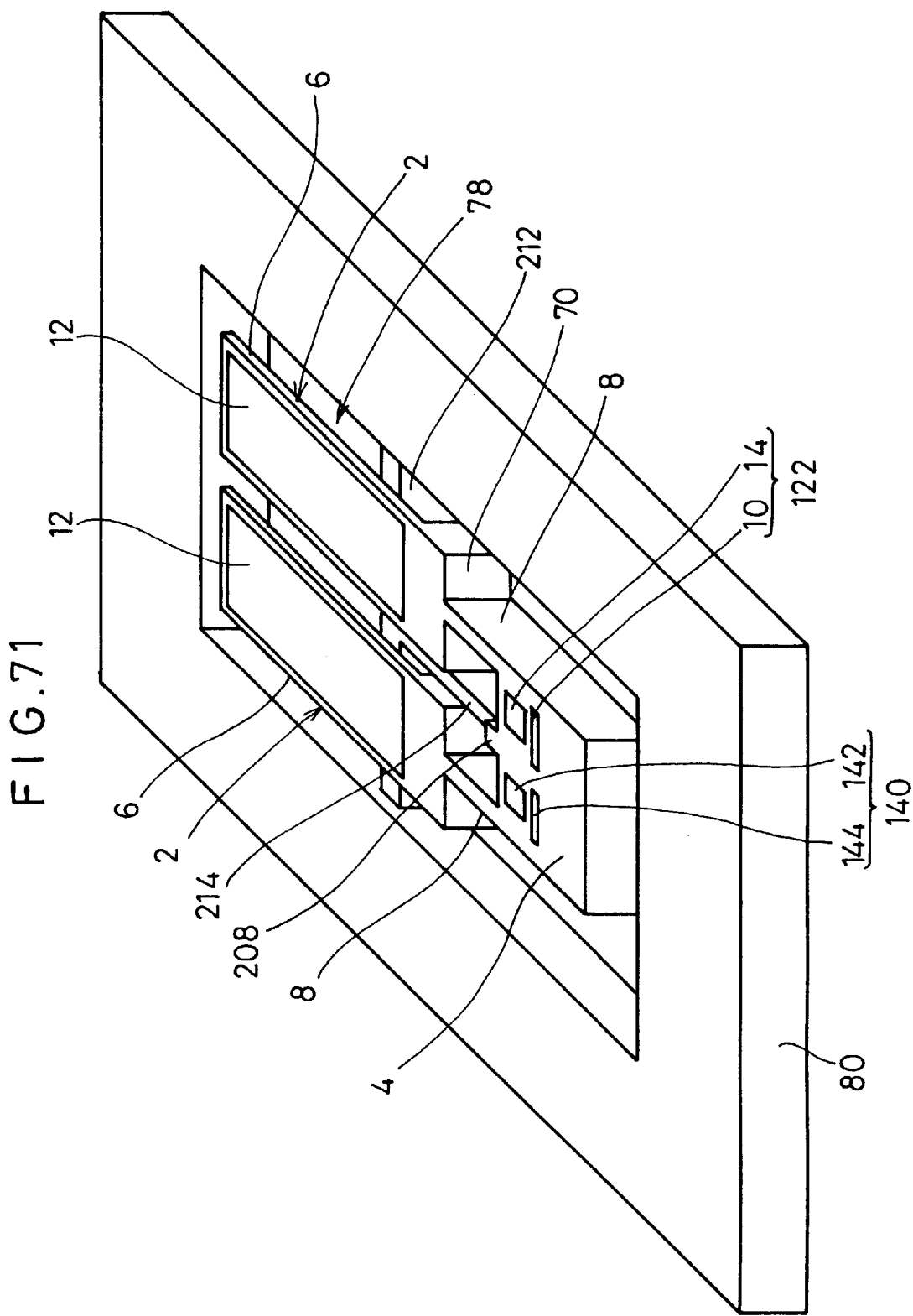
FIG. 71 schematically shows a perspective view illustrating a fifty-fourth preferred embodiment of the vibration gyro sensor according to the present invention.

Besides, the foregoing structure of the first and second support sections 212, 214 can be also applied, for example, to vibration gyro sensors each including the driving means 122 and the reference means 140 as shown in FIGS. 71 and 72.

Figure 67:
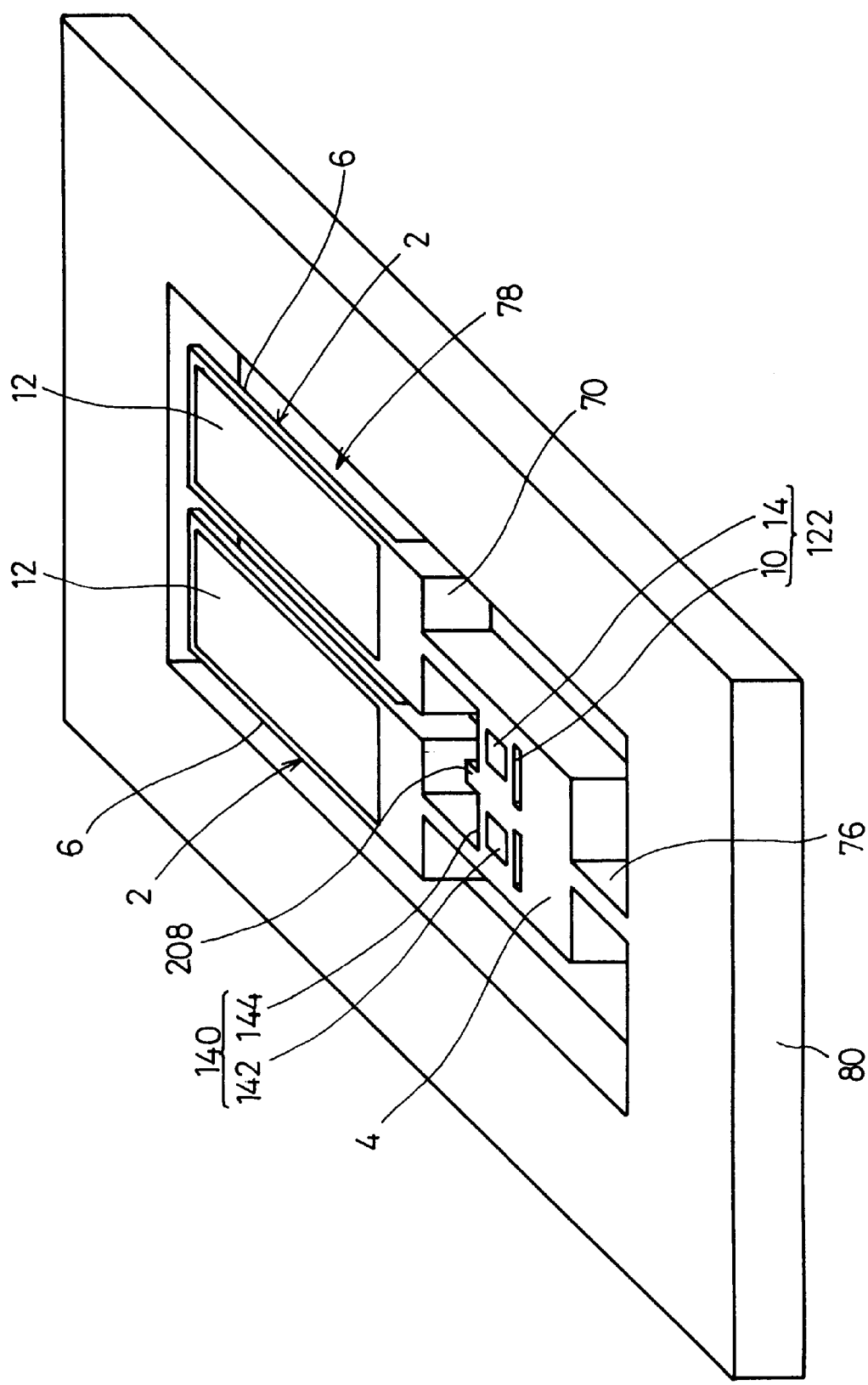
FIG. 67 schematically shows a perspective view illustrating a fifty-first preferred embodiment of the vibration gyro sensor according to the present invention.
Figure 68:
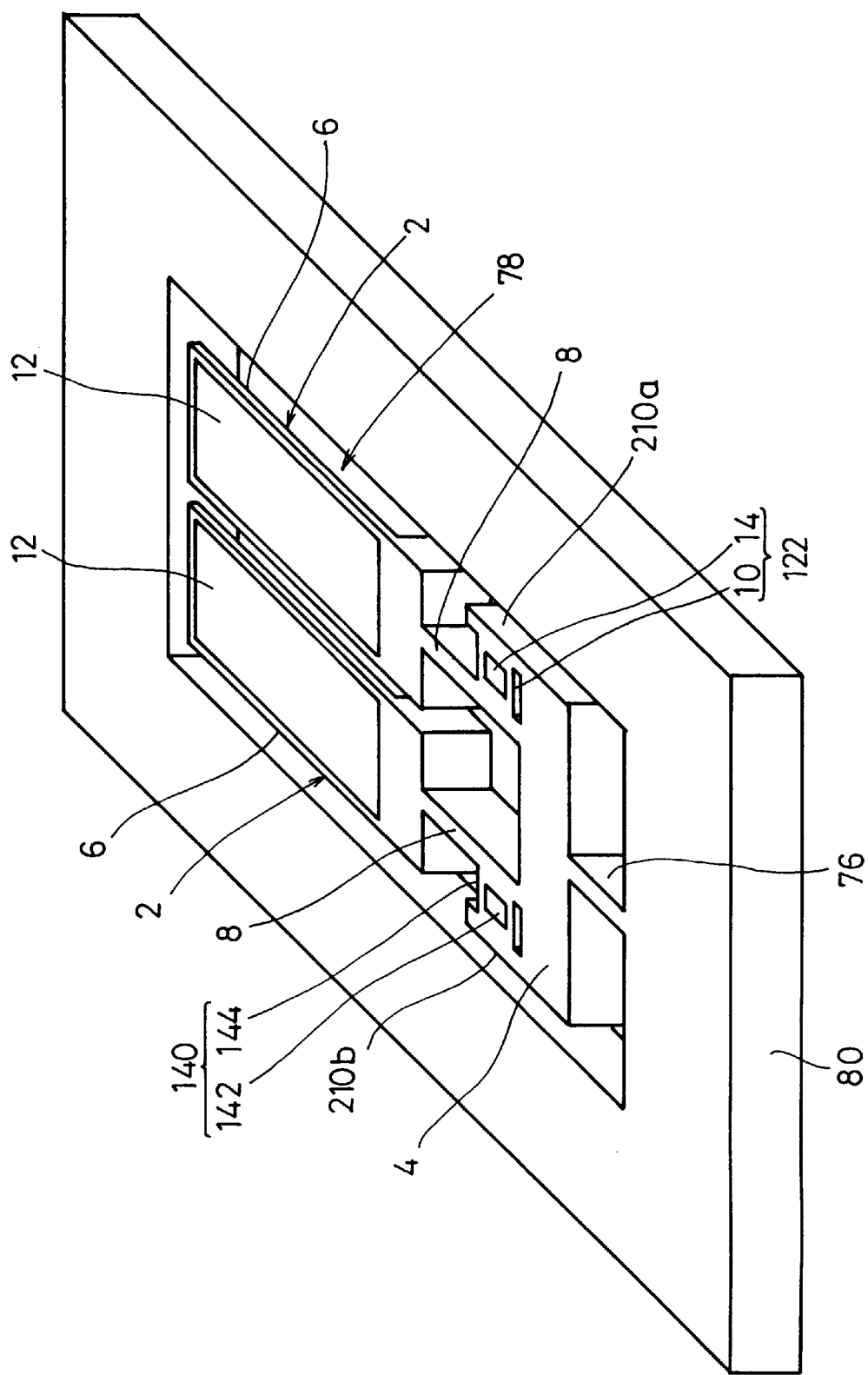
FIG. 68 schematically shows a perspective view illustrating a fifty-second preferred embodiment of the vibration gyro sensor according to the present invention.

The vibration gyro sensor according to a fifty-fourth embodiment shown in FIG. 71 is constructed such that the first and second support sections 212, 214 are provided in place of the support section 76 of the vibration gyro sensor according to the fifty-first embodiment shown in FIG. 67. The vibration gyro sensor according to a fifty-fifth embodiment shown in FIG. 72 is constructed such that the first and second support sections 212, 214 are provided in place of the support section 76 of the vibration gyro sensor according to the fifty-second embodiment shown in FIG. 68.

Figure 73:
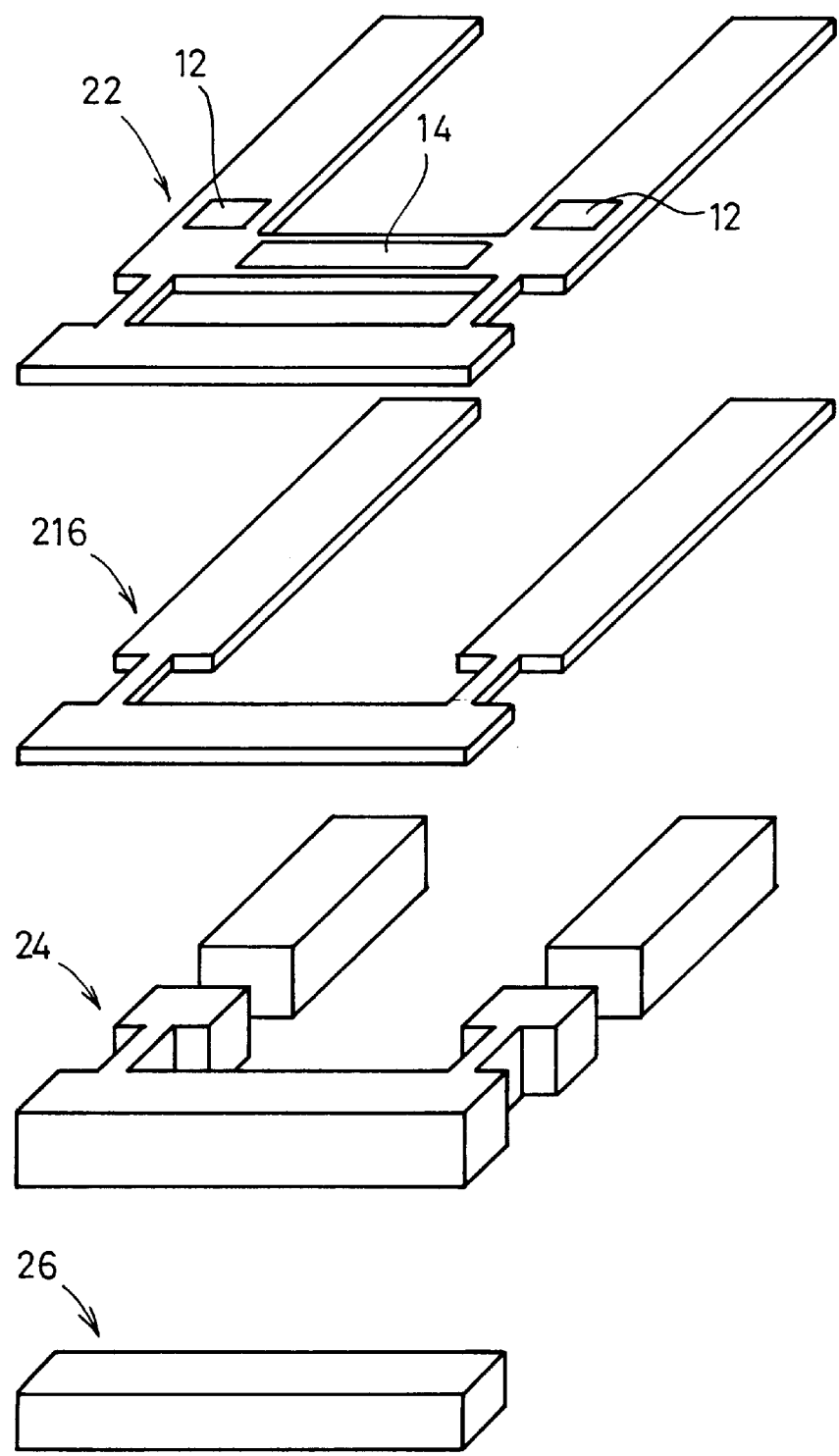
FIG. 73 schematically shows an exploded perspective view illustrating another structure of the vibration gyro sensor according to the first embodiment shown in FIG. 1.

The vibration gyro sensor constructed by the integrated fired product made of ceramics can be formed as the integrated stacked structure comprising the thin plate layer 22, the substrate layer 24, and the spacer layer 26 as shown in FIG. 2. Alternatively, as shown in FIG. 73, the vibration gyro sensor can be constructed by using an additional layer (intermediate layer) 216 which is allowed to intervene between the thin plate layer 22 and the substrate layer 24.

The thickness of the intermediate layer 216 is appropriately 1 μm to 500 μm, preferably 10 μm to 400 μm, and more preferably 50 μm to 300 μm. If the thickness exceeds 500 μm, bending is difficult, and hence the sensitivity is lowered. By contrast, if the thickness is thinner than 1 μm, the strength is low, and a problem arises in that the intermediate layer 216 tends to suffer breakage. Accordingly, it is preferable to adopt the foregoing range for the thickness of the intermediate layer 216.

The formation of the intermediate layer 216 is preferred in order to ensure the strength and improve the sensitivity, concerning the vibration gyro sensors of the type in which the block-shaped vibrators 2 are supported by the thin-walled first plate-shaped sections 6 (see FIGS. 1, 4 to 18, and 38 to 41), and concerning the vibration gyro sensors of the type in which the support base 100 integrally provided with the four block-shaped vibrators 102A to 102D is supported by the thin-walled plate-shaped sections 116 (see FIGS. 22 and 24 to 37).

The intervention of the intermediate layer 216 is also advantageous in order to ensure adequate strength and improve the sensitivity for those of the type in which the vibrator 2 is constructed by the thin-walled first plate-shaped section 6, as in the vibration gyro sensors according to the thirty-first to fifty-fifth embodiments shown in FIGS. 42 to 72. Examples of such construction are shown in FIGS. 74 to 76.

Figure 74:
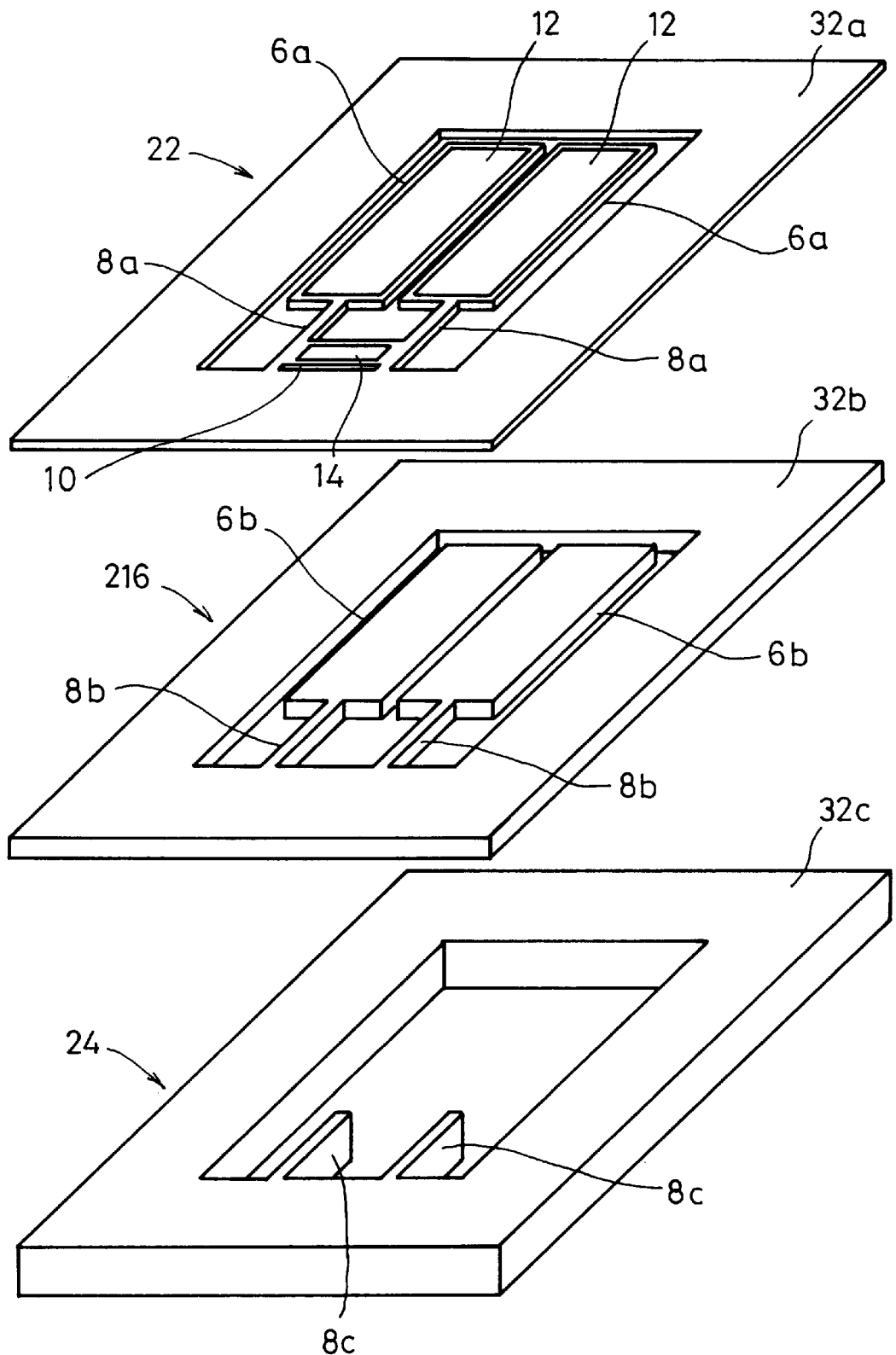
FIG. 74 schematically shows an exploded perspective view illustrating the vibration gyro sensor according to the thirty-third embodiment shown in FIG. 45.

An embodiment shown in FIG. 74 is illustrative of a structure in which the intermediate layer 216 is allowed to intervene between the thin plate layer 22 and the substrate layer 24 for constructing the vibration gyro sensor according to the thirty-third embodiment shown in FIG. 45. An upper surface portion 32a of the frame 32, upper portions 6a of the first plate-shaped sections 6, upper end portions 8a of the second plate-shaped sections 8, and the third plate-shaped section 10 are formed in an integrated manner by processing the thin plate layer 22. An upper portion 32b of the frame 32 except for the upper surface portion thereof, lower portions 6b of the first plate-shaped sections 6, and upper portions 8b of the second plate-shaped sections 8 except for the upper end portions thereof are formed in an integrated manner by processing the intermediate layer 216. A remaining portion 32c of the frame 32 and remaining portions 8c of the second plate-shaped sections 8 are formed in an integrated manner by processing the substrate layer 24. The layers are stacked and integrated with each other, followed by firing. Thus the vibration gyro sensor according to the thirty-third embodiment is produced.

Figure 75:
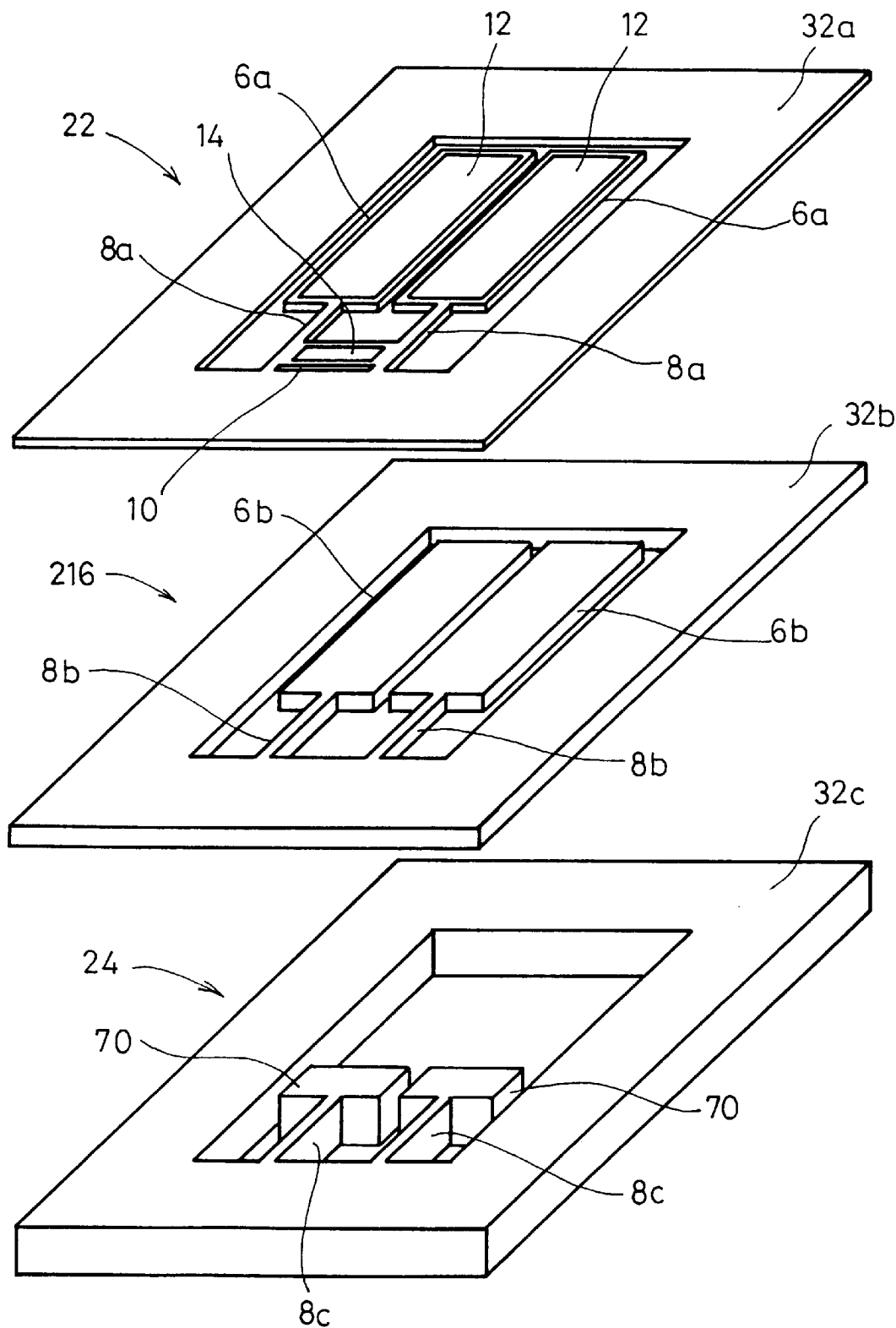
FIG. 75 schematically shows an exploded perspective view illustrating the vibration gyro sensor according to the thirty-fourth embodiment shown in FIG. 46.

An embodiment shown in FIG. 75 is illustrative of a structure in which the intermediate layer 216 is allowed to intervene between the thin plate layer 22 and the substrate layer 24 for constructing the vibration gyro sensor according to the thirty-fourth embodiment shown in FIG. 46. An upper surface portion 32a of the frame 32, upper portions 6a of the first plate-shaped sections 6, upper end portions 8a of the second plate-shaped sections 8, and the third plate-shaped section 10 are formed in an integrated manner by processing the thin plate layer 22. An upper portion 32b of the frame 32 except for the upper surface portion thereof, lower portions 6b of the first plate-shaped sections 6, and upper portions 8b of the second plate-shaped sections 8 except for the upper end portions thereof are formed in an integrated manner by processing the intermediate layer 216. A remaining portion 32c of the frame 32, remaining portions 8c of the second plate-shaped sections 8, and the block sections 70 are formed in an integrated manner by processing the substrate layer 24. The layers are stacked and integrated with each other, followed by firing. Thus the vibration gyro sensor according to the thirty-fourth embodiment is produced.

Figure 76:
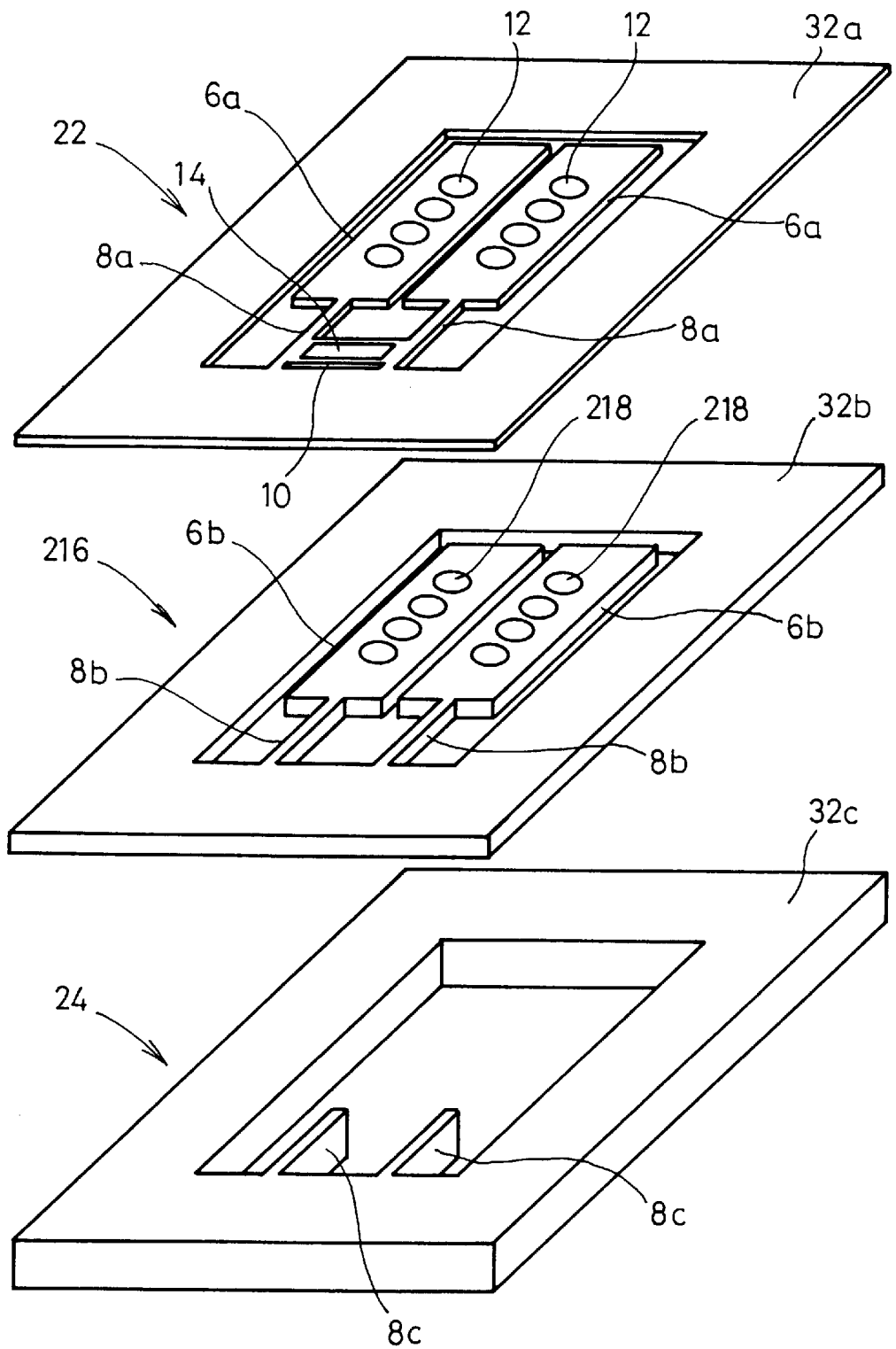
FIG. 76 schematically shows an exploded perspective view illustrating the vibration gyro sensor according to the thirty-fifth embodiment shown in FIG. 47.

An embodiment shown in FIG. 76 is illustrative of a structure in which the intermediate layer 216 is allowed to intervene between the thin plate layer 22 and the substrate layer 24 for constructing the vibration gyro sensor according to the thirty-fifth embodiment shown in FIG. 47. An upper surface portion 32a of the frame 32, upper portions 6a of the first plate-shaped sections 6, upper end portions 8a of the second plate-shaped sections 8, and the third plate-shaped section 10 are formed in an integrated manner by processing the thin plate layer 22. An upper portion 32b of the frame 32 except for the upper surface portion thereof, lower portions 6b of the first plate-shaped sections 6 formed with a plurality of holes 218 (for constructing the recesses 72 shown in FIG. 48 together with the thin plate layer 22), and upper portions 8b of the second plate-shaped sections 8 except for the upper end portions thereof are formed in an integrated manner by processing the intermediate layer 216. A remaining portion 32c of the frame 32 and remaining portions 8c of the second plate-shaped sections 8 are formed in an integrated manner by processing the substrate layer 24. The layers are stacked and integrated with each other, followed by firing. Thus the vibration gyro sensor according to the thirty-fifth embodiment is produced.

As described above, in the vibration gyro sensors according to the first to fifty-fifth embodiments, the vibrators 2 (or 102), the support base 4 (or 100), the attachment frame 30, 36, 38, the frame 32. (or 104), and other components are constructed as a whole by the integrated fired product made of ceramics (non-conductive substances) represented by zirconia oxide. Accordingly, the present invention is advantageous in that external wiring can be directly wired and formed thereon by means of the film formation method. In addition to this advantage, the film formation method such as screen printing is used to form the electrodes of the piezoelectric/electrostrictive elements 12, 14, 118, 120, 142. Accordingly, the present invention is also advantageous in that when the electrodes of the piezoelectric/electrostrictive elements 12, 14, 118, 120, 142 are formed, the wiring for these electrodes can be simultaneously extended up to the frame section (frame 104) so that the vibration characteristics are not affected. Therefore, it is possible to realize improvement in yield and easy production of the vibration gyro sensor.

In the respective embodiments of the illustrated vibration gyro sensors, the thin-walled second plate-shaped sections 8 are depicted as those having the planar plate configuration in any case. However, the present invention is not limited to those having the planar plate configuration. It is allowable to use a structure in which the rigidity is lowered in order to easily vibrate the vibrators in their desired vibration directions. It is needless to say that no problem occurs at all when those having a partially constricted shape are used.

As clarified from the foregoing description, the vibration gyro sensor according to the present invention is constructed as a whole by the integrated fired product made of ceramics, and no magnetic material is used at all. Therefore, it is completely unnecessary to consider any influence exerted on the characteristics by the ambient magnetic field, and the vibration gyro sensor does not undergo any restriction concerning its installation place or the like. Further, the large displacement is obtained by using the first and second plate-shaped sections in the detecting and driving directions of the vibrators. Moreover, the vibration gyro sensor has the integrated structure in which the piezoelectric/electrostrictive element directly contacts with the vibrator.

Accordingly, the large output is effectively obtained, and any cause to lower the sensitivity due to absorption of stress is effectively dissolved. Thus the highly sensitive sensor is advantageously provided.

The combined sensor according to the present invention is different from the conventional sensor which has only one function for one element. The combined sensor makes it extremely easy to provide another sensor in the integrated manner adjacent to the vibration gyro sensor. For example, it is possible to easily realize the structure in which the vibration gyro sensor and the acceleration sensor are simultaneously provided as one element (integrated sensor).

What is claimed is:

1. A vibration gyro sensor comprising at least one vibrator subjected to excited vibration effected by at least one driving means, a support base for supporting said vibrator at a proximal end thereof, and at least one detecting section including at least one detecting piezoelectric/electrostrictive element for detecting displacement generated in a direction perpendicular to a direction of vibration of said vibrator when said vibrator is rotated, said vibration gyro sensor including:

said detecting section composed of an integrated fired product made of ceramics together with said vibrator and said support base, said detecting section being constructed by a first plate-shaped section which is more thin-walled than said vibrator and which has a principal surface extending in said direction of vibration;

said detecting piezoelectric/electrostrictive element formed in an integrated manner on said first plate-shaped section in accordance with a film formation method; and at least one thin-walled second plate-shaped section for decreasing rigidity in said directions of vibration and facilitating said vibration, said second plate-shaped section being provided for said vibrator in an integrated manner so that a principal surface thereof extends in said direction perpendicular to said direction of vibration.

2. The vibration gyro sensor according to claim 1, wherein:

said vibrator is provided with a thin-walled excisable section extending from a forward end thereof; and a resonance frequency of said vibrator is adjusted in accordance with an amount of excision of said excisable section.

3. The vibration gyro sensor according to claim 1, wherein two of said vibrators are supported in parallel to one another by said support base, and said two vibrators are vibrated by said driving means in an excited manner in mutually opposite directions.

4. The vibration gyro sensor according to claim 1, wherein said driving means comprises:

a third plate-shaped section which is more thin-walled than said vibrator and which is composed of said integrated fired product made of ceramics together with said vibrator; and a driving piezoelectric/electrostrictive element formed in an integrated manner on said third plate-shaped section in accordance with said film formation method.

5. The vibration gyro sensor according claim 3, wherein:

a support bar is arranged at a position which is located between said two vibrators and which is separated from said vibrators; and said support bar is supported in an integrated manner by said support base together with said two vibrators.

6. The vibration gyro sensor according to claim 1, wherein said support base is constructed by an attachment frame which is disposed outside said vibrator and separated therefrom by a predetermined distance so that said vibrator is surrounded thereby.

7. The vibration gyro sensor according to claim 3, wherein said driving means is provided in an integrated manner between said two vibrators.

8. The vibration gyro sensor according to claim 3, wherein said driving means is provided in an integrated manner between said second plate-shaped sections.

9. The vibration gyro sensor according to claim 5, wherein said driving means are provided in an integrated manner between said support bar and said vibrators respectively.

10. The vibration gyro sensor according to claim 5, wherein said driving means are provided in an integrated manner between said support bar and said second plate-shaped sections respectively.

11. The vibration gyro sensor according to claim 6, wherein said driving means are provided in an integrated manner between said attachment frame and said vibrators respectively.

12. The vibration gyro sensor according to claim 6, wherein said driving means are provided in an integrated manner between said attachment frame and said second plate-shaped sections respectively.

13. A vibration gyro sensor comprising two vibrators arranged in parallel to one another and mutually subjected to excited vibration, a frame for surrounding said vibrators and supporting said vibrators at proximal ends thereof, and detecting sections including detecting piezoelectric/electrostrictive elements for detecting displacement generated in a direction perpendicular to a direction of vibration of said vibrators when said vibrators are rotated, said vibration gyro sensor including:

said detecting sections composed of an integrated fired product made of ceramics together with said vibrators and said frame, said detecting sections being constructed by first plate-shaped sections which are more thin-walled than said vibrators and which have principal surfaces extending in said direction of vibration;

said detecting piezoelectric/electrostrictive elements formed in an integrated manner on said first plate-shaped sections in accordance with a film formation method;

a thin-walled second plate-shaped section for decreasing rigidity in said direction of vibration and facilitating said vibration, said second plate-shaped section being formed in an integrated manner for a portion located between regions of said frame for supporting said two vibrators so that a principal surface thereof extends in said direction perpendicular to said direction of vibration;

a portion of said frame opposing to a region for forming said second plate-shaped section, said portion being a third plate-shaped section which is more thin-walled than said frame; and a driving piezoelectric/electrostrictive element formed in an integrated manner on said third plate-shaped section in accordance with said film formation method, wherein:

said two vibrators are vibrated in an excited manner on the basis of vibration of said frame effected by said driving piezoelectric/electrostrictive element.

14. The vibration gyro sensor according to claim 13, wherein:

each of said vibrators is provided with a thin-walled excisable section extending from a forward end thereof; and a resonance frequency of said vibrator is adjusted in accordance with an amount of excision of said excisable section.

15. The vibration gyro sensor according to claim 13, wherein an attachment section for fixing said frame is formed in an integrated manner on an outer surface of a region of said frame for forming said second plate-shaped section.

16. The vibration gyro sensor according to claim 15, wherein said attachment section includes, in an integrated manner, an attachment frame which is positioned outside said frame and separated therefrom by a predetermined distance so that said frame is surrounded thereby.

17. A vibration gyro sensor comprising two vibrators arranged in parallel to one another and mutually subjected to excited vibration, a support base for supporting said vibrators at proximal ends thereof, and detecting sections including detecting piezoelectric/electrostrictive elements for detecting displacement generated in a direction perpendicular to a direction of vibration of said vibrators when said vibrators are rotated, said vibration gyro sensor including:

said detecting sections composed of an integrated fired product made of ceramics together with said vibrators and said support base, said detecting sections being constructed by first plate-shaped sections which are more thin-walled than said vibrators and which have principal surfaces extending in said direction of vibration;

said detecting piezoelectric/electrostrictive elements formed in an integrated manner on said first plate-shaped sections in accordance with a film formation method;

a thin-walled second plate-shaped section for decreasing rigidity in said direction of vibration and facilitating said vibration, said second plate-shaped section being formed in an integrated manner for a portion located between regions of said support base for supporting said two vibrators so that a principal surface thereof extends in said direction perpendicular to said direction of vibration;

an attachment section provided with an attachment frame connected in an integrated manner to an outer surface of a region for forming said second plate-shaped section and disposed outside said two vibrators and said support base while being separated therefrom by predetermined distances so that said two vibrators and said support base are surrounded thereby;

third plate-shaped sections more thin-walled than said support base and formed in an integrated manner to bridge said attachment frame and portions of said support base located on both sides of said second plate-shaped section respectively; and driving piezoelectric/electrostrictive elements formed in an integrated manner on said third plate-shaped sections in accordance with said film formation method, wherein:

said two vibrators are vibrated in an excited manner on the basis of vibration of said support base effected by said driving piezoelectric/electrostrictive elements.

18. The vibration gyro sensor according to claim 17, wherein:

each of said vibrators is provided with a thin-walled excisable section extending from a forward end thereof; and a resonance frequency of said vibrator is adjusted in accordance with an amount of excision of said excisable section.

19. A vibration gyro sensor comprising:

a vibrator having a major axis extending in a certain direction;

a support base extending in a direction perpendicular to said certain direction, for supporting said vibrator at an end thereof;

a frame for surrounding said vibrator and said support base, with a frame surface being parallel to a plane including said certain direction and said extending direction of said support base; and a detecting section provided with a detecting piezoelectric/electrostrictive element attached between said support base and said frame, for detecting strain generated when said vibrator is rotated around an axis perpendicular to said plane, wherein:

all of said vibrator, said support base, and said detecting section are constructed by an integrated fired product made of ceramics;

said detecting section is constructed by a first plate-shaped section which is more thin-walled than said vibrator in its direction of height; and said vibrator is supported by said support base at said end which is constructed by a second plate-shaped section which is thin-walled in said certain direction.

20. The vibration gyro sensor according to claim 19, wherein said detecting section is constructed by a ring member formed between said support base and said frame, and said first plate-shaped section provided in a bridged manner in said ring member in parallel to said extending direction of said support base.

21. The vibration gyro sensor according to claim 19, wherein at least two of said vibrators are supported by said support base in parallel to one another, and a driving means for vibrating said respective vibrators in an excited manner in mutually opposite directions is disposed.

22. The vibration gyro sensor according to claim 21, wherein said driving means includes:

a third plate-shaped section which is more thin-walled in its direction of height than said vibrator and which is constructed by said integrated fired product made of ceramics together with said vibrator; and a driving piezoelectric/electrostrictive element formed on said third plate-shaped section.

23. The vibration gyro sensor according to claim 21, wherein said driving means is provided in an integrated manner between said two vibrators.

24. The vibration gyro sensor according to claim 23, wherein said driving means is arranged on a line for connecting respective centers of gravity of said both vibrators.

25. The vibration gyro sensor according to claim 21, wherein said driving means is provided in an integrated manner between said respective vibrators and said support base.

26. The vibration gyro sensor according to claim 21, further comprising a reference means for performing feedback control so that said driving means makes constant vibration.

27. The vibration gyro sensor according to claim 26, wherein said reference means comprises:

a fourth plate-shaped section which is more thin-walled in its direction of height than said vibrator and which is constructed by said integrated fired product made of ceramics together with said vibrator; and a reference piezoelectric/electrostrictive element formed on said fourth plate-shaped section.

28. The vibration gyro sensor according to claim 26, wherein said reference means is provided in an integrated manner between said respective vibrators.

29. The vibration gyro sensor according to claim 26 or 27, wherein said reference means are provided in an integrated manner between said respective vibrators and said support base.

30. The vibration gyro sensor according to claim 19, further comprising a vibration-applying section provided in an integrated manner between said vibrator and said support base.

31. The vibration gyro sensor according to claim 30, wherein said vibration-applying section comprises:
a fifth plate-shaped section arranged between said vibrator and said support base and extending in parallel to a longitudinal direction of said support base;
a sixth plate-shaped sections for connecting said support base to said fifth plate-shaped section; and
a seventh plate-shaped section for connecting said vibrator to said fifth plate-shaped section.

32. The vibration gyro sensor according to claim 30, wherein said driving means is provided in an integrated manner between said respective vibration-applying sections.

33. The vibration gyro sensor according to claim 30, wherein said driving means is provided in an integrated manner between said vibration-applying section and said support base.

34. The vibration gyro sensor according to claim 19, further comprising:
thin-walled first projections for adjusting a resonance frequency for driving, possessed by said vibrator at free ends thereof; and
thin-walled second projections for adjusting a resonance frequency for detection, possessed by said support base at both ends thereof in its longitudinal direction, wherein:
said first and second projections are constructed by said integrated fired product made of ceramics together with said vibrator and said support base.

35. The vibration gyro sensor according to claim 34, wherein said first and second projections are thin-walled in a direction of height with respect to said vibrator.

36. The vibration gyro sensor according to claim 34, wherein said first and second projections are thin-walled in said extending direction of said support base with respect to said vibrator.

37. The vibration gyro sensor according to claim 22, wherein:
said third plate-shaped section of said driving means is also used as an adjustment objective for a resonance frequency for driving; and
said first plate-shaped section of said detecting section is also used as an adjustment objective for a resonance frequency for detection.

38. A vibration gyro sensor comprising at least one vibrator subjected to excited vibration effected by a driving means, a support base for supporting said vibrator at a proximal end thereof, and at least one detecting section including at least one detecting piezoelectric/electrostrictive element for detecting displacement generated in a direction perpendicular to a direction of vibration of said vibrator when said vibrator is rotated, said vibration gyro sensor including:
said vibrator composed of an integrated fired product made of ceramics together with said support base, said vibrator being constructed by a first plate-shaped section which is more thin-walled than said support base and which has a principal surface extending in said direction of vibration;
said detecting section constructed by said first plate-shaped section and said detecting piezoelectric/electrostrictive element formed in an integrated manner on said first plate-shaped section in accordance with a film formation method; and
at least one thin-walled second plate-shaped section for decreasing rigidity in said direction of vibration and facilitating said vibration, said second plate-shaped section being provided for said vibrator in an integrated manner so that a principal surface thereof extends in said direction perpendicular to said direction of vibration.

39. The vibration gyro sensor according to claim 38, wherein two of said vibrators are supported in parallel to one another by said support base, said driving means is arranged between said respective second plate-shaped sections, and said two vibrators are vibrated by said driving means in an excited manner in mutually opposite directions.

40. The vibration gyro sensor according to claim 38, wherein said driving means comprises:
a third plate-shaped section which is more thin-walled than said support base and which is composed of said integrated fired product made of ceramics together with said second plate-shaped sections; and
a driving piezoelectric/electrostrictive element formed in an integrated manner on said third plate-shaped section in accordance with said film formation method.

41. The vibration gyro sensor according to claim 38, wherein said detecting piezoelectric/electrostrictive element is formed in an integrated manner on an approximately entire surface of said first plate-shaped section.

42. The vibration gyro sensor according to claim 38, wherein:
said first plate-shaped section has, on its back surface, a plurality of recesses; and
said detecting piezoelectric/electrostrictive elements are formed in an array of islands at positions on a front surface of said first plate-shaped section corresponding to said plurality of recesses.

43. The vibration gyro sensor according to claim 38, wherein a thick-walled block section is provided in an integrated manner between said first plate-shaped section and said second plate-shaped section.

44. The vibration gyro sensor according to claim 38, wherein said support base is constructed by a frame which is positioned outside said vibrators and separated by predetermined distances so that said vibrators are surrounded thereby.

45. The vibration gyro sensor according to claim 38, wherein said driving means is provided in an integrated manner between said respective second plate-shaped sections.

46. The vibration gyro sensor according to claim 43, where in said driving means is provided in an integrated manner between said respective block sections.

47. The vibration gyro sensor according to claim 44, wherein said driving means is provided in an integrated manner between said block section and said frame.

48. The vibration gyro sensor according to claim 38, further comprising a reference means for performing feedback control so that said vibration of said driving means is constant.

49. The vibration gyro sensor according to claim 48, wherein said reference means comprises:

a fourth plate-shaped section which is more thin-walled in its direction of height than said support base and which is constructed by said integrated fired product made of ceramics together with said vibrator; and a reference piezoelectric/electrostrictive element formed on said fourth plate-shaped section.

50. The vibration gyro sensor according to claim 48, wherein said reference means is provided in an integrated manner between said respective second plate-shaped sections.

51. The vibration gyro sensor according to claim 48, wherein said driving means is provided in an integrated manner on one plate-shaped section of said respective second plate-shaped sections, and said reference means is provided on the other second plate-shaped section.

52. The vibration gyro sensor according to claim 51, wherein:

a mediating section having a free end is provided in an integrated manner at an approximately central portion of a side surface of said support base facing to said vibrating section;

said driving means is provided in an integrated manner between one of said second plate-shaped sections and said mediating section; and said reference means is provided in an integrated manner between the other second plate-shaped section and said mediating section.

53. The vibration gyro sensor according to claim 51, wherein:

a plurality of mediating sections each having a free end are provided in an integrated manner at positions of both ends in a widthwise direction of said support base facing to said vibrating sections;

said driving means is provided in an integrated manner between one of said second plate-shaped sections and one of said mediating sections; and said reference means is provided in an integrated manner between the other second plate-shaped section and the other mediating section.

54. The vibration gyro sensor according to claim 38, wherein:

an attachment section for fixing said support base is provided in an integrated manner on a surface opposite to a surface of said support base on which said second plate-shaped sections are formed;

a fifth plate-shaped section, which is thin-walled in a widthwise direction of said support base, is provided in an integrated manner between said support base and said attachment section; and a tuning fork is constructed by at least said support base and said vibrators.

55. The vibration gyro sensor according to claim 54, wherein said attachment section is constructed by an attachment frame which is positioned outside said tuning fork and separated by predetermined distances therefrom so that said tuning fork is surrounded thereby.

56. The vibration gyro sensor according to claim 55, wherein:

a support section is provided in an integrated and bridged manner so that a pair of inner wall surfaces of said attachment frame, which extend along said extending direction of said vibrators, are bridged by said support section facing to said vibrators disposed thereover; and said fifth plate-shaped section is provided in an integrated manner between said support section and said support base.

* * * * *

UNITED STATES PATENT AND TRADEMARK OFFICE
CERTIFICATE OF CORRECTION

PATENT NO. : 6,065,339　　　　　　　　　　　　　　　　　　　　　　Page 1 of 1
DATED      : May 23, 2000
INVENTOR(S) : Yukihisa Takeuchi, Masahiko Namerikawa, Kazuyoshi Shibata, and Takao Ohnishi It is certified that error appears in the above-identified patent and that said Letters Patent is hereby corrected as shown below:

On title page, item 87, replace "Sep. 10, 1997" with --Oct. 9, 1997--.

Signed and Sealed this

Twelfth Day of June, 2001

*Attest:*

NICHOLAS P. GODICI
*Attesting Officer*　　*Acting Director of the United States Patent and Trademark Office*